(12) United States Patent
Heldman et al.

(10) Patent No.: US 12,533,417 B2
(45) Date of Patent: Jan. 27, 2026

(54) L-DOPA AND/OR DOPA DECARBOXYLSE INHIBITORS CONJUGATED TO SUGAR FOR THE TREATMENT OF DOPAMINE-RESPONSIVE DISORDERS

(71) Applicants: B. G. Negev Technologies and Applications Ltd., at Ben-Gurion University, Beer-Sheva (IL); Moshe Kushnir, Ramat Gan (IL)

(72) Inventors: Eliahu Heldman, Rehovot (IL); Moshe Kushnir, Ramat Gan (IL); Eleonora Shaubi, Beer Sheva (IL)

(73) Assignees: B. G. Negev Technologies and Applications Ltd., at Ben-Gurion University, Beer-Sheva (IL); Moshe Kushnir, Ramat Gan (IL)

( * ) Notice: Subject to any disclaimer, the term of this patent is extended or adjusted under 35 U.S.C. 154(b) by 1213 days.

(21) Appl. No.: 17/311,338

(22) PCT Filed: Dec. 5, 2019

(86) PCT No.: PCT/IL2019/051335
§ 371 (c)(1),
(2) Date: Jun. 6, 2021

(87) PCT Pub. No.: WO2020/115753
PCT Pub. Date: Jun. 11, 2020

(65) Prior Publication Data
US 2022/0016253 A1 Jan. 20, 2022

Related U.S. Application Data

(60) Provisional application No. 62/775,396, filed on Dec. 5, 2018.

(51) Int. Cl.
| | | |
|---|---|---|
| *C07H 15/18* | (2006.01) | |
| *A61K 47/54* | (2017.01) | |
| *C07C 231/12* | (2006.01) | |
| *C07C 235/34* | (2006.01) | |
| *C07C 243/28* | (2006.01) | |
| *C07C 243/34* | (2006.01) | |

(52) U.S. Cl.
CPC .......... *A61K 47/549* (2017.08); *C07C 231/12* (2013.01); *C07C 235/34* (2013.01); *C07C 243/28* (2013.01); *C07C 243/34* (2013.01); *C07H 15/18* (2013.01); *C07C 2601/16* (2017.05)

(58) Field of Classification Search
None
See application file for complete search history.

(56) References Cited

U.S. PATENT DOCUMENTS

| | | |
|---|---|---|
| 3,939,253 A | 2/1976 | Bodor et al. |
| 6,313,177 B1 | 11/2001 | Sauvé et al. |
| 7,101,912 B2 | 9/2006 | Xiang et al. |
| 2018/0362445 A1 | 12/2018 | Tack et al. |

FOREIGN PATENT DOCUMENTS

| | | | |
|---|---|---|---|
| EP | 0393781 A2 | 10/1990 | |
| EP | 1619179 A1 | 1/2006 | |
| EP | 2252578 B1 | 8/2012 | |
| EP | 3075723 A1 | 10/2016 | |
| WO | WO 2006/056604 A1 | 6/2006 | |
| WO | WO 2007/005792 A2 | 1/2007 | |
| WO | WO 2011/040969 A1 | 4/2011 | |
| WO | WO-2012079072 A2 * | 6/2012 | ........ A61K 31/198 |
| WO | WO-2014203198 A2 * | 12/2014 | ........ C07C 279/14 |
| WO | WO 2016/155888 A1 | 10/2016 | |
| WO | WO 2018/059739 A1 | 4/2018 | |

OTHER PUBLICATIONS

Anderson et al "The long-duration response to levodopa: phenomenology, potential mechanisms and clinical implications" Parkinsonism & related disorders. Sep. 2011;17(8):587-92.
Chapuis et al. "Impact of the motor complications of Parkinson's disease on the quality of life" Movement disorders: official journal of the Movement Disorder Society. Feb. 2005;20(2):224-30.
Chase TN."The significance of continuous dopaminergic stimulation in the treatment of Parkinson's disease" Drugs. 1998;55:1-9.
Chaudhuri et al. "Motor and Nonmotor Complications of Levodopa: Phenomenology, Risk Factors, and Imaging Features" Movement disorders: official journal of the Movement Disorder Society. Jul. 2018;33(6):909-19.
Chou et al. "The spectrum of"off" in Parkinson's disease: What have we learned over 40 years?" Parkinsonism & related disorders. Jun. 2018;51:9-16.
Hung et al. "Patient perception of dyskinesia in Parkinson's disease" Journal of neurology, neurosurgery, and psychiatry. Oct. 2010;81(10): 1112-5.
Lewitt PA. "Levodopa therapy for Parkinson's disease: Pharmacokinetics and pharmacodynamics" Movement disorders: official journal of the Movement Disorder Society. Jan. 2015;30(1):64-72.

(Continued)

*Primary Examiner* — Traviss C McIntosh, III
(74) *Attorney, Agent, or Firm* — Mark S. Cohen; PEARL COHEN ZEDEK LATZER BARATZ LLP

(57) ABSTRACT

The present invention provides conjugates comprising a sugar such as mannitol and one or more L-DOPA and/or DOPA decarboxylse inhibitors including, inter alia, L-DOPA, carbidopa, benserazide, or a combination thereof, wherein the sugar is conjugated to the carboxyl group of the L-DOPA and/or DOPA decarboxylse inhibitor/s) via a hydroxyl group of the sugar. The present invention further provides related pharmaceutical compositions and methods of producing the conjugates, as well as methods of use for treating medical disorders responsive to dopamininergic stimulation such as movement disorders including, inter alia, Parkinson's Disease.

14 Claims, 23 Drawing Sheets

(56) References Cited

OTHER PUBLICATIONS

Olanow et al. "Continuous Dopaminergic Stimulation as a Treatment for Parkinson's Disease: Current Status and Future Opportunities" Movement disorders: official journal of the Movement Disorder Society. Oct. 2020;35(10):1731-44.

Olanow et al. "Drug insight: Continuous dopaminergic stimulation in the treatment of Parkinson's disease" Nature clinical practice. Neurology. Jul. 2006;2(7):382-92.

Sujith et al. "Therapeutic Options for Continuous Dopaminergic Stimulation in Parkinson's Disease" Therapeutic Advances in Neurological Disorders. Mar. 2009;2(2):105.

Supplementary European Search Report for European Patent Application No. EP19894384.7 dated Dec. 6, 2022.

Zibetti et al. "Long-term duodenal levodopa infusion in Parkinson's disease: a 3-year motor and cognitive follow-up study" Journal of neurology. Jan. 2013;260(1):105-14.

Adinolfi, M. et al. (2002). Solid phase synthesis of oligonucleotides tethered to oligo-glucose phosphate tails. Tetrahedron, 58(33), 6697-6704.

Aridol US-A-11-10-062-PackageInsert-and-TestInstructions.

Bonina, F. et al. (2003). Glycosyl derivatives of dopamine and L-dopa as anti-Parkinson prodrugs: synthesis, pharmacological activity and in vitro stability studies. Journal of drug targeting, 11(1), 25-36.

Haddad, F. et al. (2017). Dopamine and Levodopa Prodrugs for the Treatment of Parkinson's Disease. Molecules, 23(1), 40.

LeWitt, P. A. et al. (2016). Levodopa therapy for Parkinson disease: a look backward and forward. Neurology, 86(14 Supplement 1), S3-S12.

Rahman, M. K. et al. (1981). Aromatic L-amino acid decarboxylase activity in central and peripheral tissues and serum of rats with L-DOPA and L-5-hydroxytryptophan as substrates. Biochemical pharmacology, 30(6), 645-649.

Senek, M. et al. (2014). Continuous drug delivery in Parkinson's disease. CNS drugs, 28(1), 19-27.

Shaltiel-Karyo, R. et al. (2013). A blood-brain barrier (BBB) disrupter is also a potent α-synuclein (α-syn) aggregation inhibitor: a novel dual mechanism of mannitol for the treatment of Parkinson disease (PD). Journal of Biological Chemistry, 288(24), 17579-17588.

Simon. (2018). The Mannitol results. The Science of Parkinson's. https://scienceofparkinsons.com/2018/05/30/mannitol/.

Sivakumar, R. et al. (2009). Syntheses of dopa glycosides using glucosidases. Glycoconjugate journal, 26(2), 199-209.

Surmeier, D. J. (2018). Determinants of dopaminergic neuron loss in Parkinson's disease. The FEBS journal, 285(19), 3657-3668.

Vadivelan, G. et al. (2011). Syntheses of L-dopa glycosides using glucosidases. Indian Journal of Chemistry, vol. 50B, 1779-1785.

* cited by examiner

Chemical Formula: $C_{16}H_{26}N_2O_9$
Molecular Weight: 390.39

Chemical Formula: $C_{26}H_{38}N_4O_{12}$
Molecular Weight: 598.60

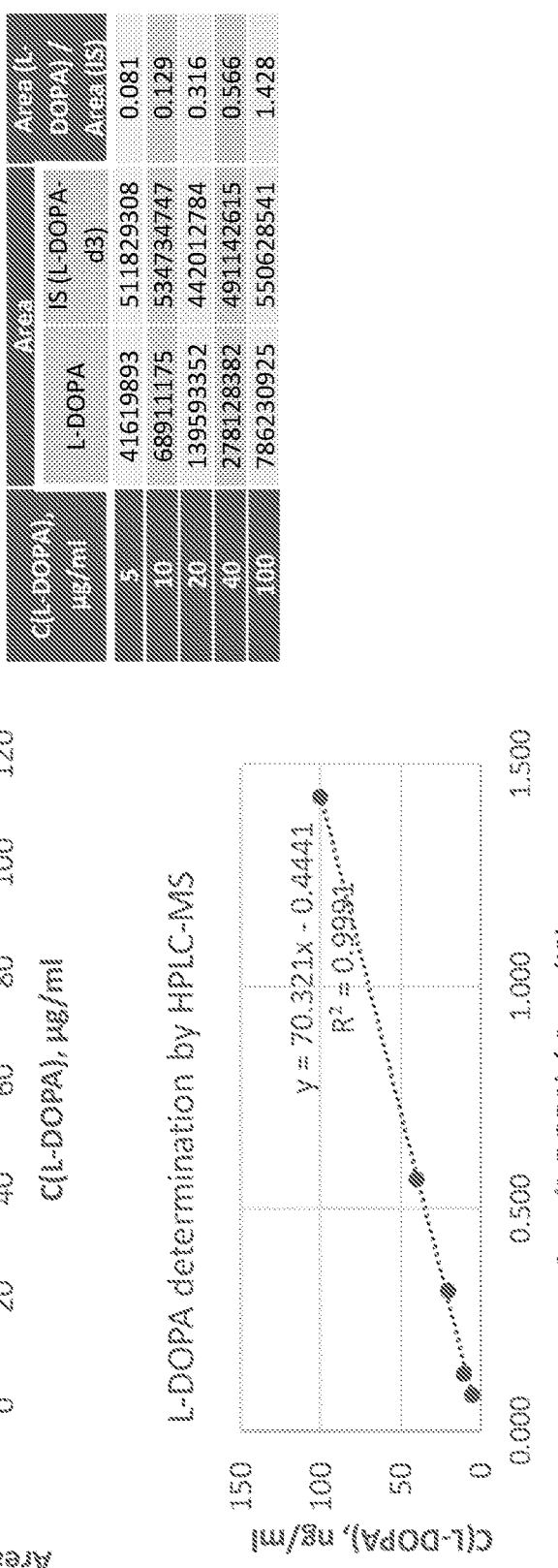
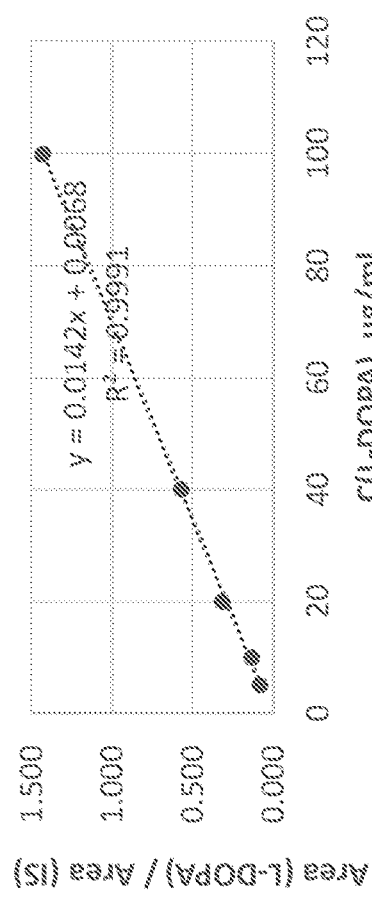
Figure 11A
Figure 11B

L-DOPA AND/OR DOPA DECARBOXYLSE INHIBITORS CONJUGATED TO SUGAR FOR THE TREATMENT OF DOPAMINE-RESPONSIVE DISORDERS

CROSS-REFERENCE TO RELATED APPLICATIONS

This application is a National Phase Application of PCT International Application No. PCT/IL2019/051335, International Filing Date Dec. 5, 2019, claiming the benefit of U.S. Patent Application No. 62/775,396, filed Dec. 5, 2018, which is hereby incorporated by reference.

FIELD OF THE INVENTION

The present invention provides conjugates comprising a sugar such as mannitol and one or more L-DOPA and/or DOPA decarboxylse inhibitors including, inter alia, L-DOPA, carbidopa, benserazide, or a combination thereof, wherein the sugar is conjugated to the carboxyl group of the L-DOPA and/or DOPA decarboxylse inhibitor(s) via a hydroxyl group of the sugar. The present invention further provides related pharmaceutical compositions and methods of producing the conjugates, as well as methods of use for treating medical disorders responsive to dopamininergic stimulation such as movement disorders including, inter alia, Parkinson's Disease.

BACKGROUND OF THE INVENTION

Parkinson's disease (PD) is an aggressive and progressive neurodegenerative disorder characterized, among other things, by the depletion of dopamine in the central nervous system (CNS). Symptomatic treatment of PD is directed towards ensuring an adequate supply of dopamine to the CNS. The most effective current treatment of PD is the administration of L-DOPA together with a DOPA decarboxylase inhibitor (e.g., carbidopa or benserazide); the decarboxylase inhibitor prevents the conversion of L-DOPA to dopamine in peripheral tissues and increases the bioavailability of the delivered L-DOPA in the CNS. One of the challenges of treatment with L-DOPA is its short pharmacokinetic parameters, expressed in a short duration during which L-DOPA is present in the blood circulation at therapeutic concentrations.

In advanced PD, dopaminergic stimulation of the striatal neurons tends to be dependent on the blood level of L-DOPA, whereas fluctuations in L-DOPA concentrations in the blood circulation causes an intermittent dopaminergic stimulation of the striatal neurons, resulting in late motor complications ("On-Off" fluctuations).

Continuous dopaminergic stimulation by delivering L-DOPA continuously has been shown to reduce the late motor complications. The methods which are currently used in the clinic to deliver L-DOPA continuously include: sustained release pills and intraduodenal delivery. Each of the currently used methods of L-DOPA delivery has significant drawbacks, such as the need for surgery to install a device (i.e. Duodopa, which is used for intraduodenal delivery), a great inconvenience in using an external device (i.e. Duodopa that includes an external pump and cassette for storing relatively large volume of L-DOPA formulation) and too short periods during which L-DOPA is present in therapeutic concentrations in the blood circulation (in the case of sustained release pills). Thus, the currently used methods of continuous L-DOPA delivery are unsatisfactory, and efforts are continuing to find delivery systems or drugs that provide better continuous central dopaminergic stimulation.

While L-DOPA is an effective symptomatic treatment, it does not affect all the pathological aspects of the disease. For example, L-DOPA does not affect α-synuclein aggregates, which is considered the pathological determinant that leads to the development of PD and to the progression of the disease. Removal of α-synuclein aggregates may slow, or even stop, disease progression. Mannitol has been shown to inhibit aggregation of α-synuclein in PD animal models and its potential therapeutic effect on PD is via a distinct mechanism from that of L-DOPA.

Therefore, improved methods of L-DOPA delivery are needed along with methods that address both symptoms and underlying pathology. A treatment that will provide L-DOPA with improved pharmacokinetics and at the same time will reduce α-synuclein aggregation is expected to be more effective in providing relief and possibly a cure to PD patients than the currently available treatments.

SUMMARY OF THE INVENTION

In one embodiment, the present invention provides a conjugate comprising mannitol and one to six L-DOPA molecules, wherein the mannitol is conjugated to the carboxyl group of the one to six L-DOPA molecules via a hydroxyl group of the mannitol.

In another embodiment, the present invention provides a conjugate comprising a sugar and one or more L-DOPA molecules, wherein the sugar is conjugated to the carboxyl group of the one or more L-DOPA molecules via a hydroxyl group of the sugar.

In another embodiment, the present invention provides a conjugate comprising a sugar and one or more inhibitors of DOPA decarboxylase, wherein the sugar is conjugated to the carboxyl group of the one or more inhibitors of DOPA decarboxylase or to the carboxyl group of a spacer bound to said one or more inhibitors of DOPA decarboxylase via a hydroxyl group of said sugar.

In another embodiment, the present invention provides a conjugate comprising a sugar and one or more L-DOPA molecules and one or more inhibitors of DOPA decarboxylase, wherein the sugar is conjugated to the carboxyl groups of the one or more L-DOPA molecules and of the one or more inhibitors of DOPA decarboxylase or of a spacer bound to said one or more inhibitors of DOPA decarboxylase, via a hydroxyl group of the sugar.

In another embodiment, the present invention provides a pharmaceutical composition comprising a conjugate comprising mannitol and one to six L-DOPA molecules, wherein the mannitol is conjugated to the carboxyl group of the one or more L-DOPA molecules via a hydroxyl group of the mannitol and a pharmaceutically acceptable carrier.

In another embodiment, the present invention provides a pharmaceutical composition comprising a conjugate comprising a sugar and one or more L-DOPA molecules, wherein the sugar is conjugated to the carboxyl group of the one or more L-DOPA molecules via a hydroxyl group of the sugar and a pharmaceutically acceptable carrier. In one embodiment, the pharmaceutical composition further comprises one or more decarboxylase inhibitors.

In another embodiment, the present invention provides method for treating, suppressing or inhibiting a movement disorder comprising administering to the subject having the movement disorder a therapeutically effective amount of either a conjugate comprising mannitol and one to six L-DOPA molecules, wherein the mannitol is conjugated to the carboxyl group of the one or more L-DOPA molecules via a hydroxyl group of the mannitol or a pharmaceutical composition comprising the conjugate and a pharmaceutically acceptable carrier.

In another embodiment, the present invention provides a method for treating, suppressing or inhibiting a movement disorder comprising administering to a subject having the movement disorder a therapeutically effective amount of either a conjugate comprising a sugar and one or more L-DOPA molecules, wherein the sugar is conjugated to the carboxyl group of the one or more L-DOPA molecules via a hydroxyl group of the sugar or a pharmaceutical composition comprising the conjugate and a pharmaceutically acceptable carrier.

In another embodiment, the present invention provides a method for treating, suppressing or inhibiting a movement disorder comprising administering to a subject having the movement disorder a therapeutically effective amount of either a) a conjugate comprising a sugar, one or more L-DOPA molecules, and one or more inhibitors of DOPA decarboxylase, wherein the sugar is conjugated to the carboxyl group of the one or more L-DOPA molecules and the one or more inhibitors of DOPA decarboxylase via a hydroxyl group of the sugar or b) a pharmaceutical composition comprising the conjugate and a pharmaceutically acceptable carrier.

In another embodiment, the present invention provides a method for treating, suppressing or inhibiting a movement disorder comprising administering to a subject having the movement disorder a therapeutically effective amount of either a) a conjugate comprising a sugar and one or more L-DOPA molecules, wherein the sugar is conjugated to the carboxyl group of the one or more L-DOPA molecules via a hydroxyl group of the sugar and a conjugate comprising a sugar and one or more inhibitors of DOPA decarboxylase, wherein the sugar is conjugated to the carboxyl group of the one or more inhibitors of DOPA decarboxylase via a hydroxyl group of the sugar, or b) a pharmaceutical composition comprising the conjugates and a pharmaceutically acceptable carrier.

In another embodiment, the present invention provides method for treating, suppressing or inhibiting a synucleinopathy comprising administering to the subject having the synucleinopathy a therapeutically effective amount of either a conjugate comprising mannitol and one to six L-DOPA molecules, wherein the mannitol is conjugated to the carboxyl group of the one or more L-DOPA molecules via a hydroxyl group of the mannitol or a pharmaceutical composition comprising the conjugate and a pharmaceutically acceptable carrier.

In another embodiment, the present invention provides a method for treating, suppressing or inhibiting a synucleinopathy comprising administering to a subject having the synucleinopathy a therapeutically effective amount of either a conjugate comprising a sugar and two or more L-DOPA molecules, wherein the sugar is conjugated to the carboxyl group of the one or more L-DOPA molecules via a hydroxyl group of the sugar or a pharmaceutical composition comprising the conjugate and a pharmaceutically acceptable carrier.

In another embodiment, the present invention provides a method for treating, suppressing or inhibiting a synucleinopathy comprising administering to a subject having the synucleinopathy a therapeutically effective amount of a conjugate comprising a sugar and one or more L-DOPA molecules, wherein the sugar is conjugated to the carboxyl group of the one or more L-DOPA molecules via a hydroxyl group of the sugar and a conjugate comprising a sugar and one or more inhibitors of DOPA decarboxylase, wherein the sugar is conjugated to the carboxyl group of the one or more inhibitors of DOPA decarboxylase via a hydroxyl group of the sugar, or a pharmaceutical composition comprising the conjugate and a pharmaceutically acceptable carrier.

In another embodiment, the present invention provides a method of producing an extended release form of L-DOPA and mannitol comprising the step of conjugating mannitol with one or more L-DOPA molecules, wherein each of one or more said L-DOPA molecules is conjugated to said mannitol in an ester linkage.

In another embodiment, the present invention provides a process for producing a conjugate of mannitol and one or more L-DOPA molecules comprising the steps of: (a) Combining L-DOPA with $SOCl_2$ and $CH_3OH$ to produce methyl L-DOPA hydrochloride; (b) Combining the methyl-L-DOPA hydrochloride with $K_2CO_3$, KI, tetrabutyl ammonium bromide and benzyl bromide in acetonitrile to produce tetrabenzyl methyl L-DOPA; (c) Removing methyl group from tetrabenzyl methyl L-DOPA by hydrolyzing tetrabenzyl methyl L-DOPA with NaOH to produce tetrabenzyl L-DOPA; (d) Combining tetrabenzyl L-DOPA with (i) diisopropylidene mannitol, (ii) 1,3:4,6 di-O-benzylidene-D-mannitol, or (iii) (2R,3R,4R,5R)-3,4-bis(benzyloxy)hexane-1,2,5,6-tetraol to produce (i) 1)S,2R)-1,2-bis((R)-2,2-dimethyl-1,3-dioxolan-4-yl)-2-hydroxyethyl 3-(3,4-bis(benzyloxy)phenyl)-2-(dibenzylamino)propanoate, (ii) (4R,4'R,5R,5'R)-2,2'-diphenyl-4,4'-bi(1,3-dioxane)-5,5'-diylbis(3-(3,4-bis(benzyloxy)phenyl)-2-(dibenzylamino)propanoate), or (iii) (2R,3R,4R,5R)-3,6-bis(benzyloxy)hexane-1,2,4,5-tetrayltetrakis(3-(3,4-bis(benzyloxy)phenyl)-2-(dibenzylamino)propanoate), respectively; (e) Removing benzyl groups from the product of step (d) by hydrogenation with $H_2$, using Pd/C or PdOH/C as a catalyst, thereby producing a conjugate of mannitol and one to six L-DOPA molecules.

In another embodiment, the present invention provides a process for producing a conjugate of mannitol and one to six carbidopa molecules comprising the steps of: (a) esterifying the carboxylic acid of carbidopa; (b) protecting the amine group of the esterified carbidopa of step (a) by tert-Butyloxycarbonyl (Boc); (c) protecting the compound from step (b) by a benzyl group; (d) hydrolyzing the ester group of the compound of step (c), to obtain a carboxylic group; (e) reacting the compound from step (d) with dibenzyl mannitol to obtain one or more protected carbidopa molecules conjugated to the dibenzyl mannitol; (f) removing the protecting group from the compound from step (e); and (g) hydrogenating the benzylic groups from the compound from step (f).

In another embodiments, the esterification at step (a) is performed with ethanol, methanol, t-butanol, propanol, or a combination thereof. In another embodiment, at step (b) the amine group is protected with tert-Butyloxycarbonyl (Boc). In another embodiment, at step (c) the protecting of the compound of step (b) is performed using benzyl bromide in the presence of $CsHCO_3$. In another embodiment, at step (d) the compound of step (c) is mixed with $H_2O/CH_3OH/THF$ in the presence of 0.33M LiOH.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1A shows L-DOPA-mannitol conjugate having one molecule of mannitol and one molecule of L-DOPA (named DOPAM-1). FIG. 1B shows L-DOPA-mannitol conjugate having one molecule of mannitol and two molecules of L-DOPA (named DOPAM-2). FIG. 1C shows L-DOPA-mannitol conjugate having one molecule of mannitol and three molecules of L-DOPA (named DOPAM-3). FIG. 1D shows L-DOPA-mannitol conjugate having one molecule of mannitol and four molecules of L-DOPA (named DOPAM-4). FIG. 1E shows L-DOPA-mannitol conjugate having one molecule of mannitol and five molecules of L-DOPA (named DOPAM-5). FIG. 1F shows L-DOPA-mannitol conjugate having one molecule of mannitol and six molecules of L-DOPA (named DOPAM-6).

FIG. 2A shows a carbidopa-mannitol conjugate having one molecule of mannitol and one molecule of carbidopa (named CARBIDOPAM-1). FIG. 2B shows a carbidopa-mannitol conjugate having one molecule of mannitol and two molecules of carbidopa (named CARBIDOPAM-2). FIG. 2C shows a carbidopa-mannitol conjugate having one molecule of mannitol and three molecules of carbidopa (named CARBIDOPAM-3). FIG. 2D shows a carbidopa-mannitol conjugate having one molecule of mannitol and four molecules of carbidopa (named CARBIDOPAM-4). FIG. 2E shows a carbidopa-mannitol conjugate having one molecule of mannitol and five molecules of carbidopa (named CARBIDOPAM-5). FIG. 2F shows a carbidopa-mannitol conjugate having one molecule of mannitol and six molecules of carbidopa (named CARBIDOPAM-6).

FIG. 11 shows the correlation between known L-DOPA concentration and area under the curve for L-DOPA on liquid chromatography-mass spectrometry (LC-MS) chromatograms (a calibration curve) when an internal standard is introduced into the system.

FIG. 14A L-DOPA levels 30, 60, 120, 240, and 480 minutes after injection with DOPAM-2 or L-DOPA. FIG. 14B L-DOPA levels 240 and 480 minutes after injection with DOPAM-2.

DETAILED DESCRIPTION OF THE PRESENT INVENTION

Figure 1A:
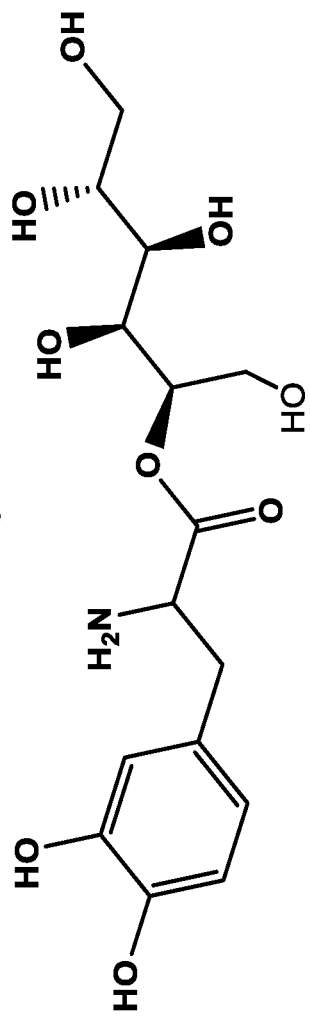
FIGS. 1A-1F provide the structures of L-DOPA-mannitol conjugates (termed "DOPAM").
Figure 1B:
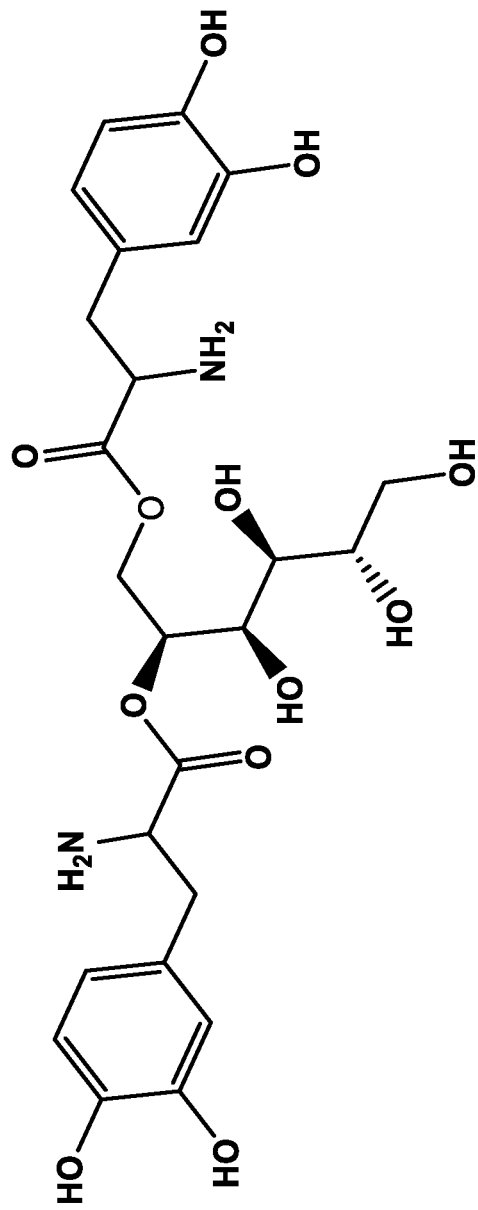
Figure 1C:
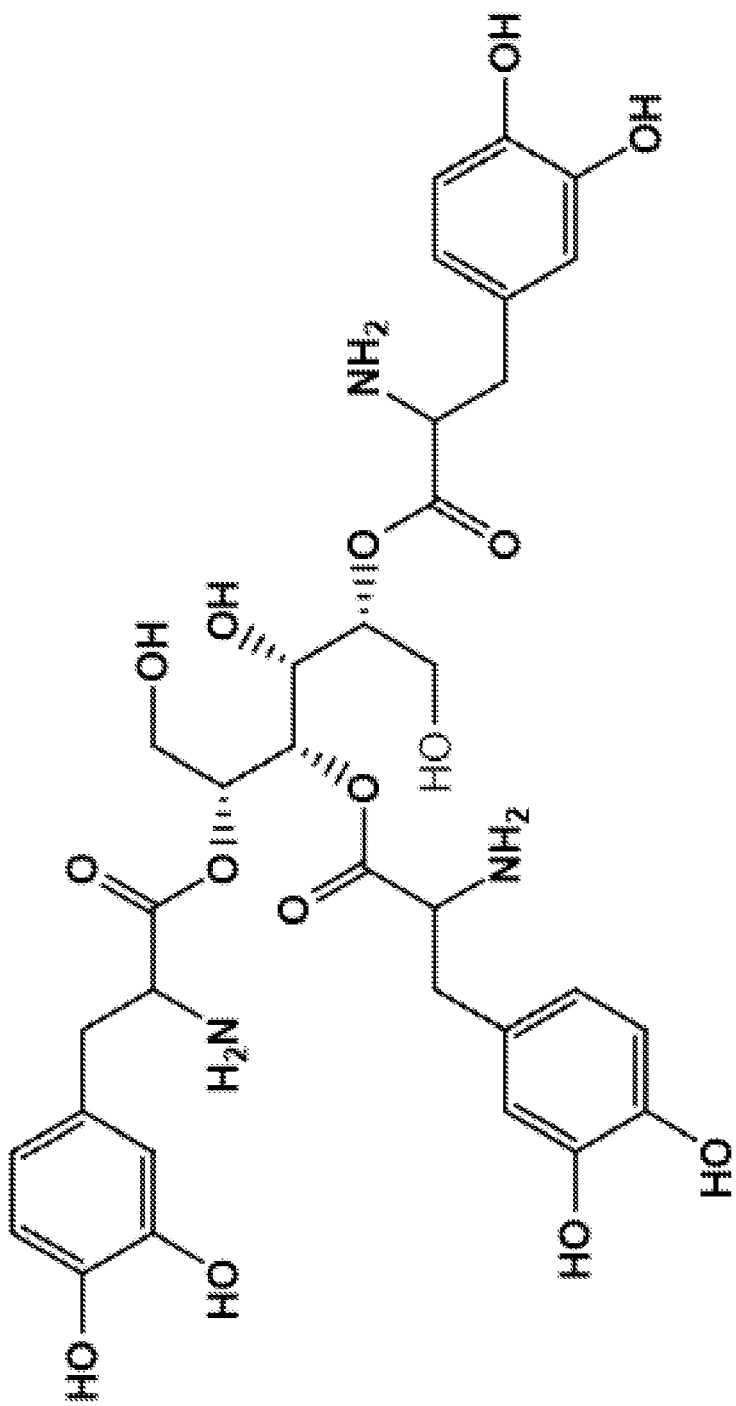
Figure 1D:
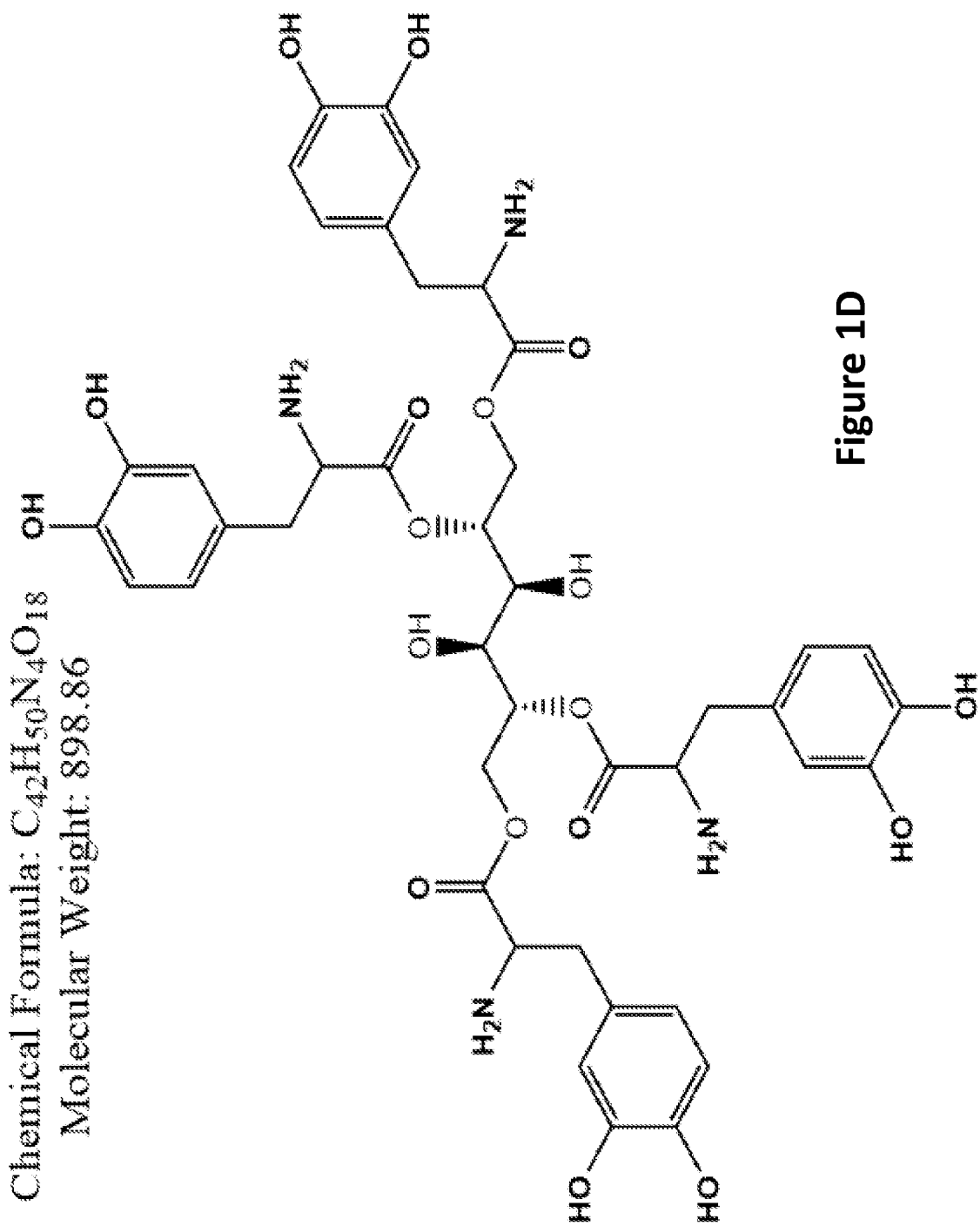
Figure 1E:
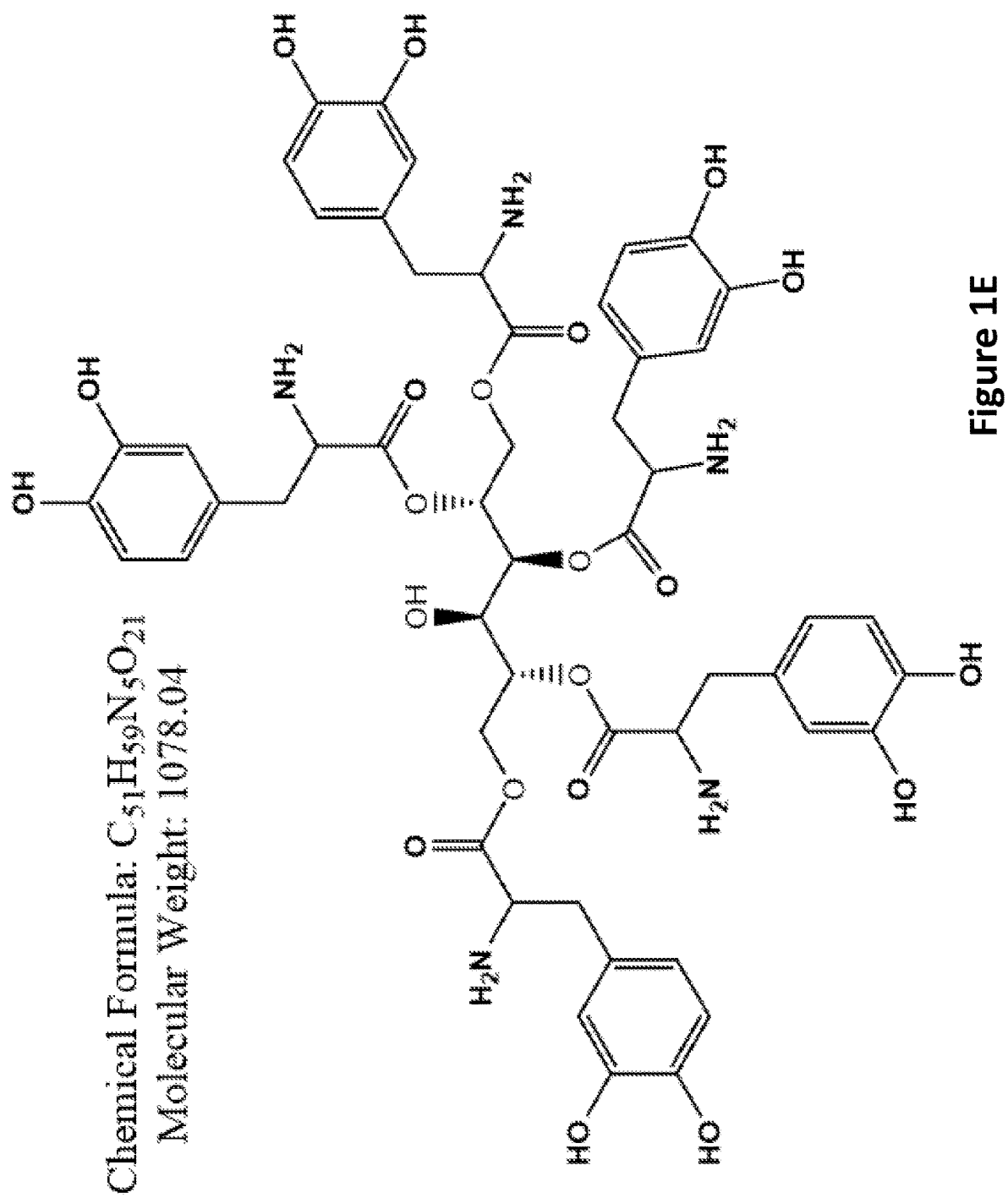
Figure 1F:
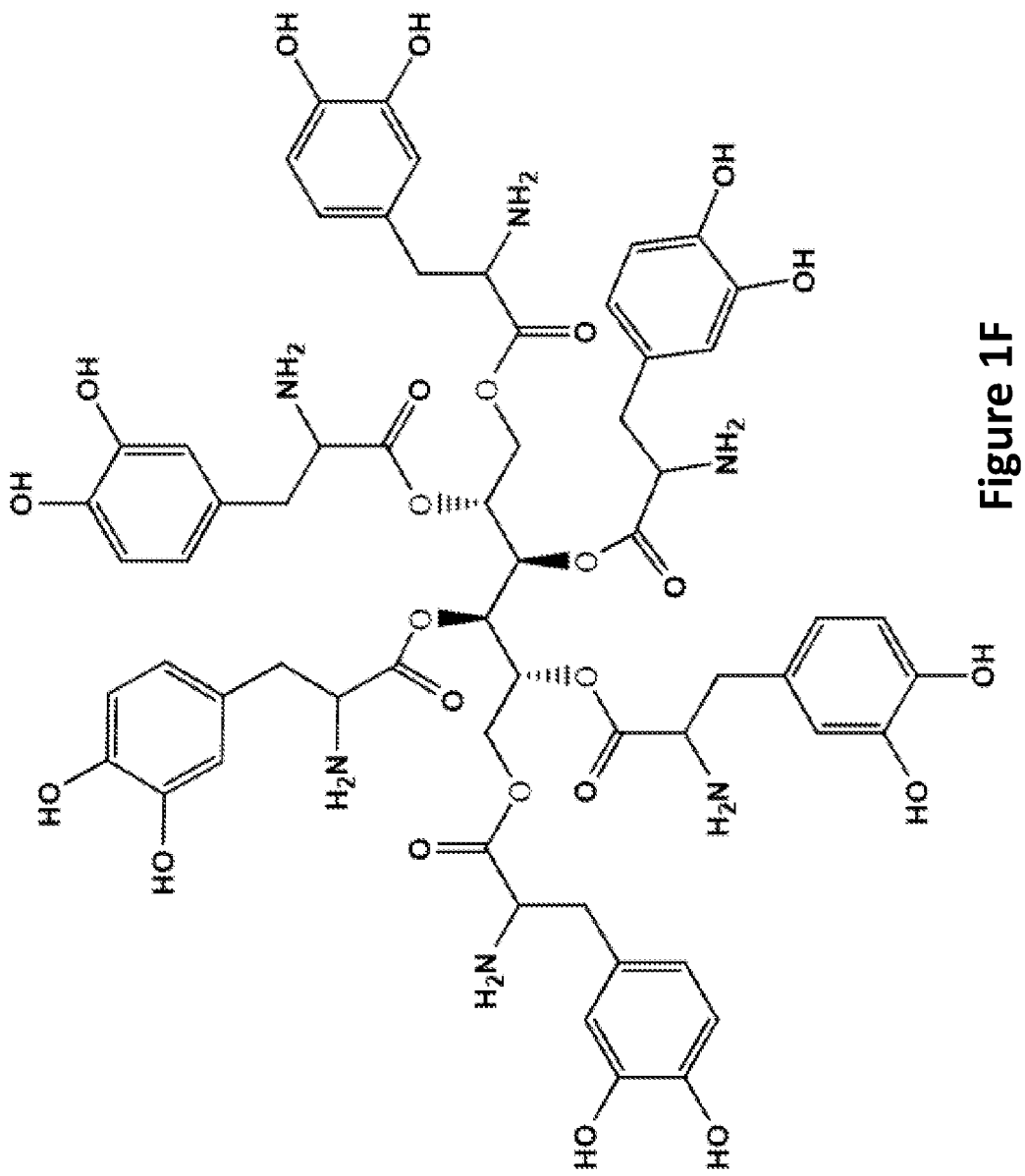
Figure 2A:
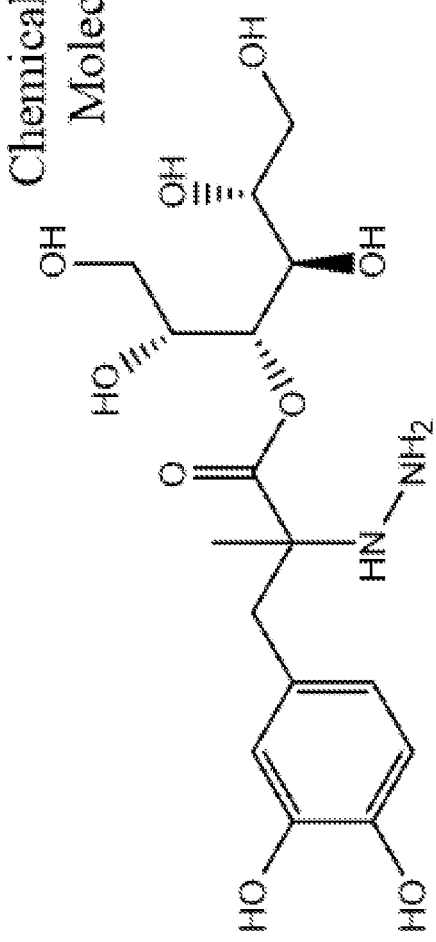
FIGS. 2A-2F provide the structures of carbidopa-mannitol conjugates (termed "CARBIDOPAM").
Figure 2B:
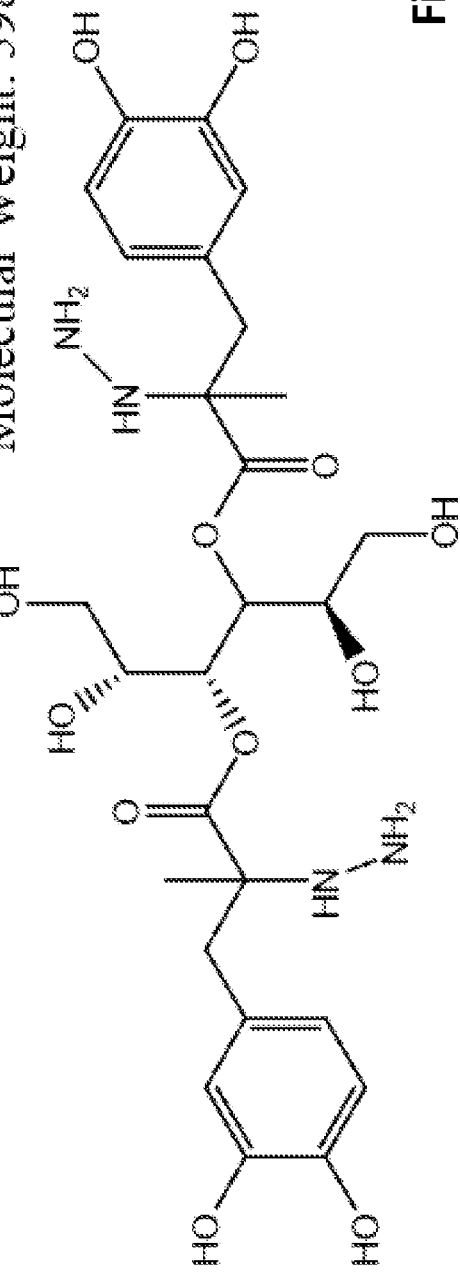
Figure 2C:
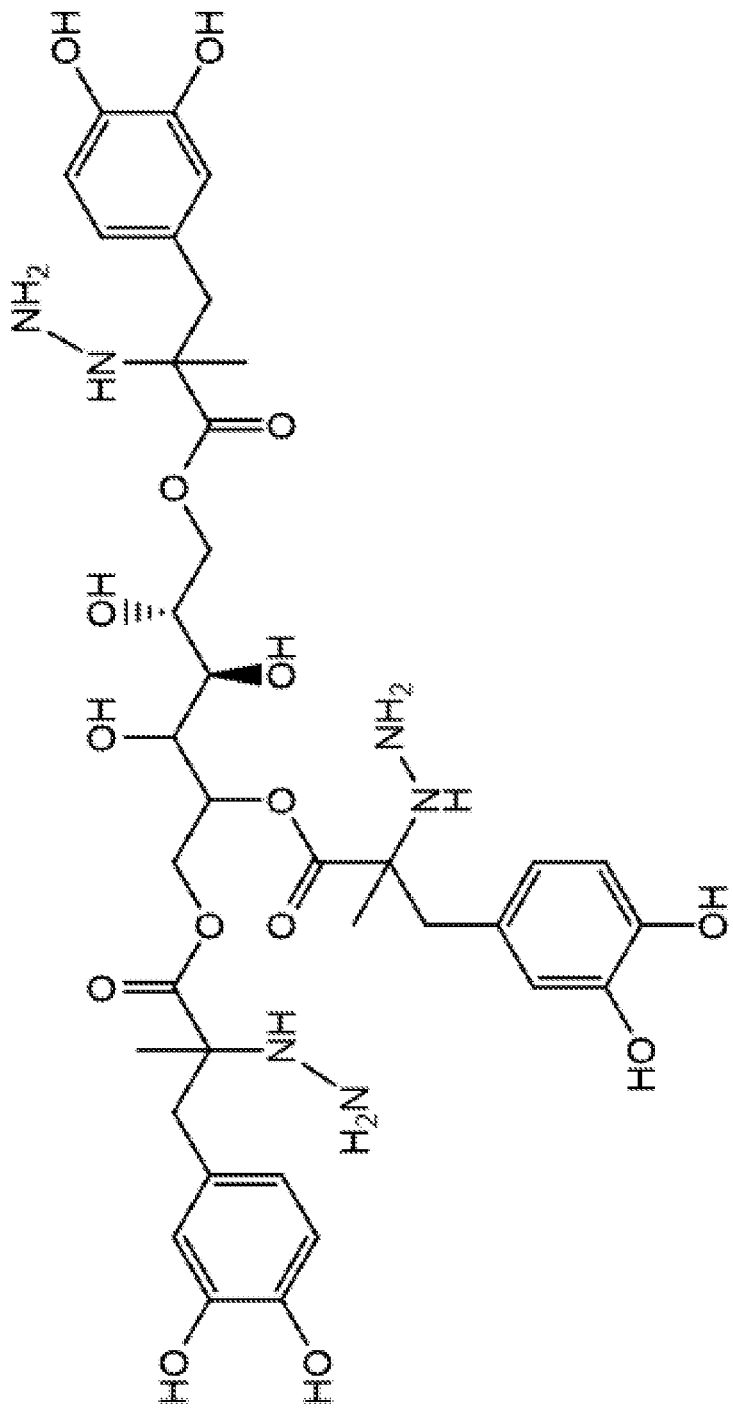
Figure 2D:
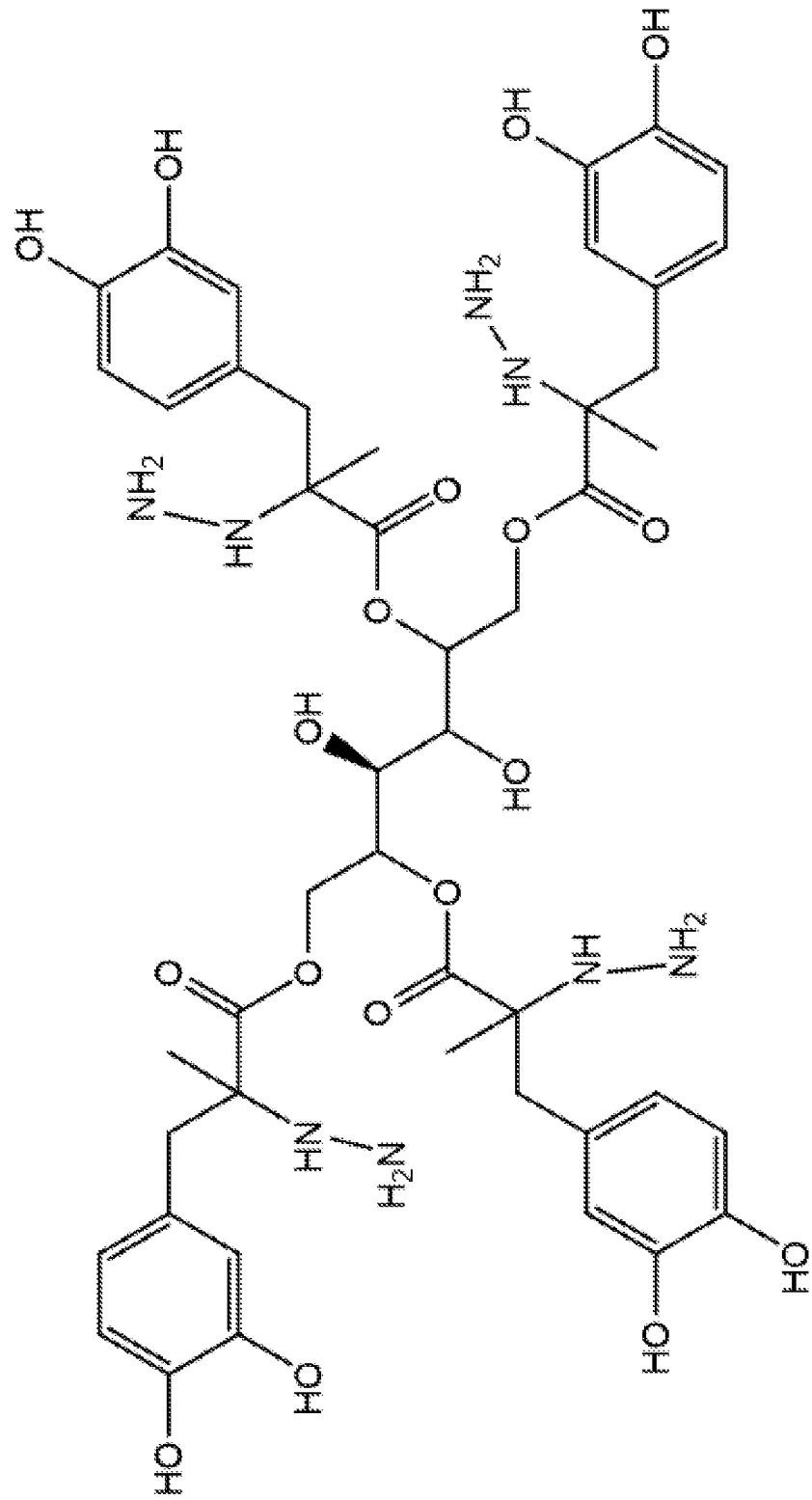
Figure 2E:
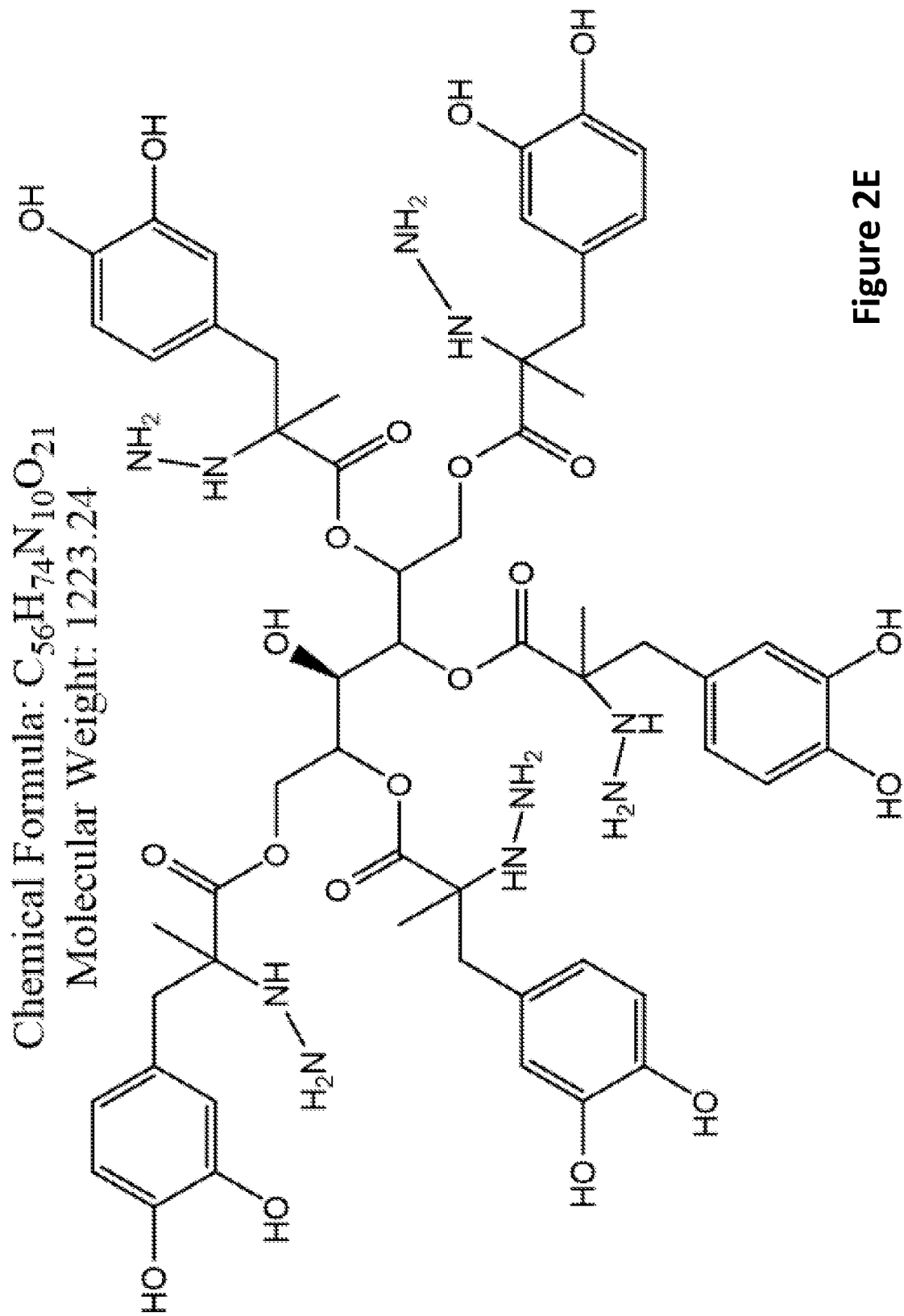
Figure 2F:
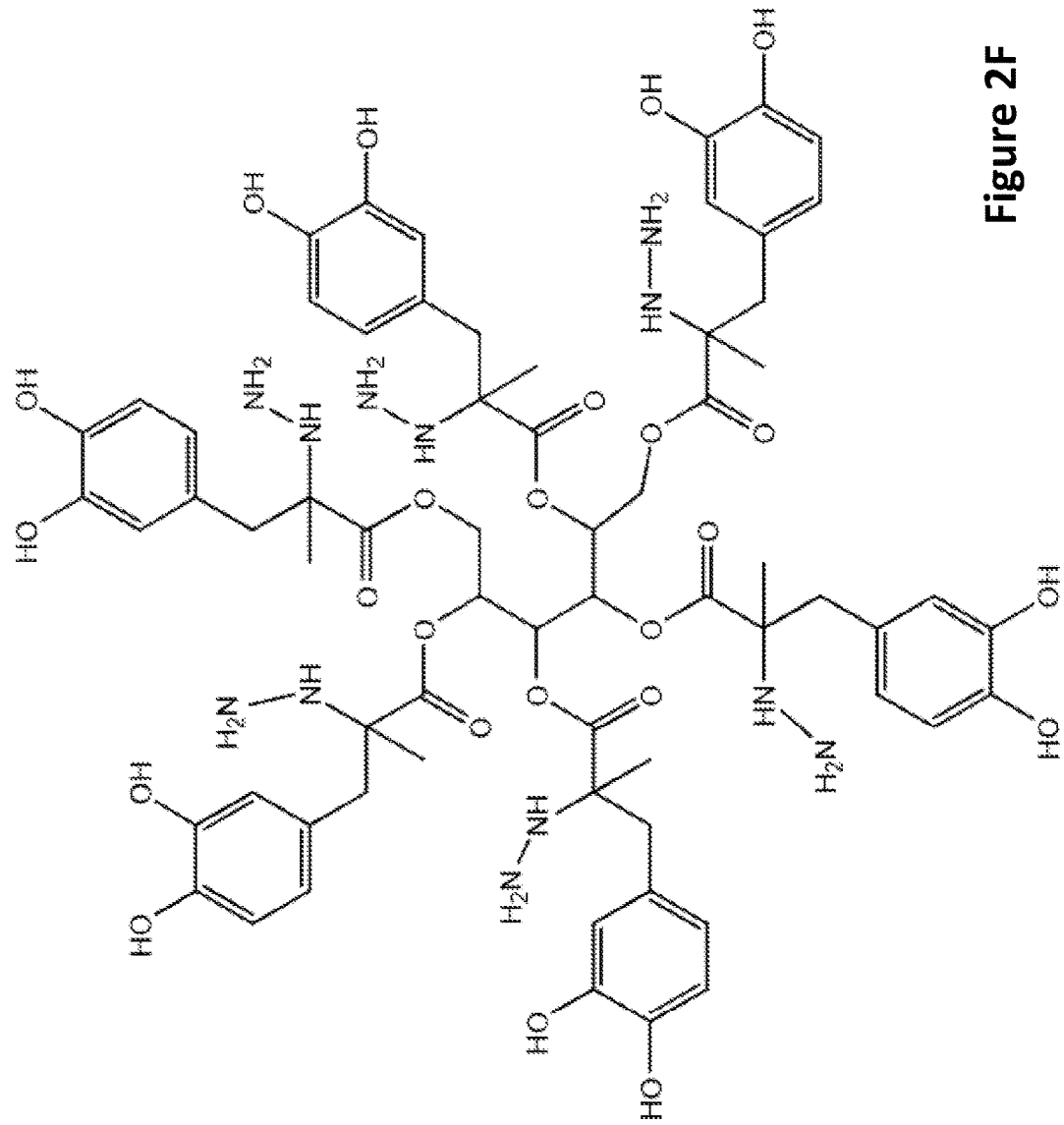
Figure 3:
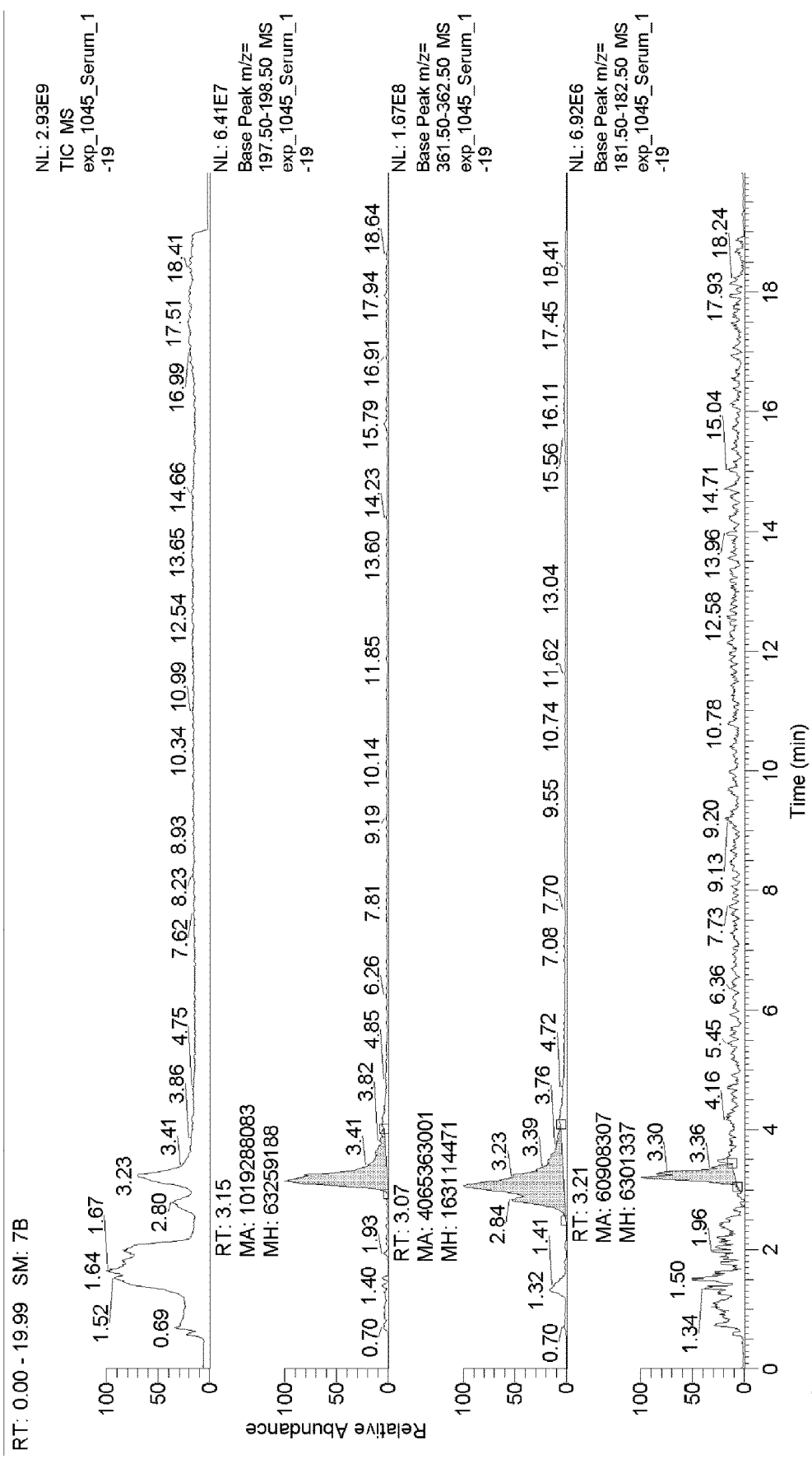
FIG. 3 shows the liquid chromatography-mass spectrometry (LC-MS) chromatograms showing L-DOPAM (a conjugate of mannitol and L-DOPA) and its breakdown products (one molecule each of L-DOPA and mannitol) that were obtained at time 0. The upper chromatogram represents the total ion chromatogram; the second chromatogram shows only L-DOPA (Base peak m/z 198=[197+1]$^+$); the third chromatogram shows only L-DOPAM (Base peak m/z 362=[361+1]$^+$); and the fourth chromatogram shows only Mannitol (Base peak m/z 182=[181+1]$^+$).
Figure 4:
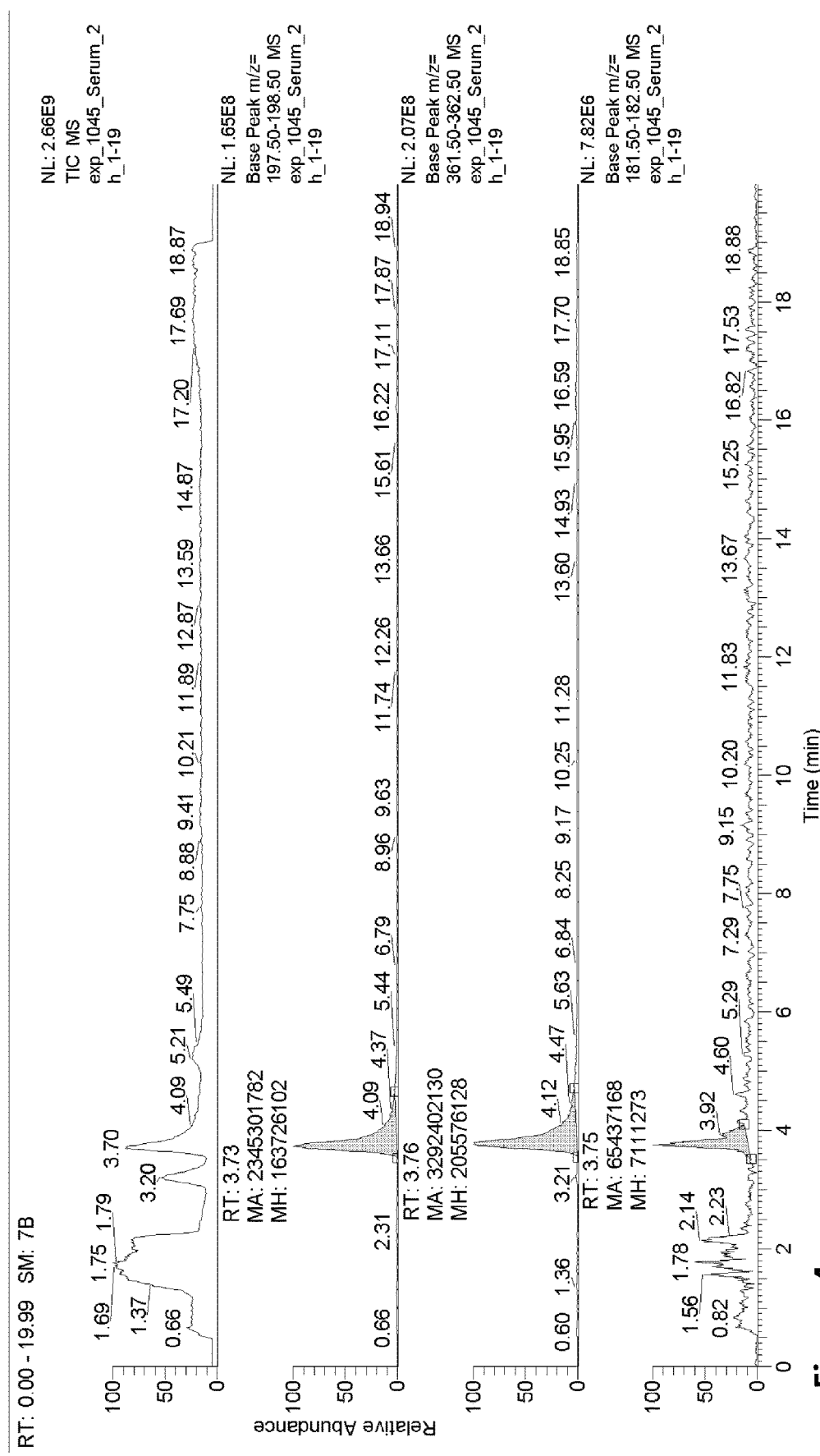
FIG. 4 shows the liquid chromatography-mass spectrometry (LC-MS) chromatograms showing L-DOPAM and its breakdown products (one molecule each of L-DOPA and mannitol) that were obtained at time 2 h after contact of L-DOPAM with serum. The upper chromatogram represents the total ion chromatogram; the second chromatogram shows only L-DOPA (Base peak m/z 198=[197+1]$^+$); the third chromatogram shows only L-DOPAM (Base peak m/z 362=[361+1]$^+$); and the fourth chromatogram shows only Mannitol (Base peak m/z 182=[181+1]$^+$).
Figure 5:
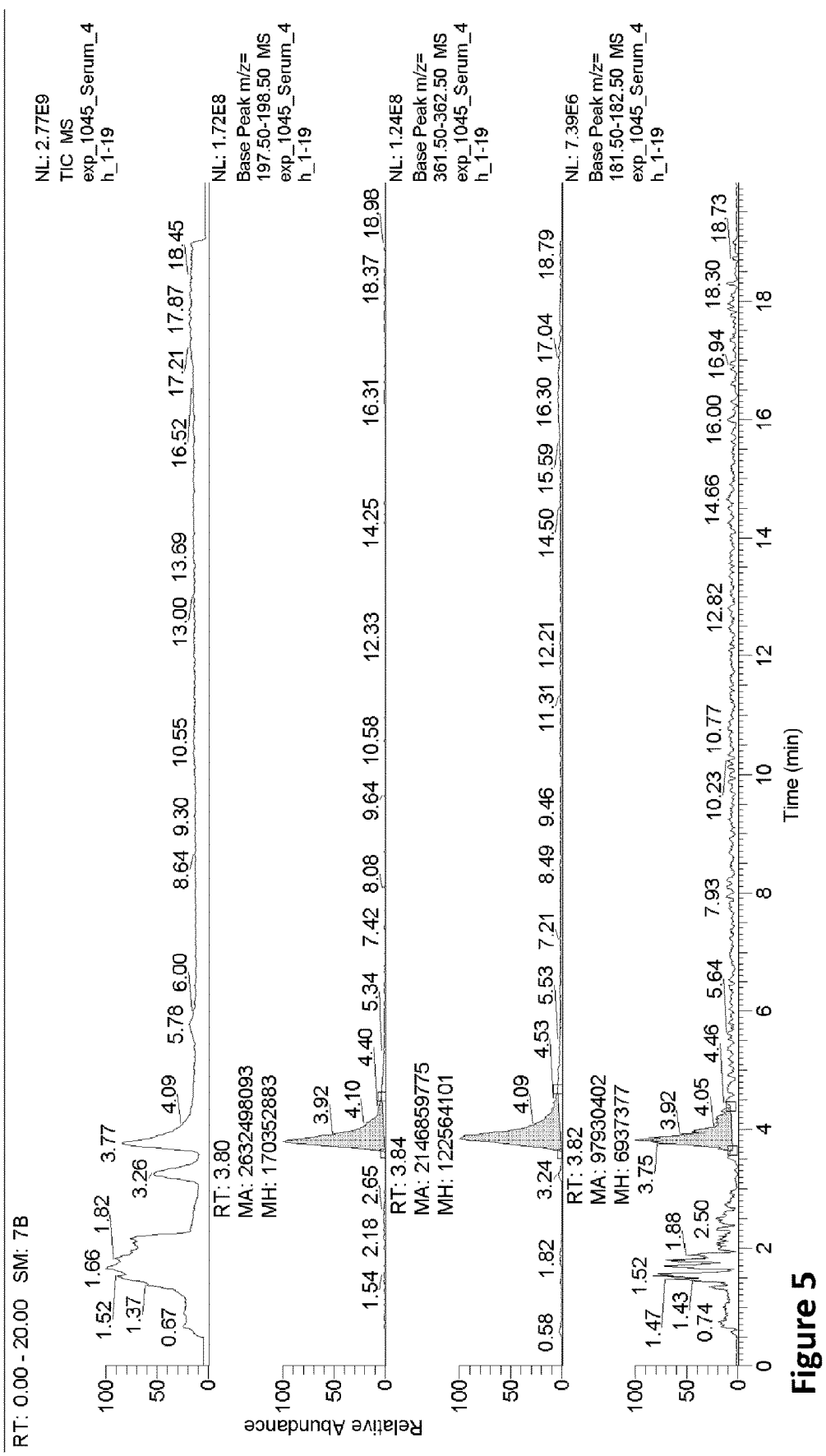
FIG. 5 shows the liquid chromatography-mass spectrometry (LC-MS) chromatograms showing L-DOPAM and its breakdown products (one molecule each of L-DOPA and mannitol) that were obtained at time 4 h after contact of L-DOPAM with serum. The upper chromatogram represents the total ion chromatogram; the second chromatogram shows only L-DOPA (Base peak m/z 198=[197+1]$^+$); the third chromatogram shows only L-DOPAM (Base peak m/z 362=[361+1]$^+$); and the fourth chromatogram shows only Mannitol (Base peak m/z 182=[181+1]$^+$).
Figure 6:
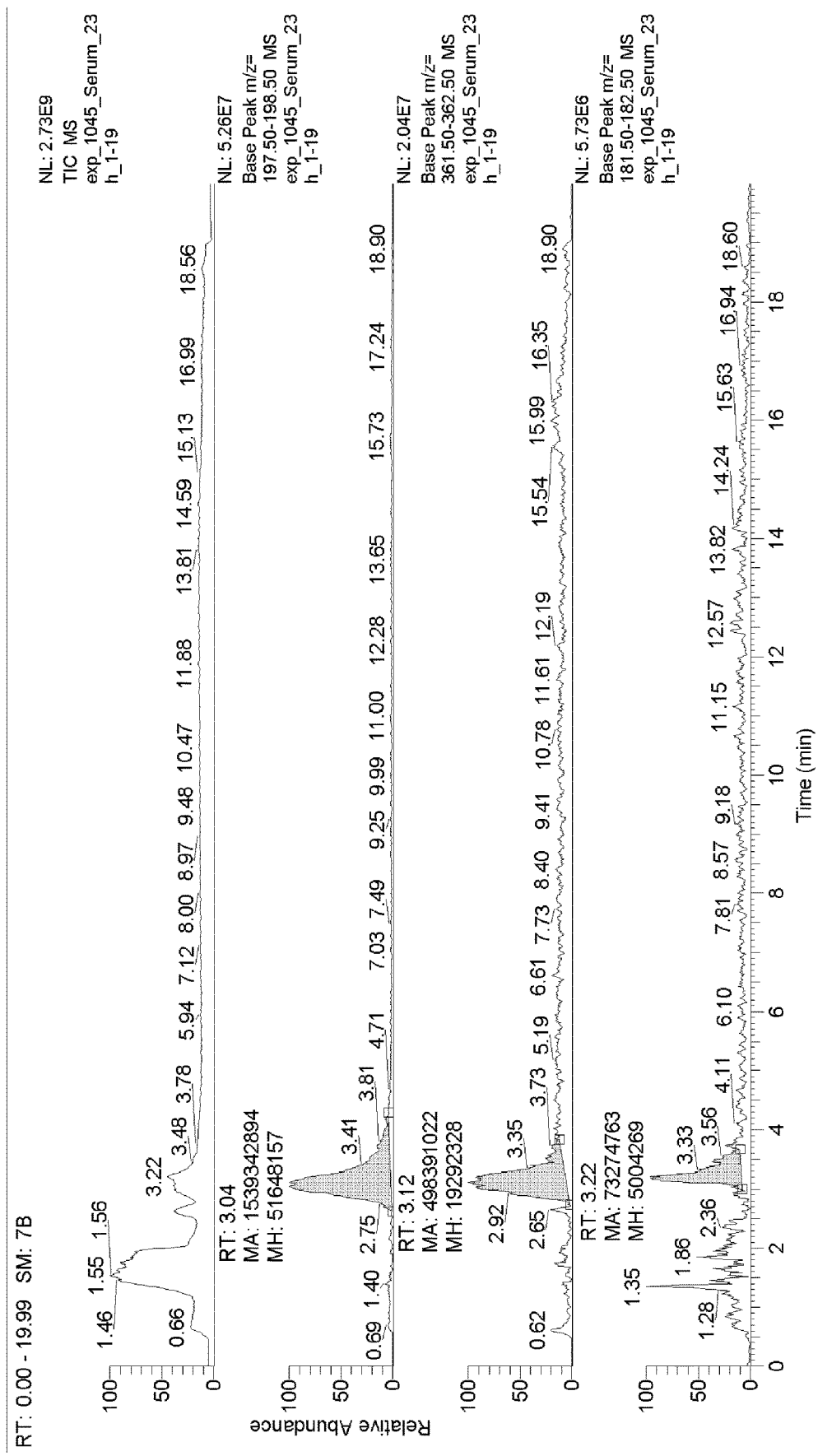
FIG. 6 shows the liquid chromatography-mass spectrometry (LC-MS) chromatograms showing L-DOPAM and its breakdown products (one molecule each of L-DOPA and mannitol) that were obtained at time 23 h after contact of L-DOPAM with serum. The upper chromatogram represents the total ion chromatogram; the second chromatogram shows only L-DOPA (Base peak m/z 198=[197+1]$^+$); the third chromatogram shows only L-DOPAM (Base peak m/z 362=[361+1]$^+$); and the fourth chromatogram shows only Mannitol (Base peak m/z 182=[181+1]$^+$).
Figure 7:
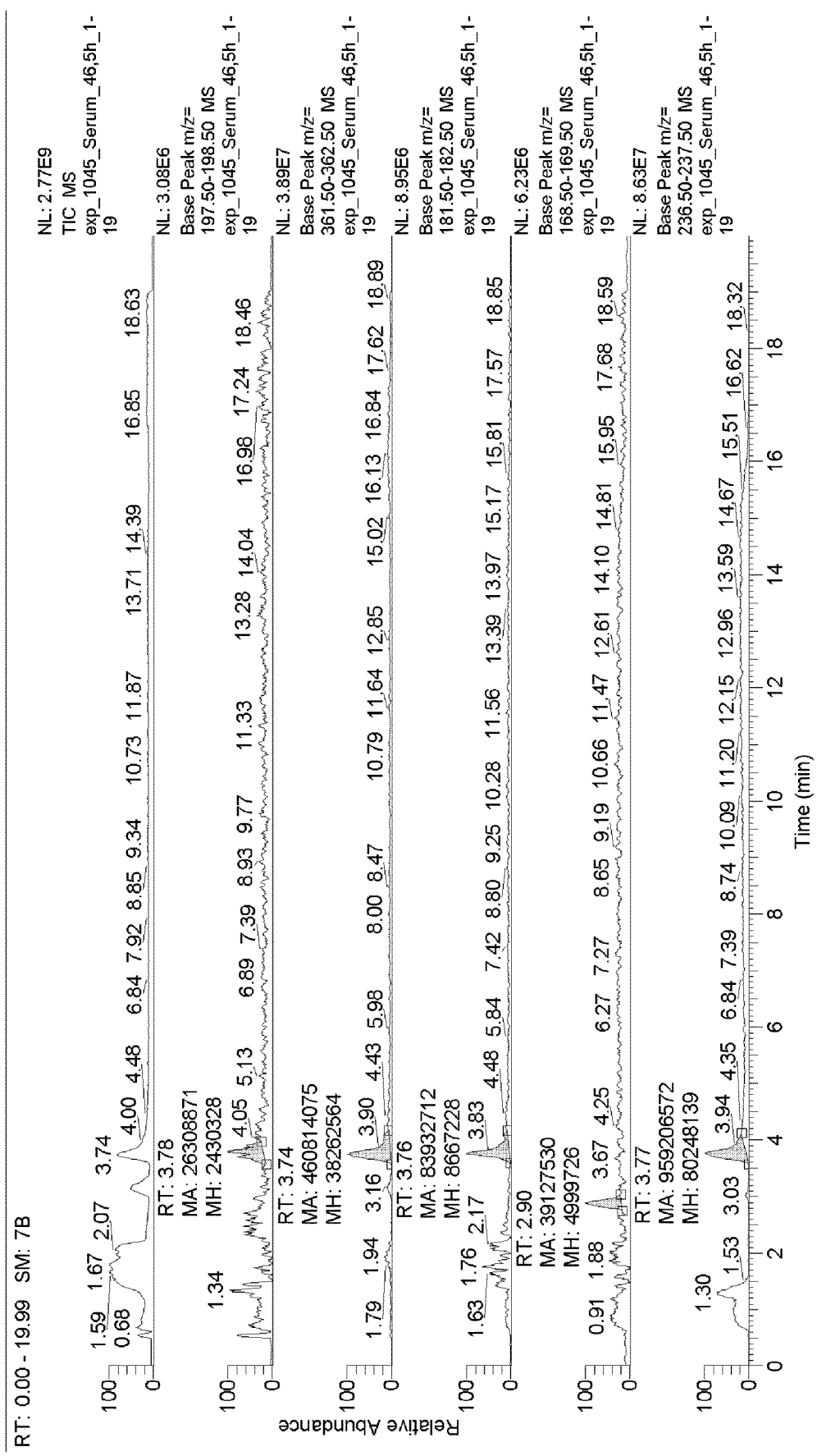
FIG. 7 shows the liquid chromatography-mass spectrometry (LC-MS) chromatograms showing L-DOPAM and its breakdown products and metabolites that were obtained at time 46.5 h after contact of L-DOPAM with serum. The upper chromatogram represents the total ion chromatogram; the second chromatogram shows only L-DOPA (Base peak m/z 198=[197+1]$^+$); the third chromatogram shows only L-DOPAM (Base peak m/z 362=[361+1]$^+$); the fourth chromatogram shows only Mannitol ((Base peak m/z 182=[181+1]$^+$), the fifth chromatogram likely shows Norepinephrine (Base peak m/z 169=[168+1]$^+$); and the sixth chromatogram shows an unknown compound (Base peak m/z 237).

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Conjugates

In one embodiment, the present invention provides conjugates of sugars and one or more L-DOPA molecules. In another embodiment, the present invention provides conjugates of sugars and one or more DOPA decarboxylase inhibitors. In another embodiment, the present invention provides conjugates of sugars, one or more L-DOPA molecules, and one or more DOPA decarboxylase inhibitors. In one embodiment, each molecule is conjugated to the sugar via a different hydroxyl group of said sugar.

Thus, in one embodiment, the present invention provides a conjugate comprising a sugar and one or more L-DOPA molecules, one or more DOPA decarboxylase inhibitors, or a combination thereof, wherein the sugar is conjugated to the carboxyl group of the one or more L-DOPA molecules, one or more DOPA decarboxylase inhibitors, or a combination thereof, via a hydroxyl group of the sugar.

In one embodiment, the term "conjugate" as used herein relates to a chemical bond formed between said at least one sugar and said at least one L-DOPA or DOPA decarboxylase inhibitor, wherein said bond is the result of a condensation reaction between at least one hydroxyl group of said at least one sugar molecule and at least one carboxyl group of said at least one L-DOPA and/or at least one DOPA decarboxylase inhibitor molecule. The conjugated moieties share an ester bond formed due to the condensation reaction.

In one embodiment, the conjugates and compositions of the present invention provide the benefit of continuous release of L-DOPA or DOPA decarboxylase inhibitor in the blood of a subject receiving the conjugate or composition, as demonstrated in Examples 4-6, hereinbelow. In another embodiment, attaching L-DOPA to a sugar, such as glucose, exploits the glucose transport mechanism to facilitate transport across the blood-brain barrier and/or other cell membrane barriers.

In one embodiment, the bond between the sugar and the L-DOPA may be hydrolyzed by an esterase into L-DOPA and the sugar. In another embodiment, the bond between the sugar and the DOPA decarboxylase inhibitor may be hydrolyzed by an esterase into DOPA decarboxylase inhibitor and the sugar.

In one embodiment, hydrolysis of the conjugate occurs in the blood. In another embodiment, hydrolysis of the conjugate occurs in the brain.

In another embodiment, the conjugates and compositions of the present invention provide the benefit of providing a subject with multiple L-DOPA or DOPA decarboxylase inhibitors per sugar molecule and/or both L-DOPA and DOPA decarboxylase inhibitor on the same sugar molecule.

In one embodiment, the sugar used in the compositions and methods described herein is a mannitol.

In one embodiment, the conjugates and compositions of the present invention in which mannitol is the sugar provides the subject with an additional therapeutic benefit. In one embodiment, mannitol, which is released by hydrolysis of the conjugates, has a beneficial effect on the subject, which in one embodiment, is via a different mechanism than the therapeutic effect of the L-DOPA. In one embodiment, the therapeutic effect of mannitol for a subject is via its effect on alpha synuclein, which in one embodiment, comprises inhibition of aggregation of α-synuclein.

In one embodiment, the conjugate of a mannitol and one or more L-DOPA is referred to herein as DOPAM. In one embodiment, a conjugate of a mannitol and one or more carbidopa is referred to herein as CARBIDOPAM.

According to this aspect and in one embodiment, the present invention provides a conjugate comprising mannitol and one to six L-DOPA molecules, one or more DOPA decarboxylase inhibitors, or a combination thereof, wherein the mannitol is conjugated to the carboxyl group of the one or more L-DOPA molecules, one or more DOPA decarboxylase inhibitors, or a combination thereof, via a hydroxyl group of the mannitol.

In one embodiment, the bond between the mannitol and the L-DOPA may be hydrolyzed by an esterase into L-DOPA and the mannitol. In another embodiment, the bond between the mannitol and the DOPA decarboxylase inhibitor may be hydrolyzed by an esterase into DOPA decarboxylase inhibitor and the mannitol.

In another embodiment, the present invention provides a compound having the general formula (I), including any stereoisomer or conformer thereof:

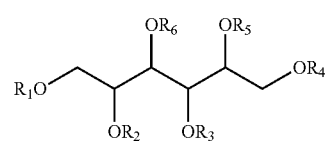

wherein $R_1$-$R_6$ are each selected from H, or a moiety of benserazide (II)

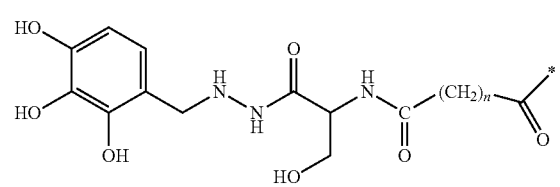

wherein n=1-6
or a moiety having the general formula (III):

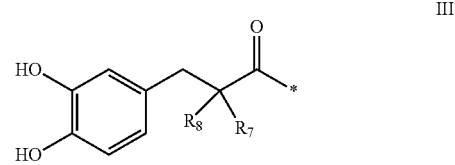

wherein $R_7$ and $R_8$ are each selected from H, —$NH_2$, —$NHNH_2$, —$CH_3$, —$CHF_2$; and
provided that at least one of $R_1$-$R_6$ is a moiety of formula (II).

In one embodiment, $R_7$ is —NW and $R_8$ is H. In another embodiment, $R_7$ is —NHNH and $R_8$ is —$CH_3$. In another embodiment, $R_7$ and $R_8$ are H.

In another embodiment, the present invention provides a conjugate comprising a sugar and one or more phenylalanine derivatives, wherein the sugar is conjugated to the carboxyl group of said one or more phenylalanine derivatives via a hydroxyl group of the sugar. In one embodiment, the phenylalanine derivative comprises L-DOPA. In another embodiment, the phenylalanine derivative comprises carbidopa.

L-DOPA Conjugates

In one embodiment, the present invention provides conjugates of sugars and one or more L-DOPA molecules. Thus, in one embodiment, the present invention provides a conjugate comprising a sugar and one or more L-DOPA molecules, wherein the sugar is conjugated to the carboxyl group of the one or more L-DOPA molecules via a hydroxyl group of the sugar.

As described hereinabove, the conjugates and compositions of the present invention provide the benefit of providing a subject with multiple L-DOPA molecules per sugar molecule.

In one embodiment, the conjugate comprises one molecule of sugar and 1-4 molecules of L-DOPA, wherein the sugar is conjugated to the carboxyl group of the 1-4 L-DOPA molecules via a hydroxyl group of the sugar. In another embodiment, the conjugate comprises 1-6 molecules of L-DOPA per molecule of sugar. In another embodiment, the conjugate comprises 1-2 molecules of L-DOPA per molecule of sugar. In another embodiment, the conjugate comprises 1-3 molecules of L-DOPA per molecule of sugar. In another embodiment, the conjugate comprises 1-5 molecules of L-DOPA per molecule of sugar. In another embodiment, the conjugate comprises 1-7 molecules of L-DOPA per molecule of sugar. In another embodiment, the conjugate comprises 1-8 molecules of L-DOPA per molecule of sugar. In another embodiment, the conjugate comprises 1-9 molecules of L-DOPA per molecule of sugar.

In one embodiment, the conjugate comprises one molecule of sugar and 2-4 molecules of L-DOPA, wherein the sugar is conjugated to the carboxyl group of the 2-4 L-DOPA molecules via a hydroxyl group of the sugar. In another embodiment, the conjugate comprises 2-6 molecules of L-DOPA per molecule of sugar. In another embodiment, the conjugate comprises 2-3 molecules of L-DOPA per molecule of sugar. In another embodiment, the conjugate comprises 2-5 molecules of L-DOPA per molecule of sugar. In another embodiment, the conjugate comprises 2-7 molecules of L-DOPA per molecule of sugar. In another embodiment, the conjugate comprises 2-8 molecules of L-DOPA per molecule of sugar. In another embodiment, the conjugate comprises 2-9 molecules of L-DOPA per molecule of sugar.

In one embodiment, the conjugate comprises one molecule of sugar and 3-4 molecules of L-DOPA, wherein the sugar is conjugated to the carboxyl group of the 3-4 L-DOPA molecules via a hydroxyl group of the sugar. In another embodiment, the conjugate comprises 3-6 molecules of L-DOPA per molecule of sugar. In another embodiment, the conjugate comprises 3-5 molecules of L-DOPA per molecule of sugar. In another embodiment, the conjugate comprises 3-7 molecules of L-DOPA per molecule of sugar. In another embodiment, the conjugate comprises 3-8 molecules of L-DOPA per molecule of sugar. In another embodiment, the conjugate comprises 3-9 molecules of L-DOPA per molecule of sugar.

In one embodiment, the conjugate comprises one molecule of sugar and 4 molecules of L-DOPA, wherein the sugar is conjugated to the carboxyl group of the 4 L-DOPA molecules via a hydroxyl group of the sugar. In another embodiment, the conjugate comprises 4-5 molecules of L-DOPA per molecule of sugar. In another embodiment, the conjugate comprises 4-6 molecules of L-DOPA per molecule of sugar. In another embodiment, the conjugate comprises 4-7 molecules of L-DOPA per molecule of sugar. In another embodiment, the conjugate comprises 4-8 molecules of L-DOPA per molecule of sugar. In another embodiment, the conjugate comprises 4-9 molecules of L-DOPA per molecule of sugar.

In another embodiment, the conjugate as described herein comprises a sugar molecule and a single L-DOPA molecule. In another embodiment, the conjugate as described herein comprises a sugar molecule and two molecules of L-DOPA. In another embodiment, the conjugate as described herein comprises a sugar molecule and three molecules of L-DOPA. In another embodiment, the conjugate as described herein comprises a sugar molecule and four molecules of L-DOPA. In another embodiment, the conjugate as described herein comprises a sugar molecule and five molecules of L-DOPA. In another embodiment, the conjugate as described herein comprises a sugar molecule and six molecules of L-DOPA. In another embodiment, the conjugate as described herein comprises a sugar molecule and seven molecules of L-DOPA. In another embodiment, the conjugate as described herein comprises a sugar molecule and eight molecules of L-DOPA. In another embodiment, the conjugate as described herein comprises a sugar molecule and nine or more molecules of L-DOPA.

In one embodiment, the sugar comprises mannitol. In one embodiment, the conjugate comprises 1-4 molecules of L-DOPA per molecule of mannitol, wherein the mannitol is conjugated to the carboxyl group of the 1-4 L-DOPA molecules via a hydroxyl group of the mannitol.

In another embodiment, the conjugate as described herein comprises a mannitol and a single L-DOPA molecule. In another embodiment, the conjugate as described herein comprises a mannitol and two molecules of L-DOPA. In another embodiment, the conjugate as described herein comprises a mannitol and three molecules of L-DOPA. In another embodiment, the conjugate as described herein comprises a mannitol and four molecules of L-DOPA. In another embodiment, the conjugate as described herein comprises a mannitol and five molecules of L-DOPA. In another embodiment, the conjugate as described herein comprises a mannitol and six molecules of L-DOPA.

DOPA Decarboxylase Inhibitor Conjugates

In another embodiment, the present invention provides a conjugate comprising a sugar and one or more inhibitors of DOPA decarboxylase, wherein the sugar is conjugated to the carboxyl group of the one or more inhibitors of DOPA decarboxylase via a hydroxyl group of the sugar.

In another embodiment, the present invention provides a conjugate comprising a sugar and one or more inhibitors of DOPA decarboxylase, wherein the sugar is conjugated to the carboxyl group of a spacer or linker bound to the one or more inhibitors of DOPA decarboxylase via a hydroxyl group of the sugar. In one embodiment, the spacer comprises dicarboxylic acid.

In another embodiment, the present invention provides a conjugate comprising a sugar and one or more molecules of carbidopa, an inhibitor of DOPA decarboxylase, wherein the sugar is conjugated to the carboxyl group of the one or more carbidopa molecules via a hydroxyl group of said sugar. In one embodiment, the conjugate further comprises a second decarboxylase inhibitor. In one embodiment, the second decarboxylase inhibitor comprises benserazide.

In another embodiment, the present invention provides a conjugate comprising a sugar and one or more benserazide moieties. In one embodiment, the benserazide, an inhibitor of DOPA decarboxylase, is bound via its amine group to one carboxylic group of a dicarboxylic acid, which is used as a spacer, while the other carboxylic group of the spacer is bound to the hydroxyl group of said sugar.

As described hereinabove, the conjugates and compositions of the present invention provide the benefit of providing a subject with multiple DOPA decarboxylase inhibitor molecules per sugar molecule.

In one embodiment, the conjugate comprises one molecule of sugar and 1-4 molecules of DOPA decarboxylase inhibitor, wherein the sugar is conjugated to the 1-4 DOPA decarboxylase inhibitor molecules as described hereinabove. In another embodiment, the conjugate comprises 1-6 molecules of DOPA decarboxylase inhibitor per molecule of sugar. In another embodiment, the conjugate comprises 1-2 molecules of DOPA decarboxylase inhibitor per molecule of sugar. In another embodiment, the conjugate comprises 1-3 molecules of DOPA decarboxylase inhibitor per molecule of sugar. In another embodiment, the conjugate comprises 1-5 molecules of DOPA decarboxylase inhibitor per molecule of sugar. In another embodiment, the conjugate comprises 1-7 molecules of DOPA decarboxylase inhibitor per molecule of sugar. In another embodiment, the conjugate comprises 1-8 molecules of DOPA decarboxylase inhibitor per molecule of sugar. In another embodiment, the conjugate comprises 1-9 molecules of DOPA decarboxylase inhibitor per molecule of sugar.

In one embodiment, the conjugate comprises one molecule of sugar and 2-4 molecules of DOPA decarboxylase inhibitor, wherein the sugar is conjugated to the carboxyl group of the 2-4 DOPA decarboxylase inhibitor molecules via a hydroxyl group of the sugar. In another embodiment, the conjugate comprises 2-6 molecules of DOPA decarboxylase inhibitor per molecule of sugar. In another embodiment, the conjugate comprises 2-3 molecules of DOPA decarboxylase inhibitor per molecule of sugar. In another embodiment, the conjugate comprises 2-5 molecules of DOPA decarboxylase inhibitor per molecule of sugar. In another embodiment, the conjugate comprises 2-7 molecules of DOPA decarboxylase inhibitor per molecule of sugar. In another embodiment, the conjugate comprises 2-8 molecules of DOPA decarboxylase inhibitor per molecule of sugar. In another embodiment, the conjugate comprises 2-9 molecules of DOPA decarboxylase inhibitor per molecule of sugar.

In one embodiment, the conjugate comprises one molecule of sugar and 3-4 molecules of DOPA decarboxylase inhibitor, wherein the sugar is conjugated to the carboxyl group of the 3-4 DOPA decarboxylase inhibitor molecules via a hydroxyl group of the sugar.

In another embodiment, the conjugate comprises 3-6 molecules of DOPA decarboxylase inhibitor per molecule of sugar. In another embodiment, the conjugate comprises 3-5 molecules of DOPA decarboxylase inhibitor per molecule of sugar. In another embodiment, the conjugate comprises 3-7 molecules of DOPA decarboxylase inhibitor per molecule of sugar. In another embodiment, the conjugate comprises 3-8 molecules of DOPA decarboxylase inhibitor per molecule of sugar. In another embodiment, the conjugate comprises 3-9 molecules of DOPA decarboxylase inhibitor per molecule of sugar.

In one embodiment, the conjugate comprises one molecule of sugar and 4 molecules of DOPA decarboxylase inhibitor, wherein the sugar is conjugated to the carboxyl group of the 4 DOPA decarboxylase inhibitor molecules via a hydroxyl group of the sugar. In another embodiment, the conjugate comprises 4-5 molecules of DOPA decarboxylase inhibitor per molecule of sugar. In another embodiment, the conjugate comprises 4-6 molecules of DOPA decarboxylase inhibitor per molecule of sugar. In another embodiment, the conjugate comprises 4-7 molecules of DOPA decarboxylase inhibitor per molecule of sugar. In another embodiment, the conjugate comprises 4-8 molecules of DOPA decarboxylase inhibitor per molecule of sugar. In another embodiment, the conjugate comprises 4-9 molecules of DOPA decarboxylase inhibitor per molecule of sugar.

In another embodiment, the conjugate as described herein comprises a sugar molecule and a single DOPA decarboxylase inhibitor molecule. In another embodiment, the conjugate as described herein comprises a sugar molecule and two molecules of DOPA decarboxylase inhibitor. In another embodiment, the conjugate as described herein comprises a sugar molecule and three molecules of DOPA decarboxylase inhibitor. In another embodiment, the conjugate as described herein comprises a sugar molecule and four molecules of DOPA decarboxylase inhibitor. In another embodiment, the conjugate as described herein comprises a sugar molecule and five molecules of DOPA decarboxylase inhibitor. In another embodiment, the conjugate as described herein comprises a sugar molecule and six molecules of DOPA decarboxylase inhibitor. In another embodiment, the conjugate as described herein comprises a sugar molecule and seven molecules of DOPA decarboxylase inhibitor. In another embodiment, the conjugate as described herein comprises a sugar molecule and eight molecules of DOPA decarboxylase inhibitor. In another embodiment, the conjugate as described herein comprises a sugar molecule and nine or more molecules of DOPA decarboxylase inhibitor.

In one embodiment, the sugar comprises mannitol. In one embodiment, the conjugate comprises 1-4 molecules of DOPA decarboxylase inhibitor per molecule of mannitol, wherein the mannitol is conjugated to the carboxyl group of the 1-4 DOPA decarboxylase inhibitor molecules via a hydroxyl group of the mannitol.

In another embodiment, the conjugate as described herein comprises a mannitol and a single DOPA decarboxylase inhibitor molecule. In another embodiment, the conjugate as described herein comprises a mannitol and two molecules of DOPA decarboxylase inhibitor. In another embodiment, the conjugate as described herein comprises a mannitol and three molecules of DOPA decarboxylase inhibitor. In another embodiment, the conjugate as described herein comprises a mannitol and four molecules of DOPA decarboxylase inhibitor. In another embodiment, the conjugate as described herein comprises a mannitol and five molecules of DOPA decarboxylase inhibitor. In another embodiment, the conjugate as described herein comprises a mannitol and six molecules of DOPA decarboxylase inhibitor.

L-DOPA and DOPA Decarboxylase Inhibitor(s) Conjugated to the Same Sugar Molecule In another embodiment, the present invention provides conjugates of sugars, one or more L-DOPA molecules, and one or more DOPA decarboxylase inhibitors.

In another embodiment, the present invention provides a conjugate comprising mannitol, one or more molecules of L-DOPA and one or more molecules of a DOPA decarboxylase inhibitor. In one embodiment, a conjugate comprising both L-DOPA and a DOPA decarboxylase inhibitor more effectively prevents conversion of L-DOPA to dopamine in the blood circulation and tissues outside of the brain.

In another embodiment, the present invention provides a conjugate comprising one molecule of mannitol, four or more molecules of L-DOPA, and a) one or more molecules of carbidopa or b) one or more moieties of benserazide attached to dicarboxylic acid, wherein the mannitol is conjugated to the carboxyl groups of the L-DOPA or of the carbidopa molecules, or of the benserazide moieties bound to dicarboxylic acid, via hydroxyl groups of the mannitol.

In another embodiment, the present invention provides a conjugate comprising mannitol, four molecules of L-DOPA and one molecule of carbidopa, wherein the mannitol is conjugated to the carboxyl groups of the L-DOPA and the carbidopa molecules via hydroxyl groups of the mannitol and carbidopa.

In another embodiment, the present invention provides a conjugate comprising a sugar and two or more phenylalanine derivatives, wherein the sugar is conjugated to the carboxyl group of one or more L-DOPA molecules and the carboxyl group of one or more carbidopa molecules, each via a different hydroxyl group of said sugar.

In one embodiment, a conjugate as described herein comprises a sugar, one DOPA decarboxylase inhibitor, and one or more L-DOPA molecules. In another embodiment, a conjugate as described herein comprises a sugar, two DOPA decarboxylase inhibitors, and one or more L-DOPA molecules. In another embodiment, a conjugate as described herein comprises a sugar, three DOPA decarboxylase inhibitors, and one or more L-DOPA molecules. In another embodiment, a conjugate as described herein comprises a sugar, four DOPA decarboxylase inhibitors, and one or more L-DOPA molecules. In another embodiment, a conjugate as described herein comprises a sugar, five DOPA decarboxylase inhibitors, and one or more L-DOPA molecules. In another embodiment, a conjugate as described herein comprises a sugar, six DOPA decarboxylase inhibitors, and one or more L-DOPA molecules. In another embodiment, a conjugate as described herein comprises a sugar, seven DOPA decarboxylase inhibitors, and one or more L-DOPA molecules. In another embodiment, a conjugate as described herein comprises a sugar, eight DOPA decarboxylase inhibitors, and one or more L-DOPA molecules. In another embodiment, a conjugate as described herein comprises a sugar, nine or more DOPA decarboxylase inhibitors, and one or more L-DOPA molecules. In one embodiment, each are attached to a different OH group of the sugar.

In another embodiment, a conjugate as described herein comprises a sugar, one or more DOPA decarboxylase inhibitors, and one L-DOPA molecule. In another embodiment, a conjugate as described herein comprises a sugar, one or more DOPA decarboxylase inhibitors, and two L-DOPA molecules. In another embodiment, a conjugate as described herein comprises a sugar, one or more DOPA decarboxylase inhibitors, and three L-DOPA molecules. In another embodiment, a conjugate as described herein comprises a sugar, one or more DOPA decarboxylase inhibitors, and four L-DOPA molecules. In another embodiment, a conjugate as described herein comprises a sugar, one or more DOPA decarboxylase inhibitors, and five L-DOPA molecules. In another embodiment, a conjugate as described herein comprises a sugar, one or more DOPA decarboxylase inhibitors, and six L-DOPA molecules. In another embodiment, a conjugate as described herein comprises a sugar, one or more DOPA decarboxylase inhibitors, and seven L-DOPA molecules. In another embodiment, a conjugate as described herein comprises a sugar, one or more DOPA decarboxylase inhibitors, and eight L-DOPA molecules. In another embodiment, a conjugate as described herein comprises a sugar, one or more DOPA decarboxylase inhibitors, and nine or more L-DOPA molecules.

Sugars

In one embodiment, a conjugate of the present invention as described herein comprises a sugar.

In one embodiment, the term "sugar" as used herein includes any type of saccharide known in the art, including any conformer, anomer, or structural isomer thereof and any stereoisomer (enantiomer and/or diastereomer) thereof. In one embodiment, the sugar is a cyclic conformer structure, and, in another embodiment, the sugar is a linear conformer structure. In one embodiment, a saccharide as described herein corresponds to the chemical formula: $C_m(H_2O)_n$ (in one embodiment, m=n; in another embodiment, m does not equal n). In one embodiment, the term "saccharide" in the context of the present invention includes also D-saccharide, L-saccharide, alpha-saccharide, beta-saccharide and any combinations thereof.

In another embodiment, the sugar comprises a sugar alcohol. In one embodiment, the sugar alcohol in the compositions and for use in the methods as described herein is derived from a sugar. In some embodiments, at least one sugar as described herein comprises a sugar alcohol having the following formula $HOCH_2(CHOH)_nCH_2OH$; wherein n is 4-6.

In some embodiments, a sugar as described herein comprises a monosaccharide, disaccharide, oligosaccharide, or polysaccharide.

In one embodiment, the sugar comprises a monosaccharide.

In one embodiment, the monosaccharide comprises mannose. In another embodiment, the monosaccharide comprises glucose, galactose, or a combination thereof. In another embodiment, the monosaccharide comprises fructose, arabinose, fucose, xylose, rhamnose, inositol, lactose, maltol, ribose or a combination thereof.

In another embodiment, the sugar comprises a disaccharide. In one embodiment, the disaccharide comprises sucrose, maltose, lactose, lactulose, trehalose, cellobiose or a combination thereof.

In another embodiment, the sugar comprises an oligosaccharide. In one embodiment, the oligosaccharide comprises raffinose, gentianose and maltotriose.

In another embodiment, the sugar comprises a polysaccharide. In one embodiment, the polysaccharide comprises starch, glycogen, cellulose, arabinoxylan, pectin, chitin or a combination thereof.

In one embodiment, the sugar alcohol is derived from a monosaccharide, disaccharide, or polysaccharide.

In one embodiment, the sugar alcohol derived from a monosaccharide comprises mannitol.

In another embodiment, the sugar alcohol comprises sorbitol, xylitol, erythritol, isomalt, maltitol, hydrogenated starch hydrolysates, lactitol, or a combination thereof.

Pharmaceutical Compositions

In another embodiment, the present invention provides a pharmaceutical composition comprising a conjugate as described herein and a pharmaceutically acceptable carrier. In another embodiment, the present invention provides a pharmaceutical composition comprising a conjugate as described herein formulated in a pharmaceutically acceptable carrier.

In another embodiment, the present invention provides a pharmaceutical composition comprising a conjugate comprising a sugar and one or more molecules of L-DOPA, one or more inhibitors of DOPA decarboxylase, or a combination thereof, wherein the sugar is conjugated to the carboxyl group of the one or more molecules of L-DOPA, one or more inhibitors of DOPA decarboxylase, or combination thereof, via a hydroxyl group of the sugar, and a pharmaceutically acceptable carrier.

In another embodiment, the present invention provides a pharmaceutical composition comprising a conjugate comprising mannitol and one to six L-DOPA molecules, wherein the mannitol is conjugated to the carboxyl group of the one or more L-DOPA molecules via a hydroxyl group of the mannitol and a pharmaceutically acceptable carrier.

In another embodiment, the present invention provides a pharmaceutical composition comprising a conjugate of mannitol and one or more (up to 6) L-DOPA molecules, wherein the mannitol is conjugated to the carboxyl group of the one or more L-DOPA molecules via a hydroxyl group of the mannitol and formulated in a pharmaceutically acceptable carrier.

In another embodiment, the present invention provides a pharmaceutical composition comprising a conjugate comprising a sugar and two or more L-DOPA molecules, wherein the sugar is conjugated to the carboxyl group of the two or more L-DOPA molecules via hydroxyl groups of the sugar.

In another embodiment, the present invention provides a pharmaceutical composition comprising a conjugate comprising mannitol and one to six inhibitors of DOPA decarboxylase, wherein the mannitol is conjugated to the carboxyl group of the one or more inhibitors of DOPA decarboxylase via a hydroxyl group of the mannitol.

In another embodiment, the present invention provides a pharmaceutical composition comprising a conjugate comprising a sugar and one or more inhibitors of DOPA decarboxylase, wherein the sugar is conjugated to the carboxyl group of the one or more inhibitors of DOPA decarboxylase via a hydroxyl group of the sugar. In one embodiment, the pharmaceutical composition further comprises L-DOPA.

In another embodiment, the present invention provides a pharmaceutical composition comprising a conjugate comprising a sugar and L-DOPA formulated together with unbound (free) inhibitor of DOPA decarboxylase.

In another embodiment, the present invention provides a pharmaceutical composition comprising a conjugate comprising the sugar mannitol and one or more (up to 6) DOPA decarboxylase inhibitor molecules, wherein the DOPA decarboxylase inhibitor may, in one embodiment, comprise carbidopa or benserazide bound to a dicarboxylic acid spacer. In these pharmaceutical compositions, mannitol is conjugated to the carboxyl group of carbidopa or to the carboxyl group of a dicarboxylic acid spacer (which is bound to benserazide) via a hydroxyl group of mannitol and the conjugate is formulated in a pharmaceutically acceptable carrier.

In one embodiment, a DOPA decarboxylase inhibitor as described herein does not cross the BBB. In one embodiment, a DOPA decarboxylase inhibitor as described herein is polar or charged at physiological pH. In another embodiment, a DOPA decarboxylase inhibitor as described herein prevents peripheral conversion of L-DOPA to dopamine and thereby reduces the unwanted peripheral side effects of L-DOPA, such as, inter alia, nausea and vomiting. In another embodiment, the DOPA decarboxylase inhibitor as described herein increases the quantity of L-DOPA in the bloodstream that is available to enter the brain.

In another embodiment, the present invention provides a pharmaceutical composition containing a conjugate comprising a sugar and one or more DOPA decarboxylase inhibitor molecules, wherein the inhibitor may, in one embodiment, comprise carbidopa or benserazide. In these pharmaceutical compositions, the sugar is conjugated to the carboxyl group of carbidopa or to the carboxyl group of a dicarboxylic acid (which is bound to benserazide) via a hydroxyl group of said sugar and the conjugate is formulated in a pharmaceutically acceptable carrier.

In another embodiment, the present invention provides a pharmaceutical composition comprising a conjugate of a sugar and two or more phenylalanine derivatives, wherein the sugar is conjugated to the carboxyl group of the one or more L-DOPA molecules and to the carboxyl group of carbidopa or to the carboxyl group of a dicarboxylic acid (which is bound to benserazide), each via a different hydroxyl group of said sugar and formulated in a pharmaceutically acceptable carrier.

In one embodiment, the pharmaceutical composition is formulated for intravenous, subcutaneous, transdermal, oral, rectal, intraduodenal, or intrapulmonary administration. In another embodiment, the pharmaceutical composition is formulated for intranasal administration.

In one embodiment, the pharmaceutically acceptable carrier is selected from sodium chloride, dextrose, sodium hydroxide, hydrochloric acid sulphuric acid, nitrogen, benzalkonium chloride, ethanol, propylene glycol, beczoyl alcohol, chlorobutanol, methyl paraben, sodium citrate, sodium phosphate, Polysorbate 80, Polysorbate 20, disodium EDTA, CMC, Na CMC, alcohol, PEG 400, propylene glycol and glycerin.

In one embodiment, the pharmaceutical composition further comprises at least one additional therapeutic compound.

In one embodiment, the pharmaceutical composition further comprises one or more excipients. In one embodiment, the pharmaceutical excipient comprises chitosan or hydrolysis fragments of chitosan.

In one embodiment, the additional therapeutic compound comprises a prodrug of L-DOPA.

In one embodiment, the prodrug of L-DOPA comprises levodopa methyl ester which, in one embodiment, comprises Levomet®; an ethyl ester of levodopa which, in one embodiment, comprises Etilevodopa (TV-1203); a pivaloyl ester of levodopa which, in one embodiment, comprises NB-355; an amide Levodopa prodrug which, in one embodiment, comprises an L-dopamide; a Dopimid compound; a dimeric amide levodopa compound; a levodopa ester with a thiazolium moiety; a cyclic levodopa prodrug; ONO-2160, or a combination thereof. In another embodiment, the prodrug is a carrier-mediated prodrug. In one embodiment the L-DOPA or the DOPA decarboxylase inhibitor is linked to an endogenous substrate transporter, which in one embodiment, comprises an amino acid or glucose. In one embodiment, the substrate enables the active transport of L-DOPA or the DOPA decarboxylase inhibitor through the blood-brain barrier (BBB). According to this aspect and in one embodiment, L-DOPA or the DOPA decarboxylase inhibitor is linked to a substrate of the glucose transporter system (GLUT1), large neutral amino acid transporter (LAT1), monocarboxylic acid transporter system (MCT), peptide transport system, or combination thereof.

In another embodiment, the additional therapeutic compound comprises one or more inhibitors of DOPA decarboxylase. In one embodiment, the composition comprises a non-conjugated DOPA decarboxylase inhibitor. In another embodiment, the DOPA decarboxylase inhibitor comprises a conjugated DOPA decarboxylase inhibitor, which is, in one embodiment, a conjugate as described herein.

In one embodiment, the one or more inhibitors of DOPA decarboxylase comprises carbidopa or a prodrug of carbidopa.

In one embodiment, the prodrug of carbidopa comprises an acyl or alkoxycarbonyl group to block the terminal amino group, which, in one embodiment, are cleaved in vivo to liberate carbidopa.

In another embodiment, the prodrug of carbidopa further comprises promoieties masking the catechol moieties of carbidopa.

In another embodiment, the prodrug of carbidopa comprises amides of carbidopa.

In one embodiment, when the prodrug of carbidopa is administered as an additional therapeutic to the conjugate as described herein, the carbidopa prodrug comprises promoieties masking the carboxyl moieties of carbidopa, the catechol moieties of carbidopa, or a combination thereof. In one embodiment, the prodrug of carbidopa comprises carboxyl esters of carbidopa.

In another embodiment, the prodrug of carbidopa comprises carbidopa prodrugs that are cleaved in vivo to liberate dipeptide or dipeptide analogs containing carbidopa. In one embodiment, the dipeptides are further proteolyzed in vivo to produce carbidopa.

In another embodiment, the inhibitor of DOPA decarboxylase comprises, methyldopa, alpha-Difluoromethyl-DOPA (DFMD), or a combination thereof. In another embodiment, the inhibitor of DOPA decarboxylase comprises benserazide, 3',4',5,7-Tetrahydroxy-8-methoxyisoflavone, dimeric diarylpropane or a combination thereof. In one embodiment, the benserazide is bound to a sugar as described herein via a spacer or linker. In one embodiment, the spacer comprises dicarboxylic acid.

In another embodiment, the additional therapeutic compound comprises a catechol-O-methyltransferase (COMT) inhibitor. In one embodiment, the COMT inhibitor comprises entacapone (Comtan®), tolcapone (Tasmar®), opicapone, nitecapone, nebicapone, or a combination thereof, or other COMT inhibitors.

In another embodiment, the additional therapeutic compound comprises a conjugate comprising a sugar and one or more inhibitors of DOPA decarboxylase, wherein the sugar is conjugated to the carboxyl group of the one or more inhibitors of DOPA decarboxylase via a hydroxyl group of the sugar.

In another embodiment, the additional therapeutic compound comprises CVXL-0107, PXT002331 (Foliglurax), Pramipexole, AFQ056 (Mavoglurant), Rasagiline (Azilect®), E2007 (Perampanel), Fipamezole, Rotigotine (Neupro®), Safinamide, KW6002 (Istradefylline), BIIB014, NS2330 (Tesofensine), Tozadenant, Ropinirole, GSK962040, Cabaseril® Cabergoline, SCH900800 (MK-8800), Pardoprunox, KD5040, Icariin (ICA), Nicotine, α lipoic.

In another embodiment, the additional therapeutic compound comprises amantadine, memtime, slegiline, cholinersterase inhibitor, anti-cholinergic agents (in one embodiment, atropine), glutathione, an SSRI, an inhibitor of other monoamines, antipsychotic compound, cannabinoid, or a combination thereof.

In some embodiments, disclosed herein is a pharmaceutical composition comprising any of the conjugates disclosed herein and an unconjugated L-DOPA molecule. In some embodiments, disclosed herein is a pharmaceutical composition comprising mannitol and one to six L-DOPA molecules, wherein the L-DOPA molecules are conjugated to said mannitol by their carboxyl group, and a L-DOPA molecule not conjugated to said mannitol. In some embodiments, disclosed herein is a pharmaceutical composition comprising mannitol and one to six carbidopa molecules, wherein the carbidopa molecules are conjugated to said mannitol by their carboxyl group, and a L-DOPA molecule not conjugated to said mannitol.

In some embodiments, disclosed herein is a pharmaceutical composition comprising any of the conjugates disclosed herein and an unconjugated carbidopa molecule.

In some embodiments, disclosed herein is a pharmaceutical composition comprising mannitol and one to six L-DOPA molecules, wherein the L-DOPA molecules are conjugated to said mannitol by their carboxyl group, and a L-DOPA molecule not conjugated to said mannitol. In some embodiments, disclosed herein is a pharmaceutical composition comprising mannitol and one to six carbidopa molecules, wherein the carbidopa molecules are conjugated to said mannitol by their carboxyl group, and a L-DOPA molecule not conjugated to said mannitol.

Uses of the Conjugates

In one embodiment, the present invention provides a method for treating a medical disorder responsive to dopaminergic stimulation comprising administering to a subject having said medical disorder a therapeutically effective amount of a conjugate as described herein.

In another embodiment, the present invention provides a method for establishing or maintaining a therapeutic level of L-DOPA in the blood, plasma, or serum of a subject, the method comprising administering to a subject having said medical disorder a therapeutically effective amount of a conjugate as described herein. In one embodiment, L-DOPA levels are maintained for several hours.

In another embodiment, the present invention provides a method for increasing the concentration of L-DOPA in the blood, plasma, or serum of a subject, and/or maintaining L-DOPA in the blood circulation for a prolonged period, the method comprising administering to a subject having said medical disorder a therapeutically effective amount of a conjugate as described herein. In one embodiment, L-DOPA concentrations are increased compared to baseline for several hours.

In one embodiment, the concentrations of L-DOPA or DOPA decarboxylase inhibitors in blood, serum, or plasma are increased compared to baseline. In one embodiment, the concentrations of L-DOPA or DOPA decarboxylase inhibitors are increased for several hours, which in one embodiment, is 1-24 hours, in another embodiment, 5-10 hours, in another embodiment, 1-2 hours, in another embodiment, 1-5 hours, in another embodiment, 1-10 hours, in another embodiment, 1-15 hours, in another embodiment, 1-20 hours, in another embodiment, 5-15 hours, in another embodiment, 5-20 hours, in another embodiment, 10-15 hours, in another embodiment, 10-20 hours. In another embodiment, concentrations are increased for 1-5 days, which is one embodiment, comprises 1, 2, 3, 4, or 5 days.

In another embodiment, the present invention provides a method for suppressing a medical disorder responsive to dopaminergic stimulation comprising administering to a subject having said medical disorder a therapeutically effective amount of a conjugate as described herein. In another embodiment, the present invention provides a method for inhibiting a medical disorder responsive to dopaminergic stimulation comprising administering to a subject having said medical disorder a therapeutically effective amount of a conjugate as described herein.

In one embodiment, the present invention provides a method for treating a medical disorder responsive to dopaminergic stimulation comprising administering to a subject having said medical disorder a therapeutically effective amount of a composition comprising a conjugate as described herein and a pharmaceutically acceptable carrier. In another embodiment, the present invention provides a method for suppressing a medical disorder responsive to dopaminergic stimulation comprising administering to a subject having said medical disorder a therapeutically effective amount of a composition comprising a conjugate as described herein and a pharmaceutically acceptable carrier. In another embodiment, the present invention provides a method for inhibiting a medical disorder responsive to dopaminergic stimulation comprising administering to a subject having said medical disorder a therapeutically effective amount of a composition comprising a conjugate as described herein and a pharmaceutically acceptable carrier.

In one embodiment, the present invention provides a method for treating a movement disorder comprising administering to a subject having said movement disorder a therapeutically effective amount of a conjugate as described herein. In another embodiment, the present invention provides a method for suppressing a movement disorder comprising administering to a subject having said movement disorder a therapeutically effective amount of a conjugate as described herein. In another embodiment, the present invention provides a method for inhibiting a movement disorder comprising administering to a subject having said movement disorder a therapeutically effective amount of a conjugate as described herein.

In one embodiment, the present invention provides a method for treating a movement disorder comprising administering to a subject having said movement disorder a therapeutically effective amount of a composition comprising a conjugate as described herein and a pharmaceutically acceptable carrier. In another embodiment, the present invention provides a method for suppressing a movement disorder comprising administering to a subject having said movement disorder a therapeutically effective amount of a composition comprising a conjugate as described herein and a pharmaceutically acceptable carrier. In another embodiment, the present invention provides a method for inhibiting a movement disorder comprising administering to a subject having said movement disorder a therapeutically effective amount of a composition comprising a conjugate as described herein and a pharmaceutically acceptable carrier.

In another embodiment, the present invention provides method for treating, suppressing or inhibiting a movement disorder comprising administering to the subject having the movement disorder a therapeutically effective amount of either a conjugate comprising mannitol and one to six L-DOPA molecules, wherein the mannitol is conjugated to the carboxyl group of the one or more L-DOPA molecules via a hydroxyl group of the mannitol or a pharmaceutical composition comprising the conjugate and a pharmaceutically acceptable carrier.

In another embodiment, the present invention provides a method for treating, suppressing or inhibiting a movement disorder comprising administering to a subject having the movement disorder a therapeutically effective amount of either a conjugate comprising a sugar and one or more L-DOPA molecules, wherein the sugar is conjugated to the carboxyl group of the one or more L-DOPA molecules via a hydroxyl group of the sugar or a pharmaceutical composition comprising the conjugate and a pharmaceutically acceptable carrier.

In another embodiment, the present invention provides a method for treating, suppressing or inhibiting a movement disorder comprising administering to a subject having the movement disorder a therapeutically effective amount of either a conjugate comprising a sugar and two or more L-DOPA molecules, wherein the sugar is conjugated to the carboxyl group of the two or more L-DOPA molecules via a hydroxyl group of the sugar or a pharmaceutical composition comprising the conjugate and a pharmaceutically acceptable carrier.

In another embodiment, the present invention provides a method for treating, suppressing or inhibiting a movement disorder comprising administering to a subject having the movement disorder a therapeutically effective amount of either a conjugate comprising a sugar and one or more inhibitors of DOPA decarboxylase, wherein the sugar is conjugated to the carboxyl group of the one or more inhibitors of DOPA decarboxylase via a hydroxyl group of the sugar or a pharmaceutical composition comprising the conjugate and a pharmaceutically acceptable carrier.

In another embodiment, the present invention provides a method for treating, suppressing or inhibiting a movement disorder comprising administering to a subject having the movement disorder a therapeutically effective amount of a conjugate comprising a sugar and two or more molecules of phenylalanine derivatives, wherein a first phenylalanine derivative comprises an L-DOPA molecule and a second phenylalanine derivative comprises either carbidopa or benserazide, wherein said sugar is conjugated to the carboxyl group of said L-DOPA molecule and to either the carboxyl group of said carbidopa molecule or to the carboxyl group of dicarboxylic acid bound to benserazide, each via a hydroxyl groups of said sugar, or a pharmaceutical composition comprising the conjugate mentioned above formulated in a pharmaceutically acceptable carrier.

In one embodiment, the treatment of the movement disorder requires continuous dopaminergic stimulation.

In one embodiment, the term "movement disorder" as used herein refers to a neurological condition that affects the speed, fluency, quality, and ease of movement. In one embodiment, abnormal fluency or speed of movement that may involve excessive or involuntary movement (dyskinesia and hyperkinesia), tremors, akathisia, or, in another embodiment, it may involve slowed or absent voluntary movement (hypokinesia, such as akinesia and bradykinesia). In another embodiment, the movement disorder comprises freezing of gait and tonus disorder like dystonia.

In one embodiment, the movement disorder comprises Parkinson's Disease (PD).

In one embodiment, the PD is diagnosed according to the UK brain bank criteria or any other criteria for PD or parkinsonism.

In one embodiment, the methods of the present invention provide therapeutic efficacy to subjects with symptomatic PD. In another embodiment, the methods of the present invention provide therapeutic efficacy to subjects with advanced or late-stage PD.

In another embodiment, the subjects with PD experience motor symptoms. In another embodiment, advanced PD patients experience late motor complications. including wearing off and motor fluctuations.

In another embodiment, the subjects with PD have advanced PD. In another embodiment, the subject with PD have advanced PD and experience motor fluctuations. In one embodiment, the motor fluctuations cause expected or unexpected changes between good mobility, severe immobility, or uncontrolled or excess movement. In one embodiment, the motor fluctuations are termed the "on-off phenomenon" or "on-off fluctuations." In one embodiment, the "on-off phenomenon" is attributed to oral, intermittent L-DOPA administration. Thus, according to this aspect and in one embodiment, the conjugates and compositions of the present invention may prevent or decrease the severity, frequency, or both of the "on-off phenomenon." In one embodiment, the conjugates and compositions of the present invention may delay the premature wearing-off of L-DOPA benefits, or in another embodiment, may extend the period of action of L-DOPA.

In one embodiment, the methods of the present invention provide methods of treating subjects with morning akinesia. In one embodiment, morning akinesia is the most common, and often, the first motor complication of PD. In one embodiment morning akinesia reflects the nocturnal decline in the stimulation of the dopaminergic system.

In another embodiment, the PD comprises advanced Parkinson's disease with motor complications.

In another embodiment, the methods as described herein are useful for reversing, preventing, or ameliorating shorter effective periods of L-DOPA administration, which, in one embodiment, occur in late stage PD. In another embodiment, the methods as described herein decrease the frequency of administration of L-DOPA or, in another embodiment, decrease the number of L-DOPA daily doses administered to a subject.

In another embodiment, the PD comprises idiopathic PD.

In another embodiment, the PD comprises post-encephalitic parkinsonism.

In another embodiment, the movement disorder comprises symptomatic parkinsonism following carbon monoxide intoxication or manganese intoxication.

In another embodiment, the movement disorder comprises dopamine-responsive dystonia.

In one embodiment, the dopamine-responsive dystonia comprises Segawa syndrome.

In another embodiment, the movement disorder comprises restless legs syndrome.

In another embodiment, the movement disorder comprises one or more of the Parkinson plus syndromes.

In one embodiment, the movement disorder comprises vascular (atherosclerotic) or lower body PD.

In one embodiment, the Parkinson plus syndrome comprises a synucleinopathy or a tauopathy.

In another embodiment, the Parkinson plus syndrome comprises multiple system atrophy (MSA), tauopathy-like fronto-temporal degeneration, corticobasal degeneration (CBD), or a combination thereof. In one embodiment, said tauopathy-like fronto-temporal degeneration comprises progressive supranuclear palsy (PSP), Pick's disease, or a combination thereof.

In another embodiment, the Parkinson plus syndrome comprises multiple system atrophy (MSA), progressive supranuclear palsy (PSP), and corticobasal degeneration (CBD), progressive supranuclear palsy (PSP), or corticobasal degeneration (CBD).

In one embodiment, the Parkinson plus syndrome comprises Dementia with Lewy bodies (DLB) or diffused Lewi body dementia (DLBD).

In another embodiment, the Parkinson plus syndrome comprises Pick's disease.

In another embodiment, the Parkinson plus syndrome comprises olivopontocerebellar atrophy.

In another embodiment, the movement disorder comprises a gait disorder, which in one embodiment, comprises freezing of gait (FOG).

In another embodiment, the movement disorder is iatrogenic PD.

In one embodiment, the present invention provides a method for treating a synucleinopathy comprising administering to a subject having said synucleinopathy a therapeutically effective amount of a conjugate as described herein. In another embodiment, the present invention provides a method for suppressing a synucleinopathy comprising administering to a subject having said synucleinopathy a therapeutically effective amount of a conjugate as described herein. In another embodiment, the present invention provides a method for inhibiting a synucleinopathy comprising administering to a subject having said synucleinopathy a therapeutically effective amount of a conjugate as described herein.

In one embodiment, the present invention provides a method for treating a synucleinopathy comprising administering to a subject having said synucleinopathy a therapeutically effective amount of a composition comprising a conjugate as described herein and a pharmaceutically acceptable carrier. In another embodiment, the present invention provides a method for suppressing a synucleinopathy comprising administering to a subject having said synucleinopathy a therapeutically effective amount of a composition comprising a conjugate as described herein and a pharmaceutically acceptable carrier. In another embodiment, the present invention provides a method for inhibiting a synucleinopathy comprising administering to a subject having said synucleinopathy a therapeutically effective amount of a composition comprising a conjugate as described herein and a pharmaceutically acceptable carrier.

In another embodiment, the present invention provides method for treating, suppressing or inhibiting a synucleinopathy comprising administering to the subject having the synucleinopathy a therapeutically effective amount of either a conjugate comprising mannitol and one to six L-DOPA molecules, wherein the mannitol is conjugated to the carboxyl group of the one or more L-DOPA molecules via a hydroxyl group of the mannitol or a pharmaceutical composition comprising the conjugate and a pharmaceutically acceptable carrier.

In another embodiment, the present invention provides a method for treating, suppressing or inhibiting a synucleinopathy comprising administering to a subject having the synucleinopathy a therapeutically effective amount of either a conjugate comprising a sugar and one or more L-DOPA molecules, wherein the sugar is conjugated to the carboxyl group of the one or more L-DOPA molecules via a hydroxyl group of the sugar or a pharmaceutical composition comprising the conjugate and a pharmaceutically acceptable carrier.

In another embodiment, the present invention provides a method for treating, suppressing or inhibiting a synucleinopathy comprising administering to a subject having the synucleinopathy a therapeutically effective amount of either a conjugate comprising a sugar and two or more L-DOPA molecules, wherein the sugar is conjugated to the carboxyl group of the two or more L-DOPA molecules via a hydroxyl group of the sugar or a pharmaceutical composition comprising the conjugate and a pharmaceutically acceptable carrier.

In another embodiment, the present invention provides a method for treating, suppressing or inhibiting a synucleinopathy comprising administering to a subject having the synucleinopathy a therapeutically effective amount of either a conjugate comprising a sugar and one or more inhibitors of DOPA decarboxylase, wherein the sugar is conjugated to the carboxyl group of the one or more inhibitors of DOPA decarboxylase via a hydroxyl group of the sugar or a pharmaceutical composition comprising the conjugate and a pharmaceutically acceptable carrier.

In one embodiment, the conjugate is administered intranasally. In another embodiment, the conjugate is administered intravenously, subcutaneously, transdermally, rectally, intraduodenally, orally or by inhalation.

In one embodiment, the conjugate is administered to the subject in a daily dose of 10-3,000 mg.

In another embodiment, the conjugate is administered to the subject in a daily dose of 10-100, 10-1,000, 10-2,000, 100-500, 100-1,000, 100-1,500, 100-2,000, 100-2,500, 100-3,000, 500-1,000, 500-1,500, 500-2,000, 500-2,500, 500-3,000, 1,000-1,500, 1,000-2,000, 1,000-2,500, 1,000-3,000, 1,500-2,000, 1,500-2,500, 1,500-3,000, 2,000-2,500, 2,000-3,000 or 2,500-3,000 mg.

In one embodiment, the amount of mannitol within the conjugate comprises a daily dose of 5-40 mg. In another embodiment, the amount of mannitol within the conjugate comprises a daily dose of 5-10 mg, 5-15 mg, 5-20 mg, 5-25 mg, 5-30 mg, 5-35 mg, 10-15 mg, 10-20 mg, 10-25 mg, 10-30 mg, 10-35 mg, 10-40 mg, 15-20 mg, 15-25 mg, 15-30 mg, 15-35 mg, 15-40 mg, 20-25 mg, 20-30 mg, 20-35 mg, 20-40 mg, 25-30 mg, 25-35 mg, 25-40 mg, 30-35 mg, 30-40 mg or 35-40 mg.

In one embodiment, the amount of L-DOPA within the conjugate comprises a daily dose of 100-2200 mg. In another embodiment, the amount of L-DOPA within the conjugate comprises a daily dose of 100-500 mg, 100-1000 mg, 100-1500 mg, 100-2000 mg, 500-1000 mg, 500-1500 mg, 500-2000 mg, 500-2200 mg, 1000-1500 mg, 1000-2000 mg, 1000-2200 mg, 1500-2000 mg, 1500-2200 mg or 2000-2200 mg.

In one embodiment, the conjugate is administered to the subject in a single dose. In another embodiment, the conjugate is administered to the subject in multiple doses.

In one embodiment, the active ingredients of the conjugate are released in the blood circulation over an extended period of time. In one embodiment, intravenous, oral, intranasal, rectal, subcutaneous, transdermal or gastrointestinal administration of DOPAM to a subject establishes therapeutic blood concentration of L-DOPA in said subject for at least 30, 60, 90, 120, 180, 240, 300, 360, 420, 480, 540, 600, 660, 720, 780, or 840 minutes. In one embodiment, intravenous administration of DOPAM to a subject esttransablishes therapeutic blood concentration of L-DOPA in said subject for more than 840 minutes.

In some embodiments, the conjugates disclosed herein are used to establish therapeutic L-DOPA blood concentration in a subject for extended periods of time. In another embodiment, the present invention provides a method for establishing therapeutic L-DOPA blood concentration in a subject of need thereof, the method comprising administering to a subject having said medical disorder a therapeutically effective amount of a conjugate as described herein. In one embodiment, the active ingredients comprise mannitol and L-DOPA.

In some embodiments, disclosed herein is a method for treating a medical disorder responsive to dopaminergic stimulation comprising administering to a subject having said medical disorder a therapeutically effective amount of a pharmaceutical composition comprising any of the conjugates disclosed herein and an unconjugated L-DOPA molecule. In some embodiments, disclosed herein is a method for treating a medical disorder responsive to dopaminergic stimulation comprising administering to a subject having said medical disorder a therapeutically effective amount of a pharmaceutical composition comprising mannitol and one to six L-DOPA molecules, wherein the L-DOPA molecules are conjugated to said mannitol by their carboxyl group, and a L-DOPA molecule not conjugated to said mannitol.

In some embodiments, disclosed herein is a method for treating a medical disorder responsive to dopaminergic stimulation comprising administering to a subject having said medical disorder a therapeutically effective amount of a pharmaceutical composition comprising mannitol and one to six carbidopa molecules, wherein the carbidopa molecules are conjugated to said mannitol by their carboxyl group, and a L-DOPA molecule not conjugated to said mannitol.

In some embodiments, disclosed herein is a method for treating a medical disorder responsive to dopaminergic stimulation comprising administering to a subject having said medical disorder a therapeutically effective amount of a pharmaceutical composition comprising any of the conjugates disclosed herein and an unconjugated carbidopa molecule. In some embodiments, disclosed herein is a method for treating a medical disorder responsive to dopaminergic stimulation comprising administering to a subject having said medical disorder a therapeutically effective amount of a pharmaceutical composition comprising mannitol and one to six L-DOPA molecules, wherein the L-DOPA molecules are conjugated to said mannitol by their carboxyl group, and a L-DOPA molecule not conjugated to said mannitol.

In some embodiments, disclosed herein is a method for treating a medical disorder responsive to dopaminergic stimulation comprising administering to a subject having said medical disorder a therapeutically effective amount of a pharmaceutical composition comprising mannitol and one to six carbidopa molecules, wherein the carbidopa molecules are conjugated to said mannitol by their carboxyl group, and a L-DOPA molecule not conjugated to said mannitol.

In another embodiment, methods as described herein additionally comprise administering one or more inhibitors of DOPA decarboxylase. In one embodiment, the DOPA decarboxylase inhibitor comprises a sugar-conjugated DOPA decarboxylase inhibitor as described herein. In another embodiment, the DOPA decarboxylase inhibitor comprises a free, or non-conjugated DOPA decarboxylase inhibitor as described hereinabove.

Methods of Producing

In another embodiment, the present invention provides a method of producing an extended release form of a phenylalanine derivative comprising conjugating a sugar or sugar alcohol with one or more phenylalanine derivatives via one or more ester linkages.

In another embodiment, the present invention provides a method of producing an extended release form of L-DOPA comprising conjugating a sugar or sugar alcohol with one or more L-DOPA molecules via one or more ester linkages.

In another embodiment, the present invention provides a method of producing an extended release form of L-DOPA and mannitol comprising conjugating mannitol with one or more L-DOPA via one or more ester linkages.

In another embodiment, the present invention provides a method of producing an extended release form of L-DOPA, a sugar, or a combination thereof comprising conjugating the sugar with one or more L-DOPA molecules via ester linkages.

In another embodiment, the present invention provides a method of producing an extended release form of a DOPA decarboxylase inhibitor, a sugar, or a combination thereof comprising conjugating the sugar with one or more DOPA decarboxylase inhibitors via one or more ester linkages.

In another embodiment, the present invention provides a process for producing a conjugate of mannitol and one to six L-DOPA molecules comprising the steps of: (a) combining L-DOPA with $SOCl_2$ and $CH_3OH$ to produce methyl-L-DOPA hydrochloride; (b) combining the methyl-L-DOPA hydrochloride with $K_2CO_3$, KI, tetrabutyl ammonium bromide and benzyl bromide in acetonitrile to produce tetrabenzyl methyl L-DOPA; (c) removing methyl group from tetrabenzyl methyl L-DOPA by hydrolyzing tetrabenzyl methyl L-DOPA with NaOH to produce tetrabenzyl L-DOPA; (d) dombining tetrabenzyl L-DOPA with (i) diisopropylidene mannitol, (ii) 1,3:4,6 di-O-benzylidene-D-mannitol, or (iii) (2R,3R,4R,5R)-3,4-bis(benzyloxy)hexane-1,2,5,6-tetraol to produce (i) 1)S,2R)-1,2-bis((R)-2,2-dimethyl-1,3-dioxolan-4-yl)-2-hydroxyethyl 3-(3,4-bis(benzyloxy)phenyl)-2-(dibenzylamino)propanoate, (ii) (4R,4'R,5R,5'R)-2,2'-diphenyl-4,4'-bi(1,3-dioxane)-5,5'-diyl bis(3-(3,4-bis(benzyloxy)phenyl)-2-(dibenzylamino)propanoate), or (iii) (2R,3R,4R,5R)-3,6-bis(benzyloxy)hexane-1,2,4,5-tetrayl tetrakis(3-(3,4-bis(benzyloxy)phenyl)-2-(dibenzylamino) propanoate), respectively; (e) removing benzyl groups from the protected L-DOPA mannitol conjugate of step (d) by hydrogenation with $H_2$, using Pd/C or PdOH/C as a catalyst, thereby producing a conjugate of mannitol and one to six L-DOPA molecules.

In one embodiment, the present invention provides a process of producing (2R,3R,4R,5R)-3,4-bis(benzyloxy) hexane-1,2,5,6-tetraol in step (d) comprises the steps of: (a) adding benzylic groups to diisopropylidene mannitol comprising the step of combining diisopropylidene mannitol with benzyl bromide to produce product (14) and (b) Removing the isopropylidene groups from product (14) comprising the step of combining product (14) with $H_2SO_4$/Silica to remove the isopropylidene groups, thereby producing (2R,3R,4R,5R)-3,4-bis(benzyloxy)hexane-1,2,5,6-tetraol from diisopropylidene mannitol.

In another embodiment, the present invention provides a method of producing an extended release form of a dopamine agonist comprising conjugating a sugar or sugar alcohol with one or more dopamine agonists via one or more ester linkages.

In another embodiment, the present invention provides a method of producing an extended release form of aromatic-L-amino-acid decarboxylase (DOPA decarboxylase) inhibitor comprising conjugating a sugar or sugar alcohol with one or more DOPA decarboxylase inhibitor molecules via one or more ester linkages.

In another embodiment, the present invention provides a method of producing an extended release form of DOPA decarboxylase inhibitor and mannitol comprising conjugating mannitol with one or more DOPA decarboxylase inhibitor via one or more ester linkages.

In another embodiment, the present invention provides a method of producing an extended release form of carbidopa (IUPAC name (2S)-3-(3,4-dihydroxyphenyl)-2-hydrazino-2-methylpropanoic acid) and mannitol comprising conjugating mannitol with one or more carbidopa molecules via one or more ester linkages.

In another embodiment, the present invention provides a method of producing an extended release form of carbidopa, a sugar, or a combination thereof comprising conjugating the sugar with one or more carbidopa molecules via ester linkages.

In another embodiment, the present invention provides a process for producing a conjugate of mannitol and one to six carbidopa molecules comprising the steps of: (i) reacting carbidopa with methanol in the presence of the coupling agent HCl gas to obtain the methyl ester of carbidopa; (ii) reacting the methyl ester of carbidopa with $(Boc)_2O$ to protect the amine group; (iii) treating the compound obtained in (ii) with benzyl bromide in the presence of base ($CsHCO_3$) to provide protection of all the active groups; (iv) removing the methyl group from the carboxylic acid in a mixture of $H_2O/CH_3OH/THF$ in the presence of 0.33M LiOH; (v) obtaining fully protected CARBIDOPAM by reacting the compound of step (iv) with dibenzyl mannitol; (vi) removing the tert-butoxide using trifloroacetic acid; (vii) obtaining CARBIDOPAM by removing the benzylic groups by hydrogenation in methanol, using Pd/C 10% as a catalyst.

Definitions

Unless specifically stated otherwise herein, references made in the singular may also include the plural. For example, "a" and "an" may refer to either one, or one or more.

The definitions set forth herein take precedence over definitions set forth in any patent, patent application, and/or patent application publication incorporated herein by reference.

Listed below are definitions of various terms used to describe the present invention. These definitions apply to the terms as they are used throughout the specification (unless they are otherwise limited in specific instances) either individually or as part of a larger group.

In one embodiment, a composition of the present invention comprises a pharmaceutically acceptable carrier. In one embodiment, the phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

In one embodiment, the term "molecule" as used herein refers to the smallest particle in a chemical element or compound that has the chemical properties of that element or compound. In one embodiment, molecules are made up of atoms that are held together by chemical bonds. These bonds form as a result of the sharing or exchange of electrons among atoms.

In one embodiment, the term "extended release" as used herein refers to a drug or compound that is formulated to be delivered over a prolonged period of time compared to the usual release rate of the native drug or compound.

In one embodiment, the term "administering" as used herein refers to bringing in contact with a compound of the present invention. In one embodiment, the compositions are applied systemically. In another embodiment, the compositions are applied locally. Administration can be accomplished to living organisms, for example humans.

In one embodiment, the terms "administering," "administer," or "administration" refer to deliver one or more compounds or compositions to a subject parenterally, enterally, or topically. Illustrative examples of parenteral administration include, but are not limited to, intravenous, intramuscular, intraarterial, intrathecal, intracapsular, intraorbital, intracardiac, intradermal, intraperitoneal, transtracheal, subcutaneous, subcuticular, intraarticulare, subcapsular, subarachnoid, intraspinal and intrasternal injection and infusion. Illustrative examples of enteral administration include, but are not limited to oral, inhalation, intranasal, sublingual, and rectal administration. Illustrative examples of topical administration include, but are not limited to, transdermal and vaginal administration. In particular embodiments, an agent or composition is administered intranasally.

In one embodiment, a composition of the present invention is administered in a therapeutically effective amount. In one embodiment, a "therapeutically effective amount" is intended to include an amount of a compound of the present invention alone or an amount of the combination of compounds claimed or an amount of a compound of the present invention in combination with other active ingredients effective to for treating, suppressing or inhibiting a movement disorder. In one embodiment, a "therapeutically effective amount" of a composition of the invention is that amount of composition which is sufficient to provide a beneficial effect to the subject to which the composition is administered.

In one embodiment, "treating" or "treatment" cover the treatment of a disease-state in a mammal, particularly in a human, and includes relieving the disease-state, causing regression of the disease state, or a combination thereof.

In one embodiment, "treating" as used herein refers to a therapeutic treatment, wherein the object is to prevent or lessen the targeted pathologic condition or disorder as described hereinabove. Thus, in one embodiment, treating may include directly affecting or curing the disease, disorder or condition, or a combination thereof. Thus, in one embodiment, "treating" refers inter alia to delaying progression, expediting remission, inducing remission, augmenting remission, speeding recovery, increasing efficacy of or decreasing resistance to alternative therapeutics, or a combination thereof.

In another embodiment, the present invention provides prophylactic or preventative measures for affecting a disease, disorder, or condition. In one embodiment, the prophylactic measure comprises preventing the disease-state from occurring in a mammal, in particular, when such mammal is predisposed to the disease-state but has not yet been diagnosed as having it. In one embodiment, "preventing" refers, inter alia, to delaying the onset of the disease, delaying the onset of symptoms, preventing relapse to a disease, decreasing the number or frequency of relapse episodes, increasing latency between symptomatic episodes, or a combination thereof.

In one embodiment, "suppressing" or "inhibiting", refers inter alia to inhibiting the disease-state, arresting disease development, reducing the severity of the disease; reducing the severity of symptoms, reducing the severity of an acute episode, reducing the number of symptoms, reducing the incidence of disease-related symptoms, reducing the latency of symptoms, ameliorating symptoms, reducing secondary symptoms, reducing secondary infections, prolonging patient survival, or a combination thereof.

According to any of the methods of the present invention and in one embodiment, a subject as described herein is human. In another embodiment, the subject is mammalian. In another embodiment, the subject is a primate, which in one embodiment, is a non-human primate. In another embodiment, the subject is murine, which in one embodiment is a mouse, and, in another embodiment is a rat. In another embodiment, the subject is canine, feline, bovine, equine, caprine, ovine, porcine, simian, ursine, vulpine, or lupine. In one embodiment, the subject is a chicken or fish.

In one embodiment, the compositions as described herein comprise the components of the composition (e.g., a conjugate comprising a sugar and one or more L-DOPA molecules, wherein the sugar is conjugated to the carboxyl group of the one or more L-DOPA molecules via a hydroxyl group of the sugar) as well as one or more additional therapeutic compounds. In another embodiment, the compositions as described herein consist of the components of the composition (e.g., a conjugate comprising a sugar and one or more L-DOPA molecules, wherein the sugar is conjugated to the carboxyl group of the one or more L-DOPA molecules via a hydroxyl group of the sugar) as described herein. In another embodiment, the compositions as described herein consist essentially of the components of the composition (e.g., a conjugate comprising a sugar and one or more L-DOPA molecules, wherein the sugar is conjugated to the carboxyl group of the one or more L-DOPA molecules via a hydroxyl group of the sugar) as described herein.

It is to be understood that the compositions and methods of the present invention comprising the elements or steps as described herein may, in another embodiment, consist of those elements or steps, or in another embodiment, consist essentially of those elements or steps. In some embodiments, the term "comprise" as used herein refers to the inclusion of the indicated active agents, such as a conjugate comprising a sugar and one or more L-DOPA molecules or DOPA decarboxy, as well as inclusion of other active agents, and pharmaceutically or physiologically acceptable carriers, excipients, emollients, stabilizers, etc., as are known in the pharmaceutical industry. In some embodiments, the term "consisting essentially of" as used herein refers to a composition, whose only active ingredients are the indicated active ingredients. However, other compounds may be included which are for stabilizing, preserving, etc. the formulation, but are not involved directly in the therapeutic effect of the indicated active ingredients. In some embodiments, the term "consisting essentially of" may refer to components which facilitate the release of the active ingredient. In some embodiments, the term "consisting" as used herein refers to a composition, which contains the active ingredients and a pharmaceutically acceptable carrier or excipient.

Kits

The present invention further comprises combinations of the compositions of the present invention and, optionally, one or more additional agents in kit form, e.g., where they are packaged together or placed in separate packages to be sold together as a kit, or where they are packaged to be formulated together.

In certain embodiments, the kit comprises a therapeutic composition containing an effective amount of a conjugate comprising a) a sugar and b) one or more L-DOPA molecules, one or more DOPA decarboxylase inhibitors, or a combination thereof, wherein the sugar is conjugated to the carboxyl group of the one or more L-DOPA molecules and/or one or more DOPA decarboxylase inhibitors, via a hydroxyl group of the sugar as described herein. In one embodiment, the kit further comprises an additional therapeutic compound. In another embodiment, the kit further comprises a diagnostic for determining if a subject has the disease, disorder, or condition.

In certain embodiments, the kit comprises a sterile container which contains the composition as described herein. In one embodiment, such containers can be boxes, ampules, bottles, vials, tubes, bags, pouches, blister-packs, or other suitable container forms known in the art. Such containers can be made of plastic, glass, laminated paper, metal foil, or other materials suitable for holding medicaments.

If desired, the composition of the invention is provided together with instructions for administering the composition to a subject having or at risk of developing a movement disorder (e.g., Parkinson's disease). The instructions will generally include information about the use of the composition for the treatment or prevention of a movement disorder (e.g., Parkinson's disease). In other embodiments, the instructions include at least one of the following: description of the therapeutic composition; dosage schedule and administration for treatment or prevention of a movement disorder (e.g., Parkinson's disease) or symptoms thereof; precautions; warnings; indications; counter-indications; overdosage information; adverse reactions; animal pharmacology; clinical studies; and/or references. The instructions may be printed directly on the container (when present), or as a label applied to the container, or as a separate sheet, pamphlet, card, or folder supplied in or with the container.

EXAMPLES

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Example 1

L-DOPA-Mannitol and Carbidopa-Mannitol Derivatives

Examples of L-DOPA-mannitol derivatives (FIGS. 1A-1F) and carbidopa-mannitol derivatives (FIGS. 2A-2F) are provided.

Example 2

Synthesis of L-DOPA-Mannitol Derivatives

The synthesis of L-DOPA-mannitol derivatives is a multistep process, which includes protection and deprotection of L-DOPA and mannitol, mainly because of the low solubility of both starting materials in organic solvents.

I. Synthesis of Methyl Ester (2) of L-DOPA

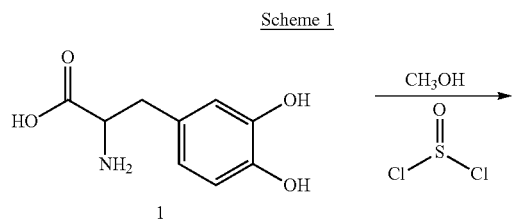

Scheme 1

20 ml of SOCl$_2$ was added dropwise to 100 ml of CH$_3$OH at (−5)-(−10)° C. over the course of 2 h. 10 g (0.05 mol) of L-DOPA (m.w. 197) was then added. The reaction was stirred with a magnetic stirrer at 50° C. for 4 h and left at room temperature overnight.

The solvent was evaporated. About 70 ml of methanol were added, and again the solvent was removed under reduced pressure. 100 ml of diethyl ether were added and the mixture was left in the refrigerator (4° C.) overnight.

After the overnight incubated, precipitate formed. The solvent was decanted. The residue was dissolved in methanol and transferred to the flask. The solvent was removed under the reduced pressure. 17 g (m.w. 247) of product (2) was obtained (contained methanol).

II. Synthesis of Tetrabenzyl Methyl L-DOPA (3)

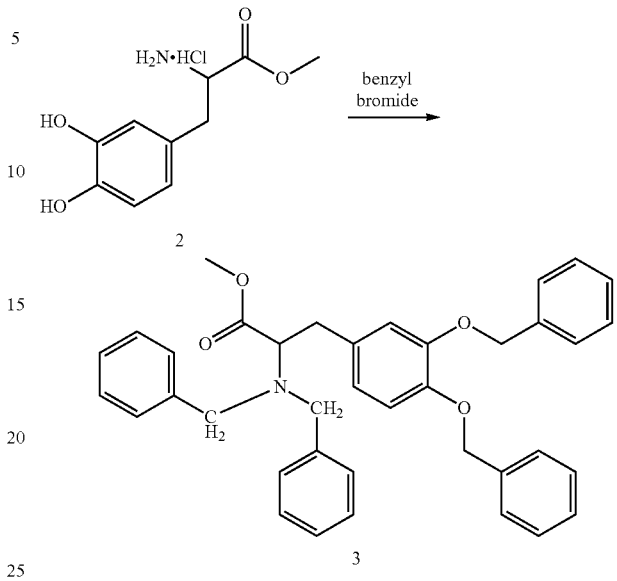

Scheme 2

A mixture of 2.24 g (9.1 mmol) of methyl-L-DOPA hydrochloride (m.w. 247) (2) in 1ml of triethyl amine, 10.6 g of K$_2$CO$_3$ (m.w. 138), 150 mg of KI (ground), 129 mg of tetrabutyl ammonium bromide (m.w. 322) (ground) and 7.5 ml of benzyl bromide (m.w. 171, d=1.44) (anhydrous and distilled) in 105 ml of acetonitrile (dry) was stirred at reflux temp. The reaction was refluxed for 7 h. Chloroform was added, and all solid salts were filtered out. The solvent was removed under the reduced pressure. The crude product (3) was obtained. MS EPCI positive mode m/z=[M+1]$^+$ =572.20. It was purified by column chromatography using 130 g of silica gel for flash chromatography and hexane-ethyl acetate (10%) for column preparation and 20% ethyl acetate in hexane as an eluent. 20 ml fractions were collected and checked by TLC (hexane-ethyl acetate 6:1). 0.95 g 1.66 mol) (m.w. 571) of white solid was obtained. Another fraction contained 1.5 g (2.6 mmol) of the same product. Yield was 47%.

III. Removal of Methyl Group from Tetrabenzyl Methyl L-DOPA (4)

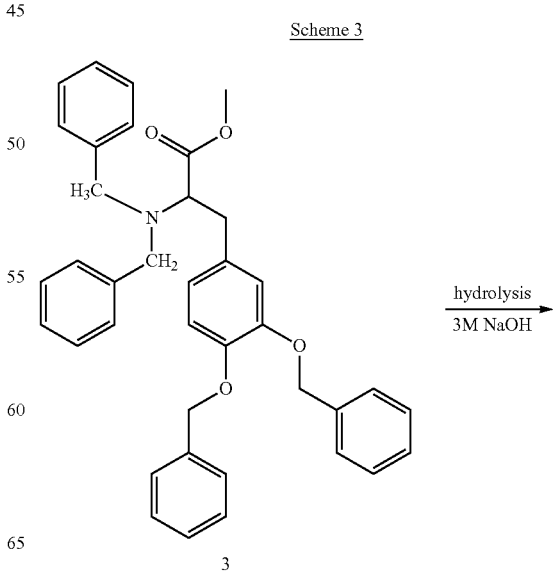

Scheme 3

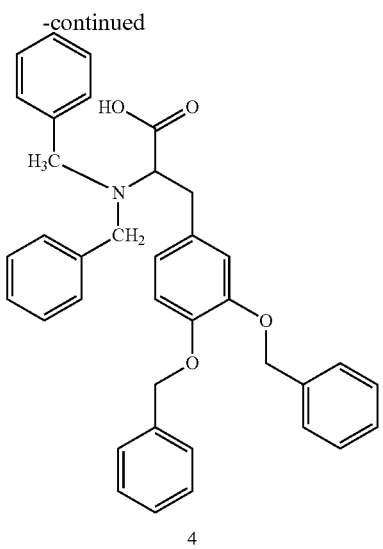

4

0.95 g of (3) were dissolved in 29 ml of CH₃OH+15 ml of THF. 2.5 g of K₂CO₃ in 15 ml of H₂O were added, and the reaction was stirred overnight. No reaction occurred. 10 ml of 3M NaOH were added, and the reaction mixture was stirred at 40° C. for 2.5 h. Then another 7 ml of 3M NaOH and 10 ml of THF were added. The solution became almost clear. TLC (hexane-ethyl acetate 1:1) showed one new spot. Water was added, and the solution was acidified with NaHSO₄ 1M to pH about 2, extracted with CHCl₃, dried over MgSO₄, and the solvent was removed under the reduced pressure.

IV. Conjugation of Tetrabenzyl L-DOPA with Mannitol Derivatives a. Tetrabenzyl L DOPA (4) and diisopropylidene Mannitol (5) Binding to Obtain (1)S,2R)-1,2-bis ((R)-2,2-dimethyl-1,3-dioxolan-4-yl)-2-hydroxyethyl 3-(3,4-bis(benzyloxy)phenyl)-2-(dibenzylamino) propanoate (6)

A solution of 0.52 g (m.w. 206) (2.5 mmol) of DCC in 10 ml of CHCl₃ (dry) was added dropwise to a mixture of 0.98 g of (4) (m.w. 557) 1.79 mmol, 0.196 g of (5) (m.w. 262), 0.75 mmol and DMAP 0.26 g (m.w. 122) in 29 ml CHCl₃ (dry) at temperature (−2° C.)-(−5° C.) during 2 h. The reaction mixture was stirred at room temperature all weekend. MS showed the presence of (6) m/z=[M+1]⁺=802, (7) m/z=[M+1]⁺=1341 and the conjugate of DCC and (4) m/z= [M+1]⁺=764.33. The mixture was filtered, and the solvent was removed by reduced pressure. The product (6) was purified by column chromatography using 100 g of silica gel for flash chromatography and hexane-ethyl acetate (10%) for the preparation of the column and hexane-ethyl acetate (20%) for running the column. 20 ml fractions were collected and checked by TLC (hexane-ethyl acetate 3:2). 0.55 g of pure product (6) (MS) was obtained.

Scheme 4a

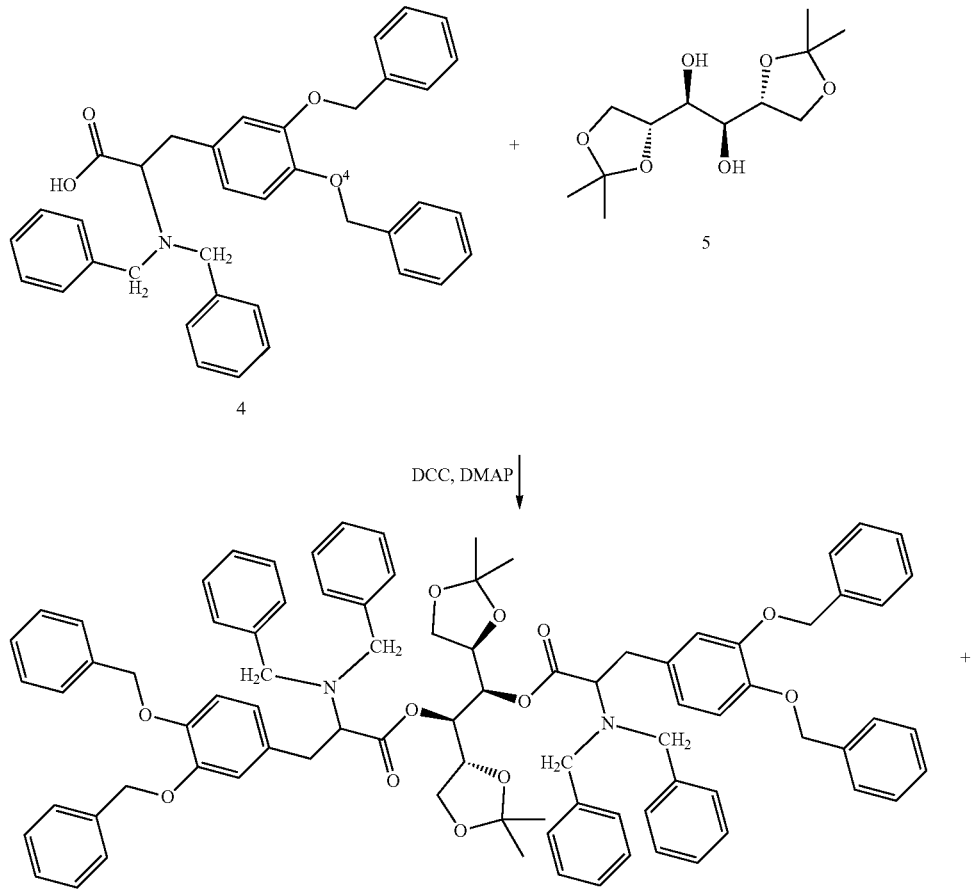

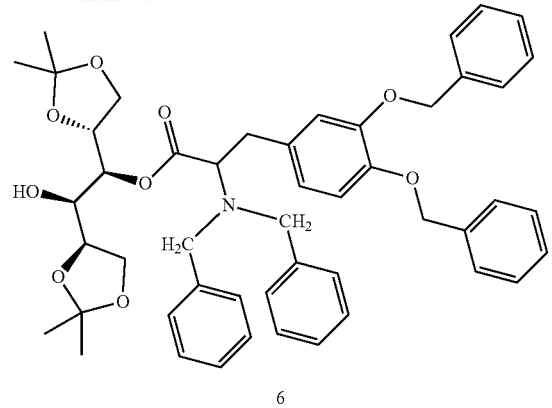

6 b. Tetrabenzyl-L-DOPA (4) Binding to 1,3:4,6 di-O-benzylidene-D-mannitol (10) to Obtain (4R,4'R, 5R,5'R)-2,2'-diphenyl-4,4'-bi(1,3-dioxane)-5,5'-diyl bis(3-(3,4-bis(benzyloxy)phenyl)-2-(dibenzylamino)propanoate) (11)

The reaction (Scheme 4b) was performed as described in Stage IV (a) above. Mainly, product (11) was obtained according to the MS. The product was purified by crystallization. First, the solvent was partially removed under reduced pressure, methanol was added, and the mixture was kept in a freezer overnight. The residue obtained after the decantation was recrystallized from ether-methanol. TLC (hexane-ethyl acetate 6:4) showed one spot. m/z=[M+1]$^+$= 1437.39.

Scheme 4b

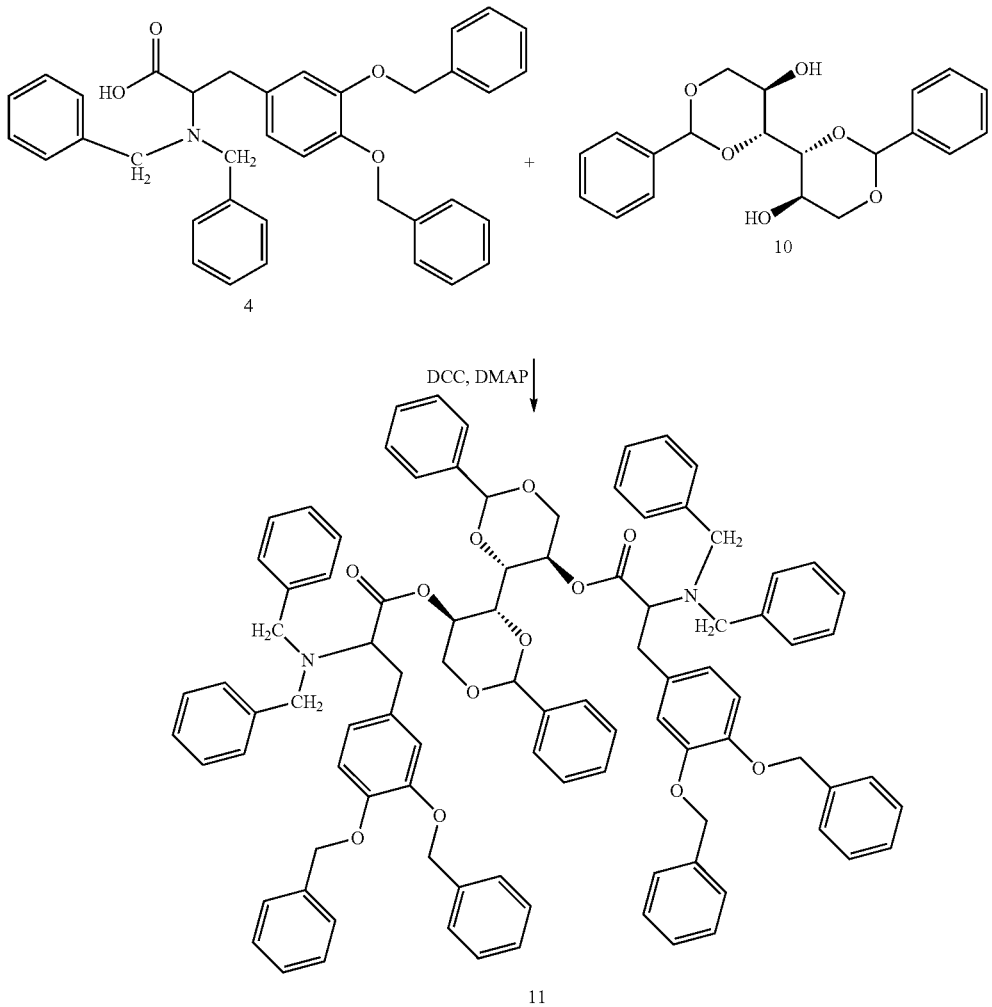

c. Tetrabenzyl-L-DOPA (4) Binding to (2R,3R,4R, 5R)-3,4-bis(benzyloxy)hexane-1,2,5,6-tetraol (15) to Obtain (2R,3R,4R,5R)-3,6-bis(benzyloxy)hexane-1, 2,4,5-tetrayl tetrakis(3-(3,4-bis(benzyloxy)phenyl)-2-(dibenzylamino)propanoate) (16) (Scheme 4c)

The reaction was performed as described in Stage IV(a) above.

After the reaction the mixture was filtered, the solvent was removed under the reduced pressure, methanol was added, and the mixture was kept in a freezer overnight. The solvent was decanted. The residue was recrystallized from ether with methanol twice. 0.53 g of product (16) was obtained.

MS m/z=[M+1]/2$^+$=1261.27. MS was performed with addition of formic acid. There was a double charge on the molecule due to the presence of amine groups, and thus MS showed [M+1]/2$^+$=1261.27.

Scheme 4c

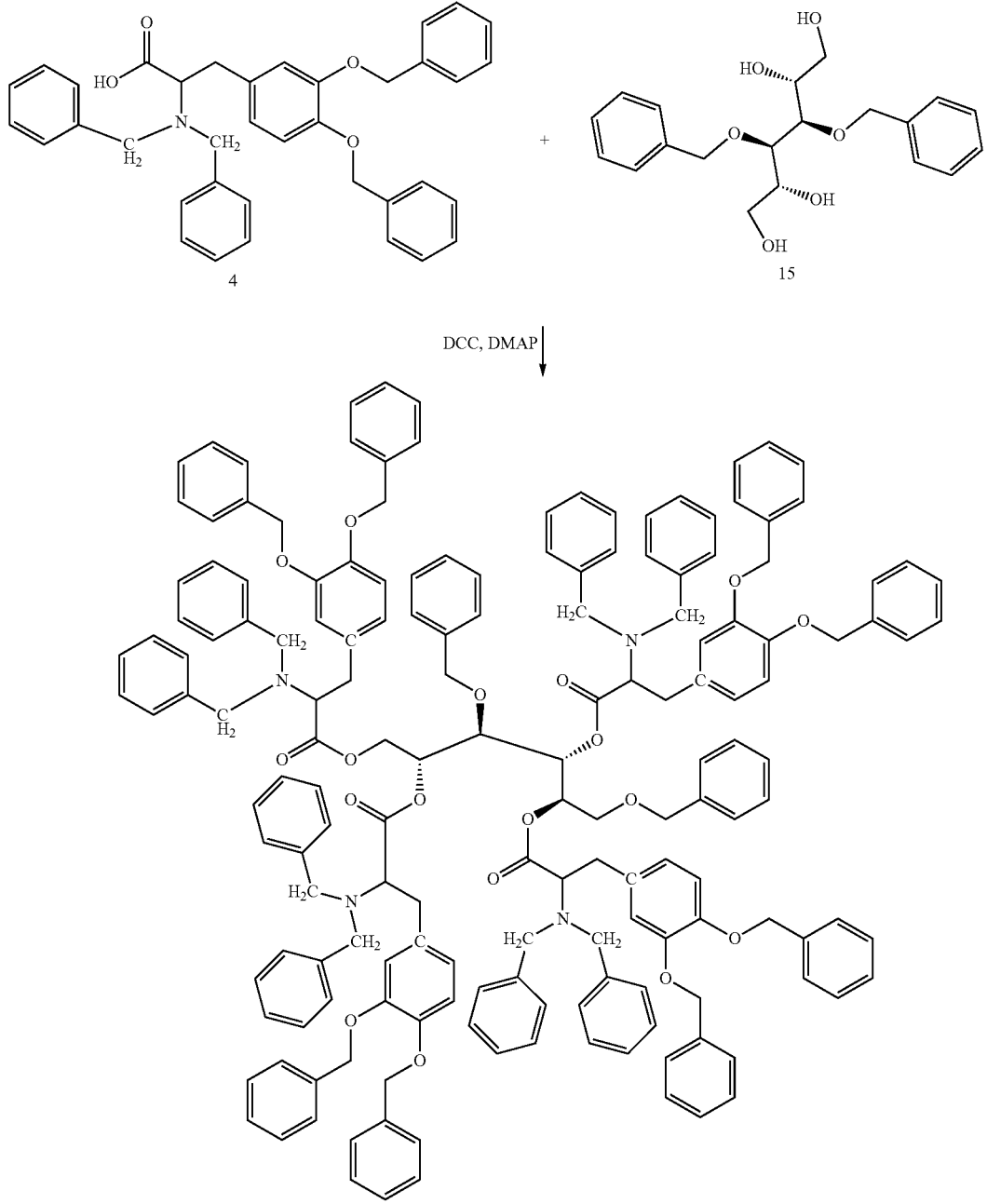

16
Chemical Formula: $C_{168}H_{158}N_4O_{18}$
Exact Mass: 2519.16
Molecular Weight: 2521.07

V. Removal of the Isopropylidene Groups from Product (6) (Scheme 5)

VI. Removal of Benzyl Groups
a. Removal of Benzyl Groups from Product (8) to Obtain Final Product (9) (Scheme 6a)

The filtered solution that contained product (8) in methanol was introduced into a reactor (Pyrex bottle for hydrogenation). 10 ml of ethyl acetate and 50 mg of Pd/C 10% were added. The hydrogenation with $H_2$ was performed at 40 psi at room temperature overnight. The catalyst was filtered out, the solvent was removed under the reduced pressure, diethyl ether was added, and the mixture was kept in a freezer overnight. Then the solvent was decanted. Recrystallization was performed by dissolving the product in methanol and adding the ether and then hexane. 0.17 g of final product was obtained. MS m/z=[M+1]$^+$=362.03

Scheme 5

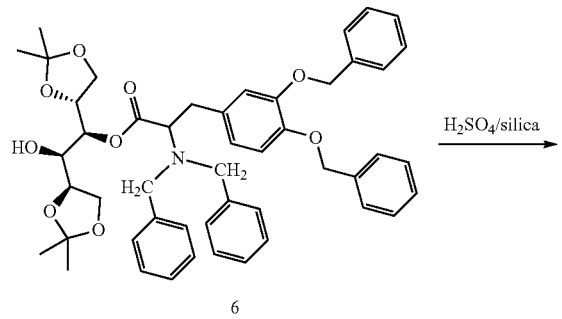

6

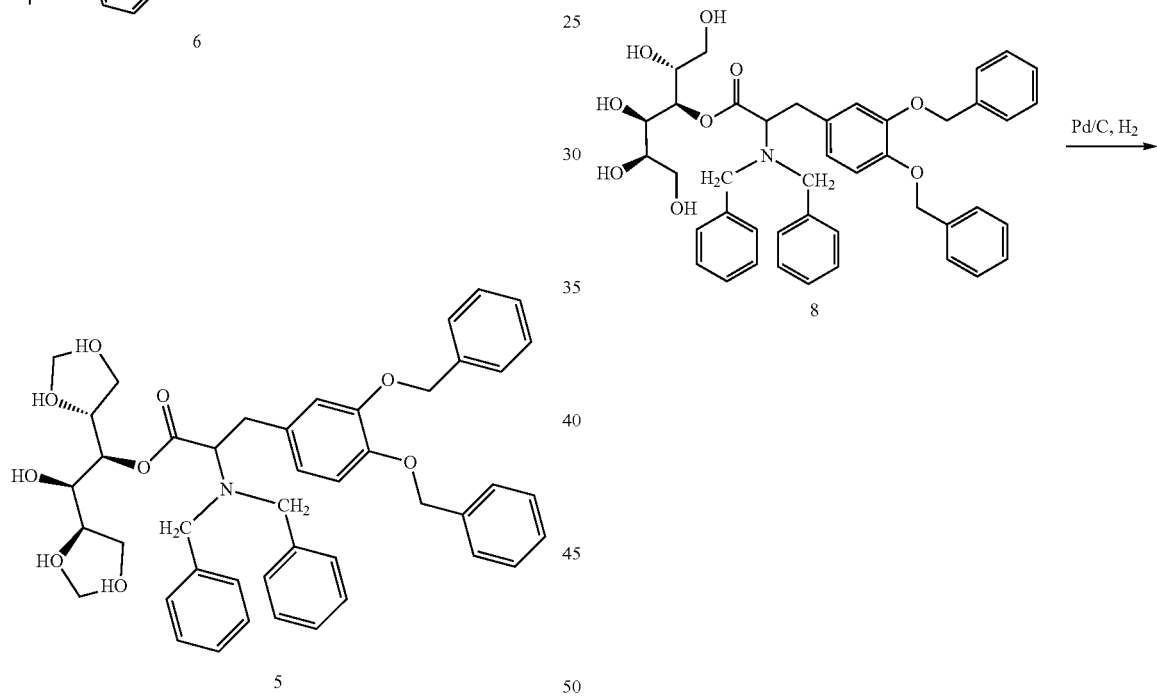

Scheme 6a

5

8

A mixture of 0.55 g of product (6) in 20 ml of dry methanol and 0.28 g of $H_2SO_4$/Silica gel was stirred at room temperature for 8.5 h. MS m/z=[M+1]$^+$=722.37 (target product (8)). The $H_2SO_4$/Silica gel was filtered out. The product was left in methanol for further reaction.

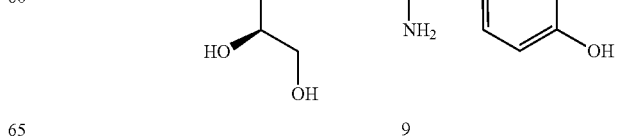

9 b. Removal of Benzyl Groups from Product (11) (Scheme 6b)
The reaction was performed as described in Stage VI(a).
Scheme 6b
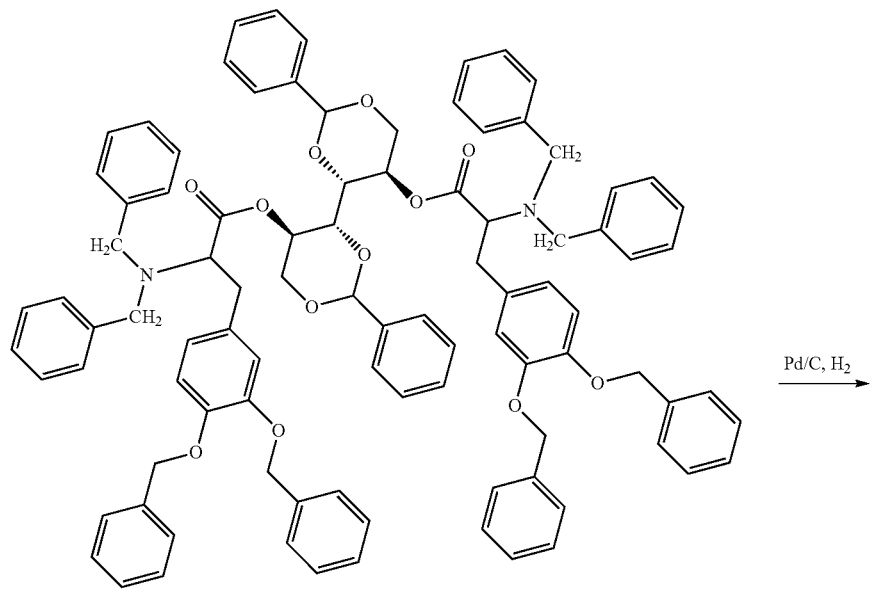
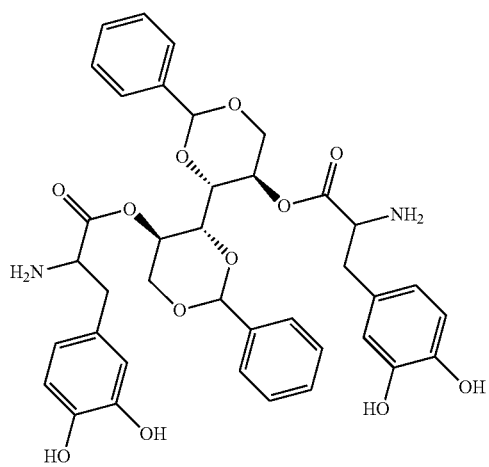
MS m/z=[M+1]$^+$=1077.42 confirmed that we obtained product (12), in which the benzylidene groups were not removed. Therefore, in order to remove all benzylic as well as the benzylidene groups, another catalyst was examined (see Scheme 6c).

c. Removal of Benzyl Groups from Product (16)
(Scheme 6c)
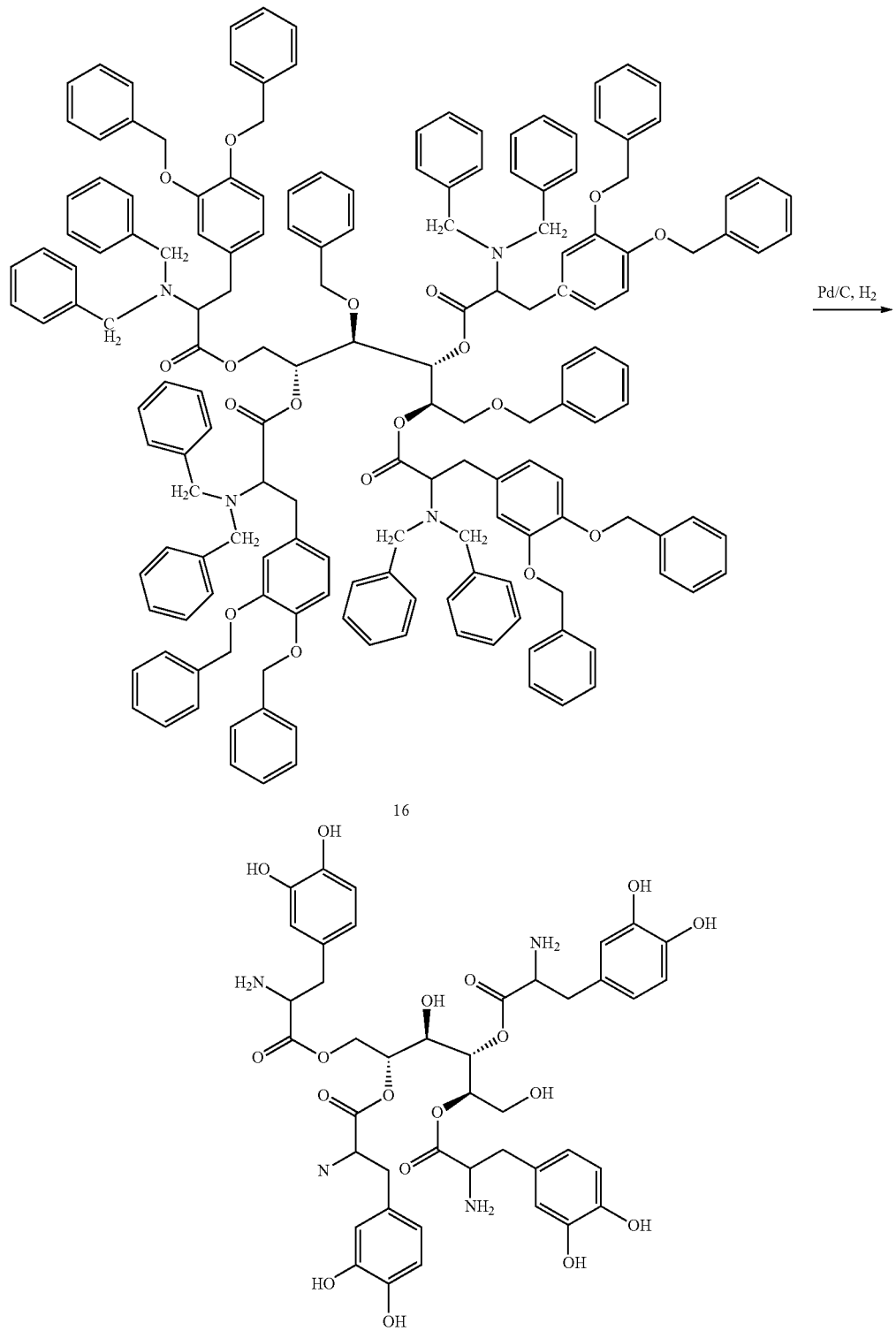
17
Chemical Formula: $C_{42}H_{50}N_4O_{18}$
Exact Mass: 898.31
Molecular Weight: 898.86

As an alternative catalyst, we used PdOH/C washed 3 times with DMF (dimethyl formamide). According to this new approach, a mixture of 68 mg of product (16), 130 mg of Ascorbic acid and 48 mg of PdOH/C 20%, was shaken under H$_2$ atmosphere (40 psi) at room temp. for 48 h. The catalyst was filtered out, diethyl ether was added, and the mixture was kept in a freezer overnight. Then the solvent was decanted. MS m/z=720.27 and 899.33 corresponds to the product with 3 and 4 molecules of L-DOPA bound to one molecule of mannitol (Scheme 6c).

VII. Protection of Hydroxyl Groups in Diisopropylidene-D-Mannitol (5) with Benzylic Groups Scheme 7

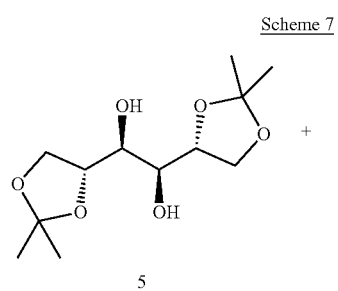

5

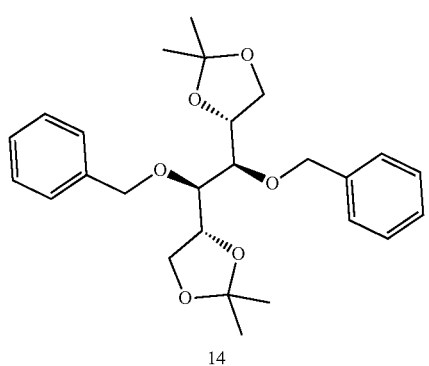

14

2 g (1.4 ml) of benzyl bromide (13) in 1 ml of DMF (dry) was added dropwise to a mixture of 1 g (3.8 mmol) diisopropylidene D-mannitol in 15 ml of DMF (dry) and 0.8 g of KH 35% in oil at room temperature. The reaction was stirred overnight. The mixture was then acidified with 1N HCl. The product was extracted with ethyl acetate. The organic solution was washed with water and brine, dried over MgSO$_4$, and filtered. MS analysis was not clear, so 3 ml of CH$_3$OH (dry) and 0.15 ml of acetyl chloride were added, and the reaction mixture was stirred at room temperature overnight.

TLC (hexane-ethyl acetate 7:3) was performed. Several new spots were observed. Diethyl ether was added, and the precipitated salts were filtered out. The organic phase was washed with water, dried over MgSO$_4$, and filtered, and the solvent was removed under reduced pressure. The product (14 in Scheme 7) (MS m/z=[M+18]$^+$=460.07) was separated by column chromatography using 90 g of silica gel for flash and hexane-ethyl acetate 20% 1 l and then hexane-ethyl acetate 40%.

VIII. Removal of the Isopropylidene Groups from Product 14 (Scheme 8)

Scheme 8

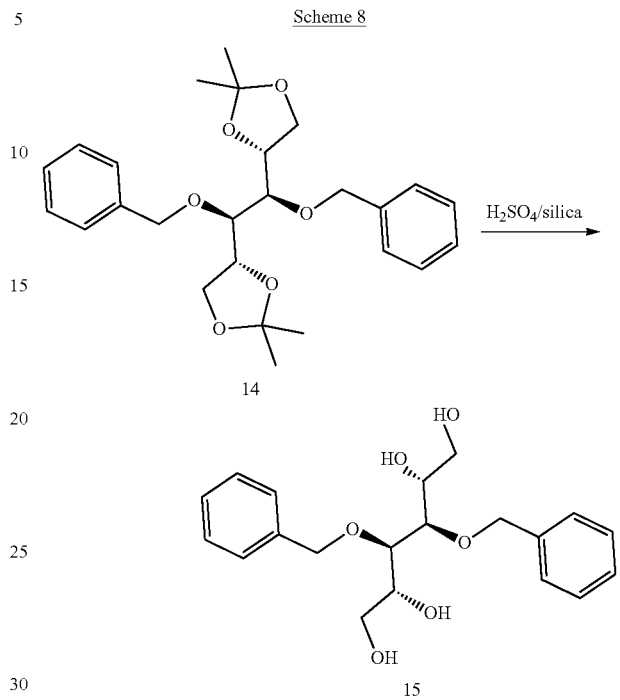

The reaction was performed similar as that described at Stage V. 0.8 g of crude product (15) was obtained. TLC CHCl$_3$—CH$_3$OH (10:1) showed two spots. The product was purified by flash chromatography using 90 g of silica gel for flash and c (5%) 1 l, CHCl$_3$—CH$_3$OH (8%) 750 ml. 20 ml fractions were collected. The pure product (15) showed one spot at TLC analysis. MS m/z=[M+1]$^+$=362.85.

Example 3

Synthesis of CARBIDOPA-Mannitol Conjugates

The first attempt to obtain a conjugate of carbidopa and mannitol (CARBIDOPAM) was performed using a method as described in Example 2 for DOPA-mannitol conjugate (DOPAM). Carbidopa was reacted with methanol in the presence of HCl gas to obtain the methyl ester of carbidopa. Then, it was attempted to obtain the fully protected carbidopa by treating the methyl ester of carbidopa with benzyl bromide in the presence of K$_2$CO$_3$ in acetonitrile, but this step of the reaction failed.

Then the following approach was examined:

I. Synthesis of Methyl Ester of Carbidopa

Scheme 9

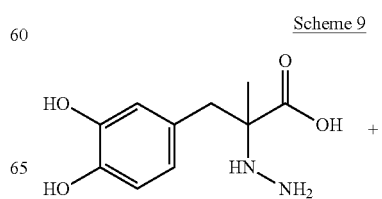

-continued

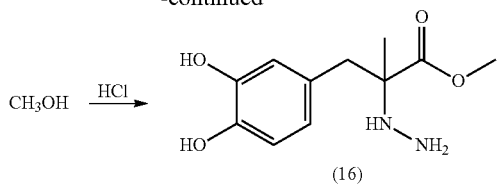
(16)

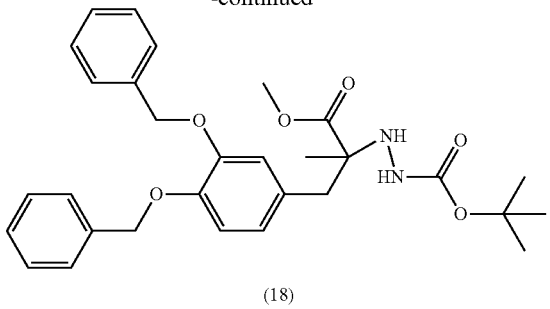
(18)

CARBIDOPAM was obtained by reacting carbidopa with methanol in the presence of the HCl gas to obtain the methyl ester of carbidopa (16)

II. Protection of the Amine Group

Scheme 10

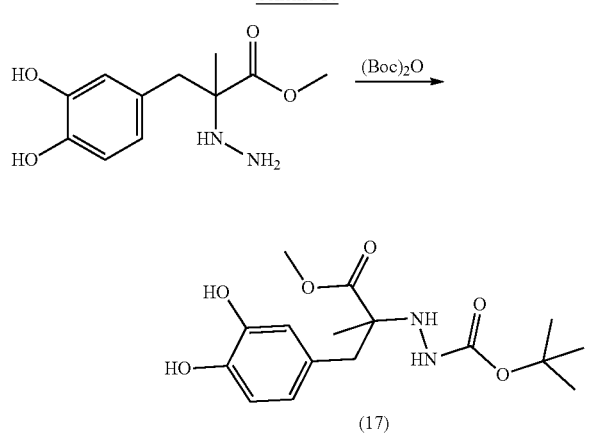
(17)

Compound 17 was treated with benzyl bromide in the presence of base (CsHCO$_3$) to provide protection of all the active groups (18).

IV. Removal of the Methyl Group

Scheme 12

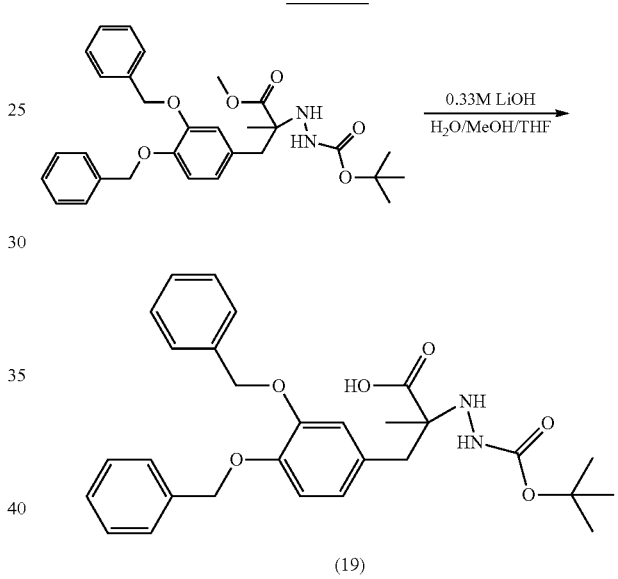
(19)

The methyl ester of carbidopa was then reacted with (Boc)$_2$O (step 2) to protect the amine group, obtaining compound (17).

III. Protection of All Active Groups

Scheme 11

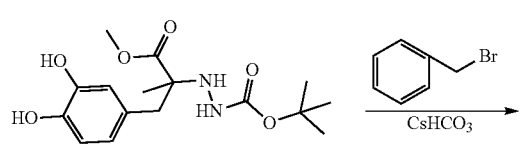

The methyl group from the carboxylic acid of (18) was removed in a mixture of H$_2$O/CH$_3$OH/THF in the presence of 0.33M LiOH (19).

V. Synthesis of Fully Protected CARBIDOPAM

Scheme 13

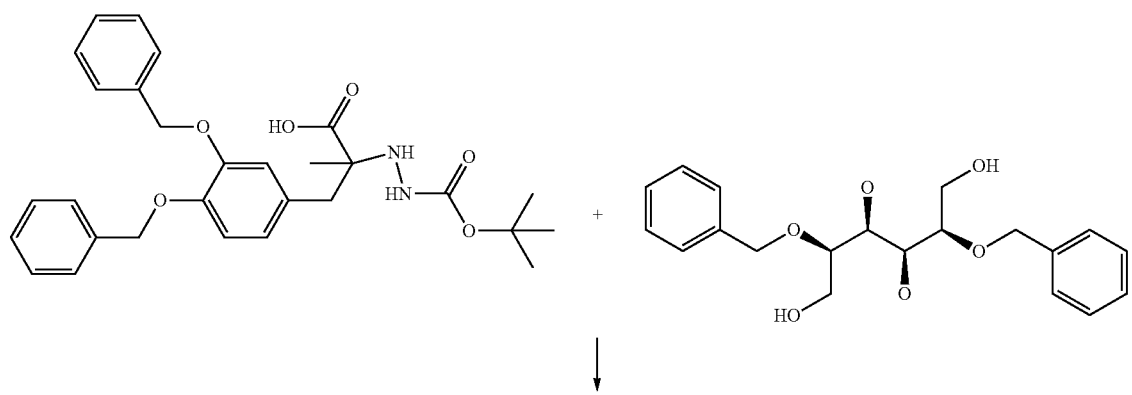

-continued
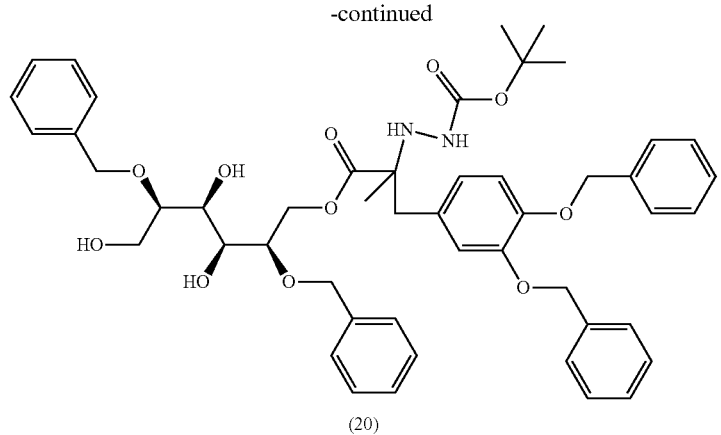
(20)
Compound (19) was reacted with dibenzyl mannitol (which was prepared separately) to obtain fully protected CARBIDOPAM (20).
VI. Removal of Tert-Butoxide
Scheme 14
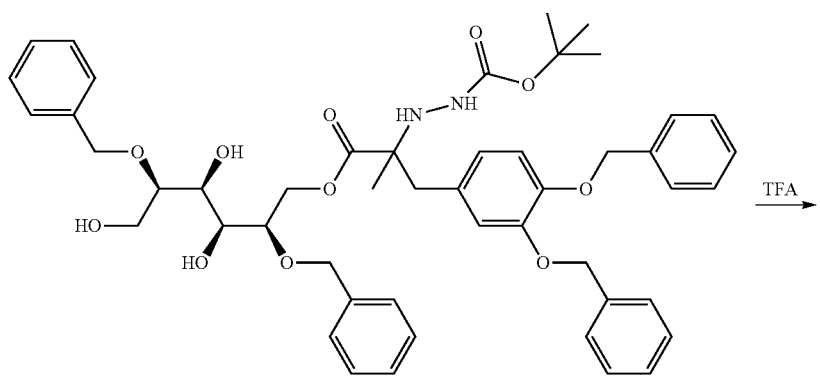
TFA →
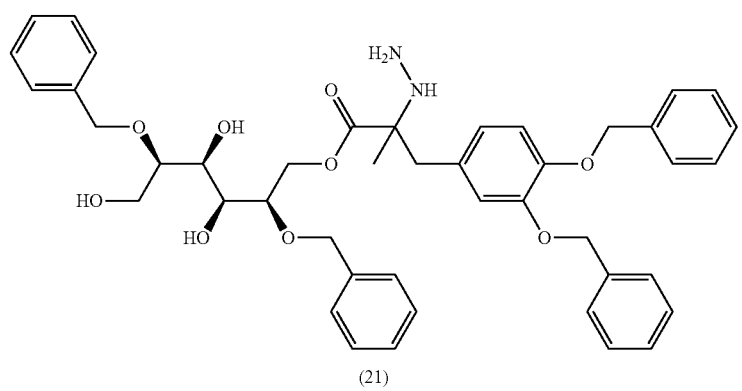
(21)

The tert-butoxide was removed using trifloroacetic acid (21).

VII. Synthesis of CARBIDOPAM

Scheme 14

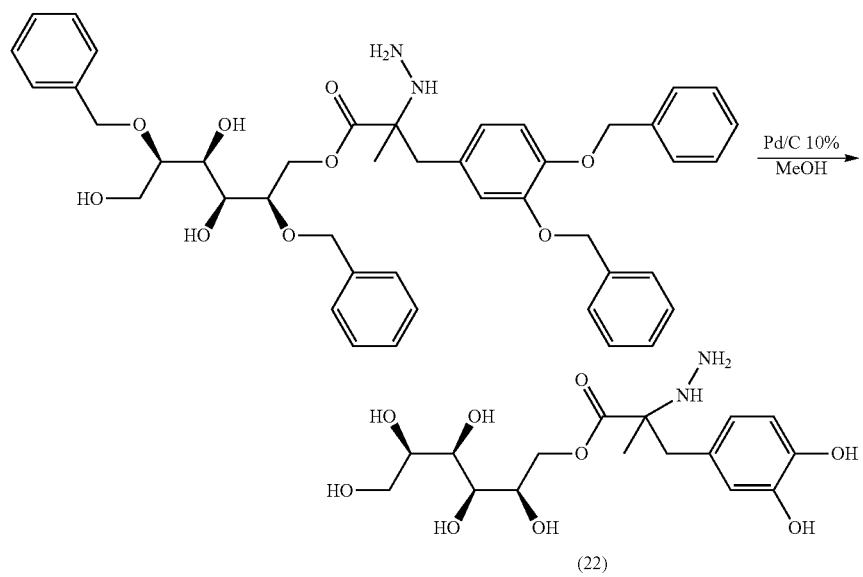

(22)

Finally the benzylic groups were removed by hydrogenation in methanol, using Pd/C 10% as a catalyst to obtain CARBIDOPAM (22).

Example 4

Release of L-DOPA from L-DOPAM-1 in Human Serum In Vitro

The stability of one molecule of L-DOPA and one Mannitol (L-DOPAM-1, M.W. 361) in serum was evaluated according to the following procedure:
1. A solution of 2 mg L-DOPAM in 1ml of serum was prepared;
2. A 200 μl aliquot was immediately withdrawn from that solution;
3. 180 μl of TCA (trichloroacetic acid) 0.6N solution was added;
4. The obtained mixture was centrifuged (5,000 rpm, 15 min., 40° C.);
5. The supernatant was filtrated through 0.22 μm filter;
6. The filtrate was diluted 20 times and injected into Liquid chromatography-mass spectrometry (LC-MS) (column: LUNA 3u C18 (2) 100A; 150×1.0 mm). The eluents were A=Acetonitrile, B=$H_2O$+0.1% Acetic Acid. The following LC gradient was used:

TABLE 1

| LC Gradient for purifying L-DOPAM | | | |
|---|---|---|---|
| Time, min | A, % | B, % | Flow (μl/min) |
| 0 | 2 | 98 | 75 |
| 6 | 2 | 98 | 75 |

TABLE 1-continued

| LC Gradient for purifying L-DOPAM | | | |
|---|---|---|---|
| Time, min | A, % | B, % | Flow (μl/min) |
| 10 | 100 | 0 | 75 |
| 18 | 100 | 0 | 75 |
| 21 | 2 | 98 | 75 |
| 30 | 2 | 98 | 75 |

A = Acetonitrile,
B = H2O + 0.1% Acetic Acid

The L-DOPAM solution in serum was stored at 36° C. Steps 2-6 were repeated after 2, 4, 23 and 46.5 hours.

The retention time (RT) of L-DOPAM, L-DOPA and Mannitol are all at approximately 3 min, which indicates that they did not separate on the LC column. The areas of the L-DOPAM, L-DOPA and Mannitol peaks were determined by extraction of only the ions of interest (FIGS. 3-7). The L-DOPA metabolite dopamine was not detected.

In order to semi-quantitatively determine the stability of L-DOPAM, the ratio of the peak areas of L-DOPA versus L-DOPAM and Mannitol versus L-DOPAM was calculated. An increase of the ratio of L-DOPA and Mannitol over time indicates the breakdown of L-DOPAM in serum. Table 2 summarizes the results.

TABLE 2

Stability of L-DOPAM as measured by ratio of peak areas from LC-MS chromatograms of L-DOPAM in serum of L-DOPA or Mannitol versus L-DOPAM

| | Area | | | Ratio | |
|---|---|---|---|---|---|
| Time, h | L-DOPA | L-DOPAM | Mannitol | L-DOPA/ L-DOPAM | Mannitol/ L-DOPAM |
| 0 | 1019288083 | 4065363001 | 60908307 | 0.251 | 0.015 |
| 2 | 2345301782 | 3292402130 | 65437168 | 0.712 | 0.020 |
| 4 | 2632498093 | 2146859775 | 97930402 | 1.226 | 0.046 |
| 23 | 1539342894 | 498391022 | 73274763 | 3.089 | 0.147 |
| 46.5 | 26308871 | 460814075 | 83932712 | 0.057 | 0.182 |

Figure 8:
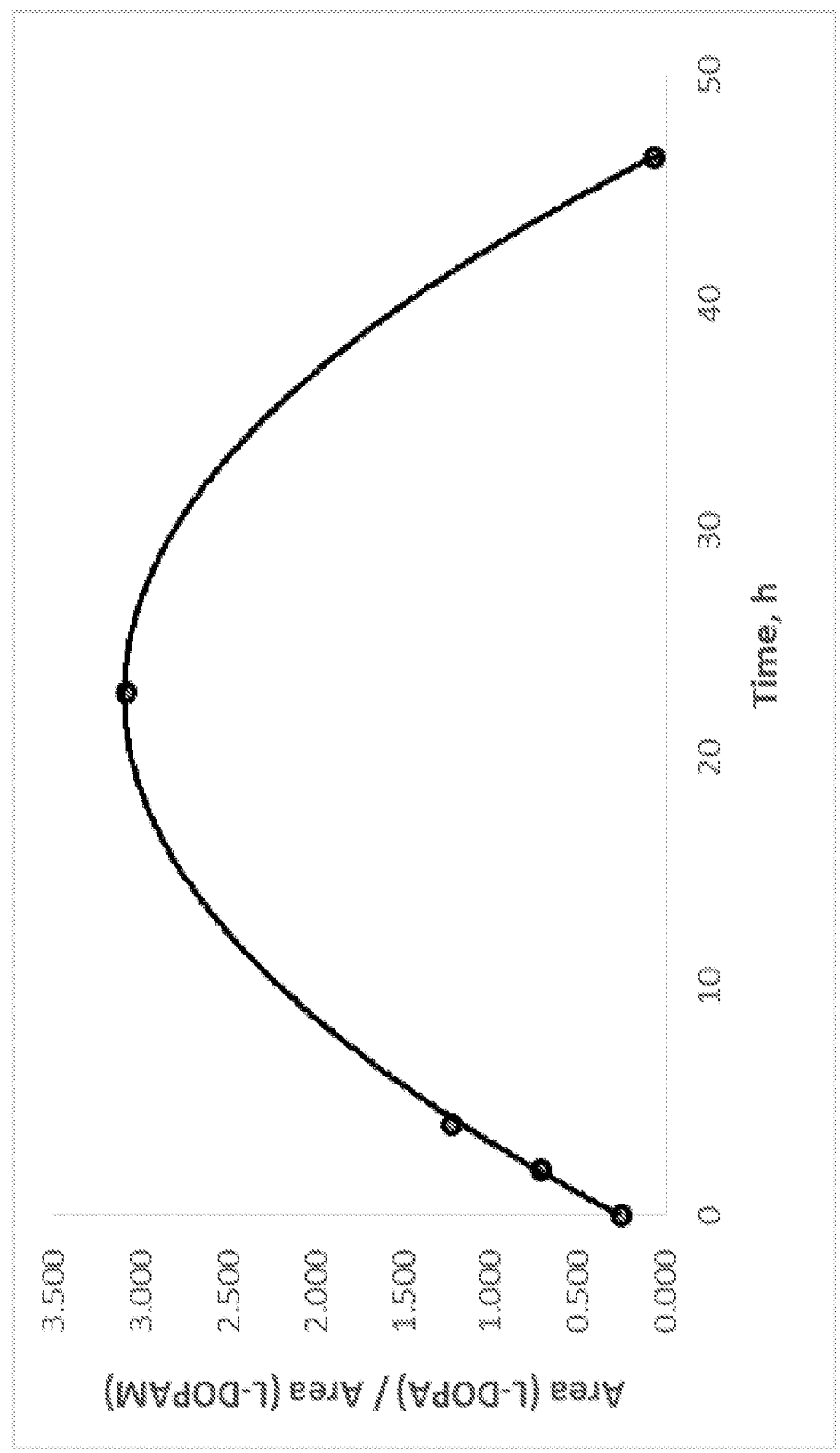
FIG. 8 presents the ratio of the liquid chromatography-mass spectrometry (LC-MS) chromatograms peak areas of L-DOPA versus L-DOPAM as a function of time of incubation in human serum at 37° C.
Figure 9:
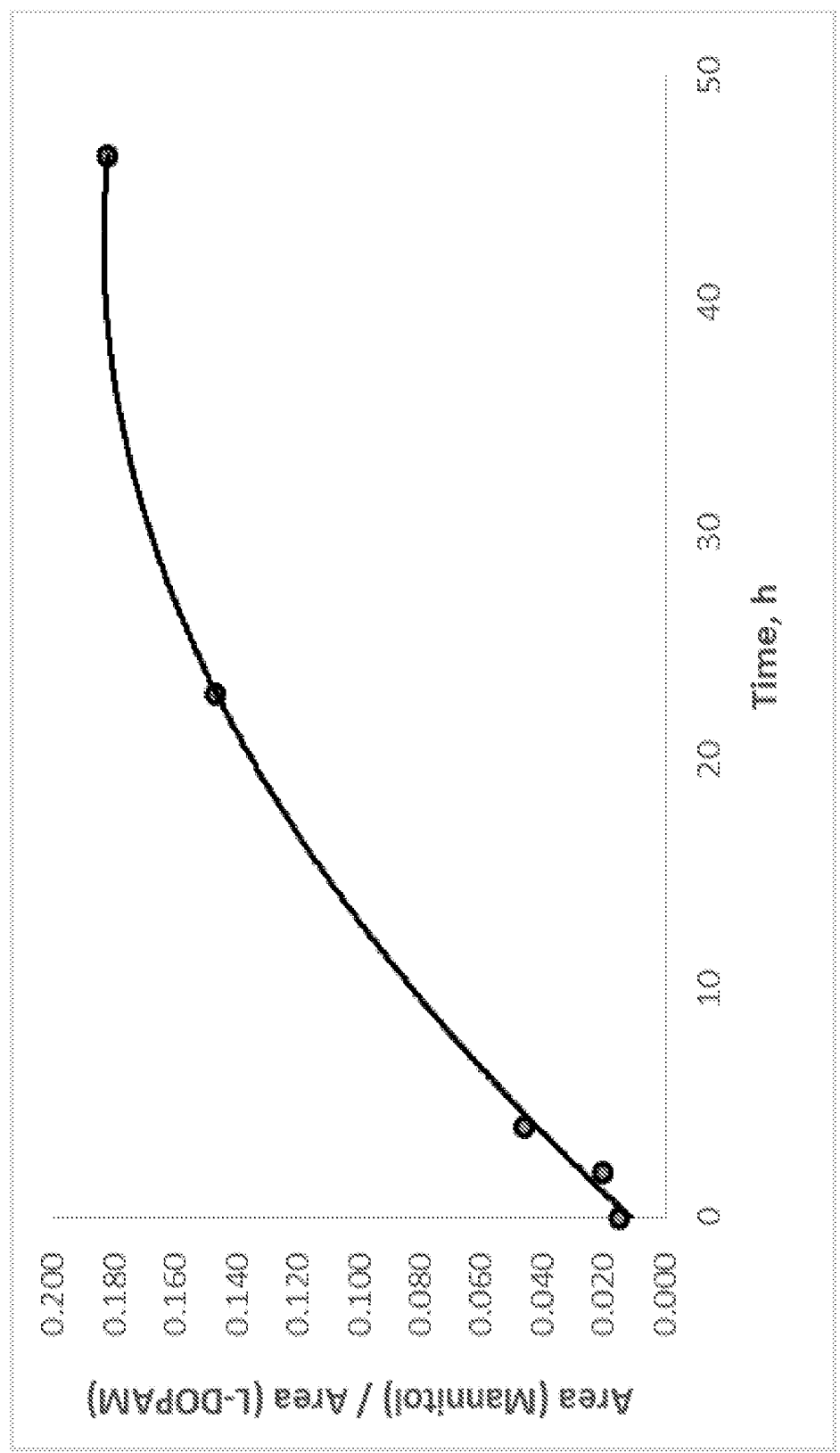
FIG. 9 presents the ratio of the liquid chromatography-mass spectrometry (LC-MS) chromatograms peak areas of Mannitol versus L-DOPAM as a function of time of incubation in human serum at 37° C.

L-DOPA levels increased up to 23 h, after which there was a sharp decrease detected at the 46 h time point (FIG. 8). Even at time 0, some L-DOPA was detected, due to the degradation of L-DOPAM during the sample preparation. L-DOPAM was still detected even 46 h after exposure of L-DOPAM to serum. Mannitol levels increased over time (FIG. 9).

Therefore, L-DOPA and mannitol had a similar slow release pattern from DOPAM, with L-DOPA being metabolized in serum at a higher rate than mannitol after release.

Figure 10:
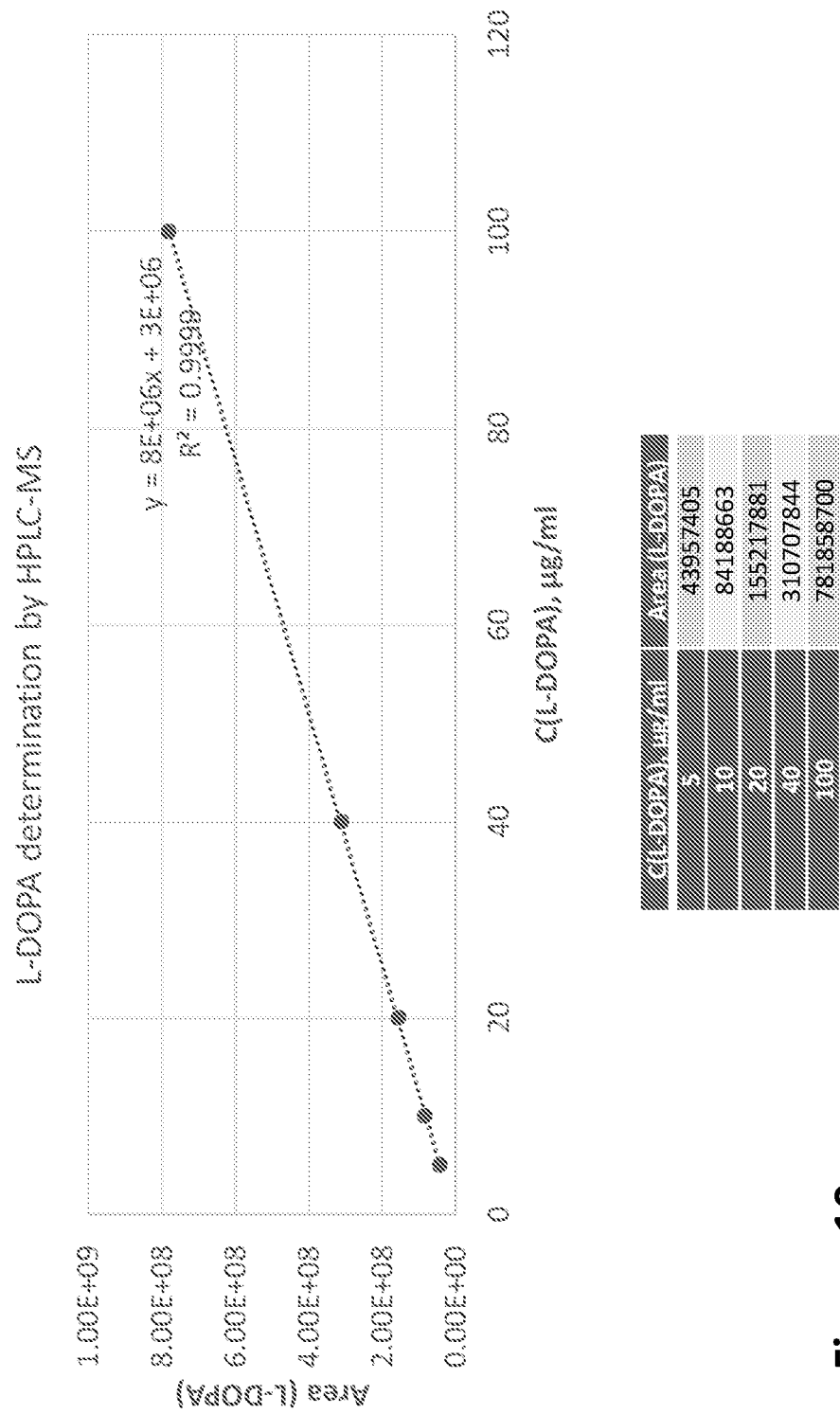
FIG. 10 shows the correlation between known L-DOPA concentration and area under the curve for L-DOPA on liquid chromatography-mass spectrometry (LC-MS) chromatograms (a calibration curve).
Figure 12:
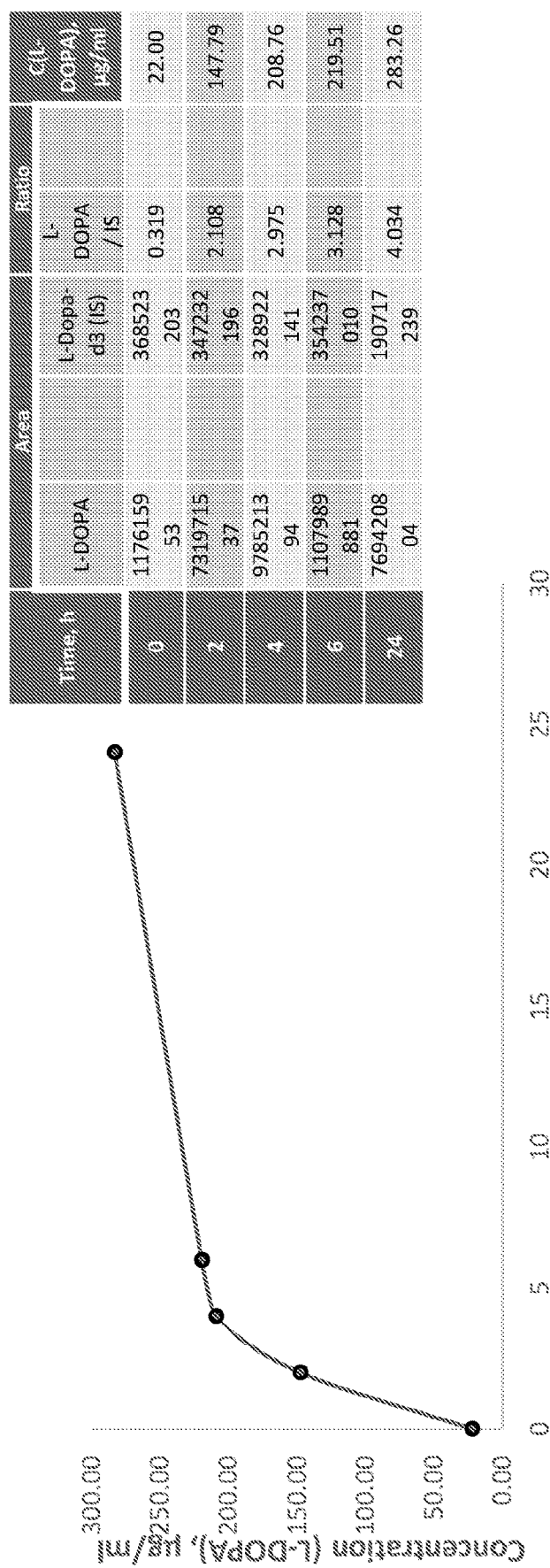
FIG. 12 presents the concentration of L-DOPA in human serum at 0, 2, 4, 6, and 24 hours after incubation of DOPAM in human serum at 37° C.

HPLC-MS area under the curve were examined after addition of various L-DOPA concentrations to serum (FIG. 10). Adding an internal standard to the serum did not significantly affect the calibration curve for L-DOPA (FIG. 11). DOPAM was added to human serum in vitro, and L-DOPA concentrations in serum at various timepoints were determined by HPLC-MS and quantified using an internal standard. DOPAM released L-DOPA continuously over at least 24 hours (FIG. 12). The concentration of L-DOPA in serum increased in a linear fashion during the first 6 hours after adding DOPAM to the serum, after which L-DOPA concentration continued to increase through the final time point examined in this experiment (24 hours after DOPAM addition; FIG. 12).

Taken together, the data demonstrates that DOPAM administration leads to a slow release of L-DOPA and mannitol, with L-DOPA present in serum for at least 24 hours compared to about 2 hours in serum for non-conjugated L-DOPA.

Example 5

Release of L-DOPA from L-DOPAM-1 and L-DOPAM-4 in Human Serum In Vitro

The stability of one molecule of L-DOPA and one of mannitol (L-DOPAM-1), and of four molecules of L-DOPA and one of mannitol (L-DOPAM-4) in serum was evaluated by the method disclosed in Example 4. L-DOPAM-1 and L-DOPAM-4 were added into human serum and incubated at 37° C. Samples were taken at various times after the addition of the drugs to the serum and L-DOPA concentration was determined by LC-MS.

Figure 13:
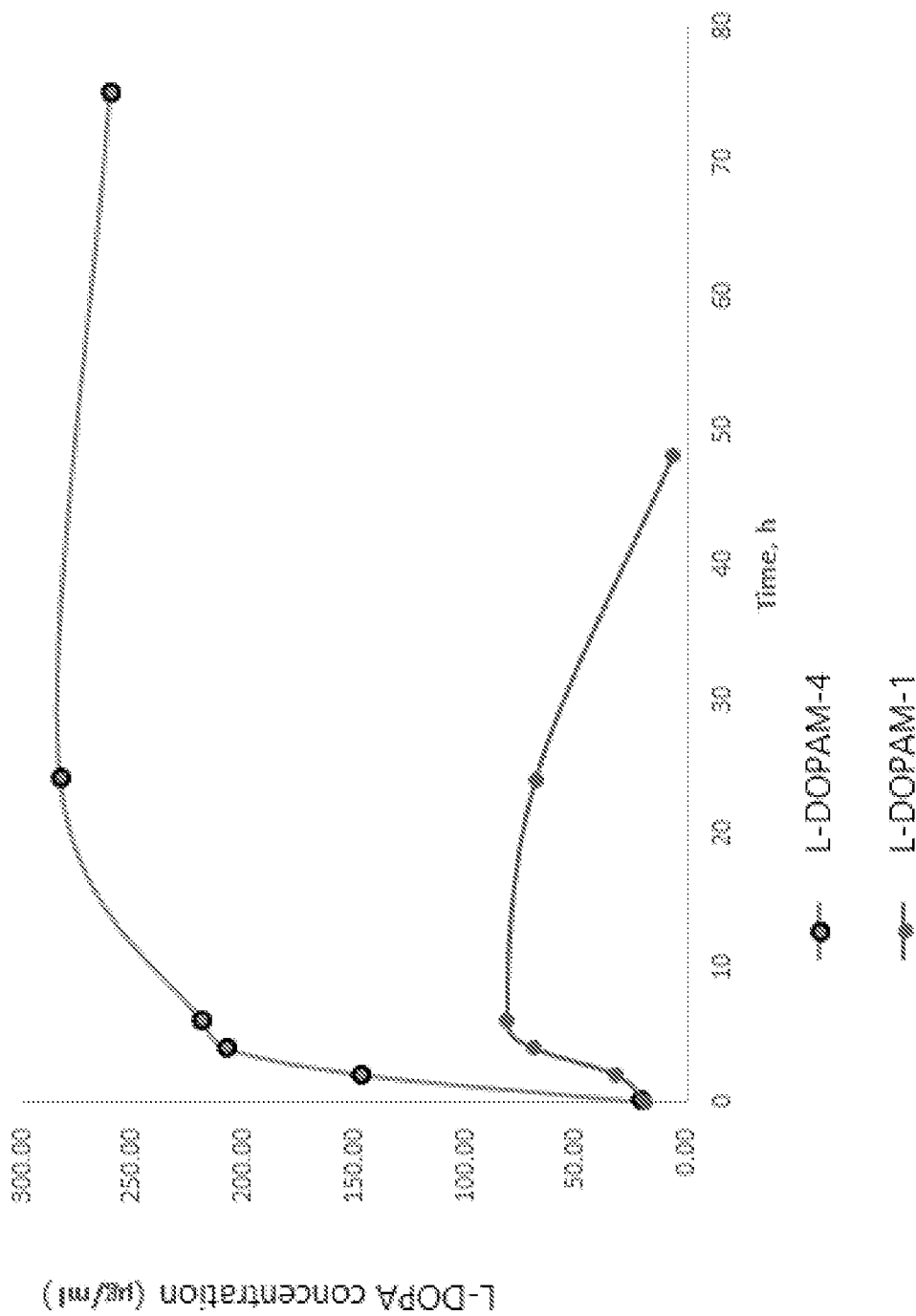
FIG. 13 presents the concentration L-DOPA levels at various time points after incubation of L-DOPAM-1 and L-DOPAM-4 in human serum.

L-DOPAM-1 levels increased up to 8 hours, after which there was a gradual decrease at 24 and 48 hours (FIG. 13). L-DOPAM-4 levels first increased linearly up to 5 hours, then continued increasing more moderately up to 24 hours, and then decreased slightly through the final time point examined after 72 hours (FIG. 13).

Example 6

Pharmacokinetic of L-DOPA Following Intravenous Administration of L-DOPA and L-DOPAM-2 to Mice In order to analyze the stability of DOPAM-2 in vivo, mice were injected intravenously with either L-DOPAM-2 or L-DOPA, where in either case, an equimolar dose of L-DOPA was administered (equivalent to 80 mg/kg L-DOPA). Mice were sacrificed 30, 60, 120, 240, and 480 minutes after the injection of the tested drug, blood was collected and plasma obtained by centrifugation. L-DOPA concentration was determined by LC-MS. 3 mice were tested per each time point, and each point on the graph represents mean±SEM.

Figure 14A:
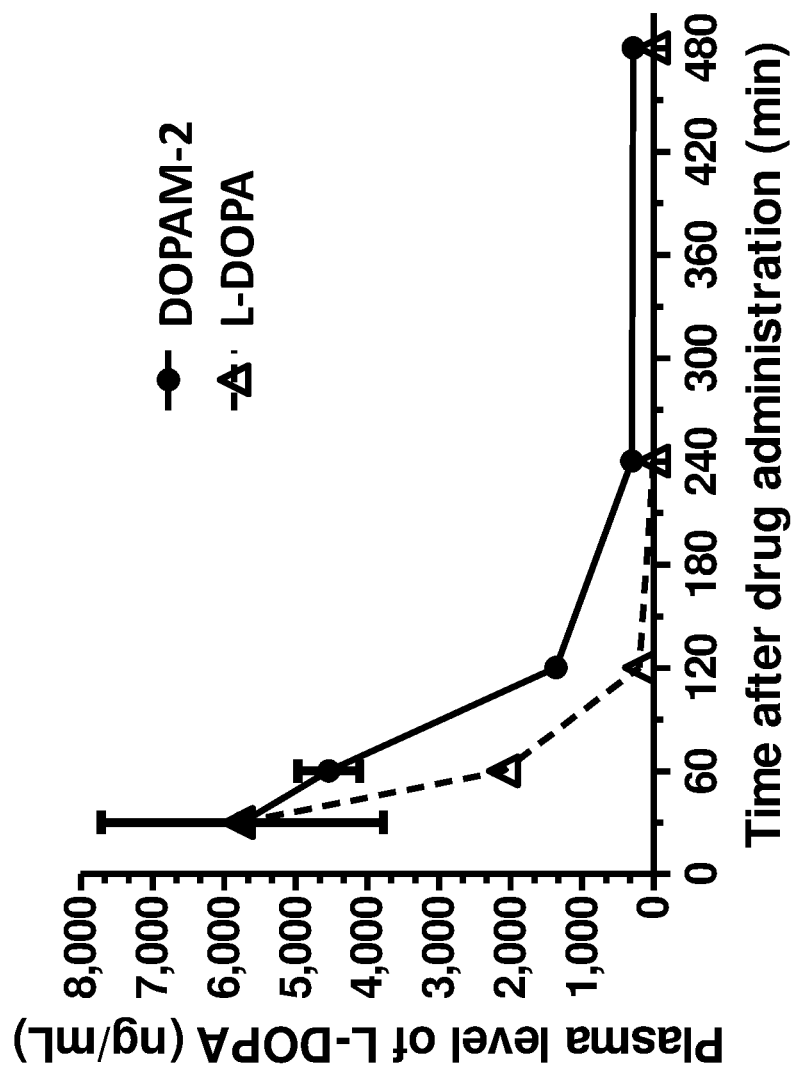
FIGS. 14A-14B present plasma levels of L-DOPA after intravenous administration of DOPAM-2 to mice.

Mice injected with DOPAM-2 had higher plasma concentrations of L-DOPA than mice injected with L-DOPA 60, 120, 240, and 480 minutes after injection (FIG. 14A).

Figure 14B:
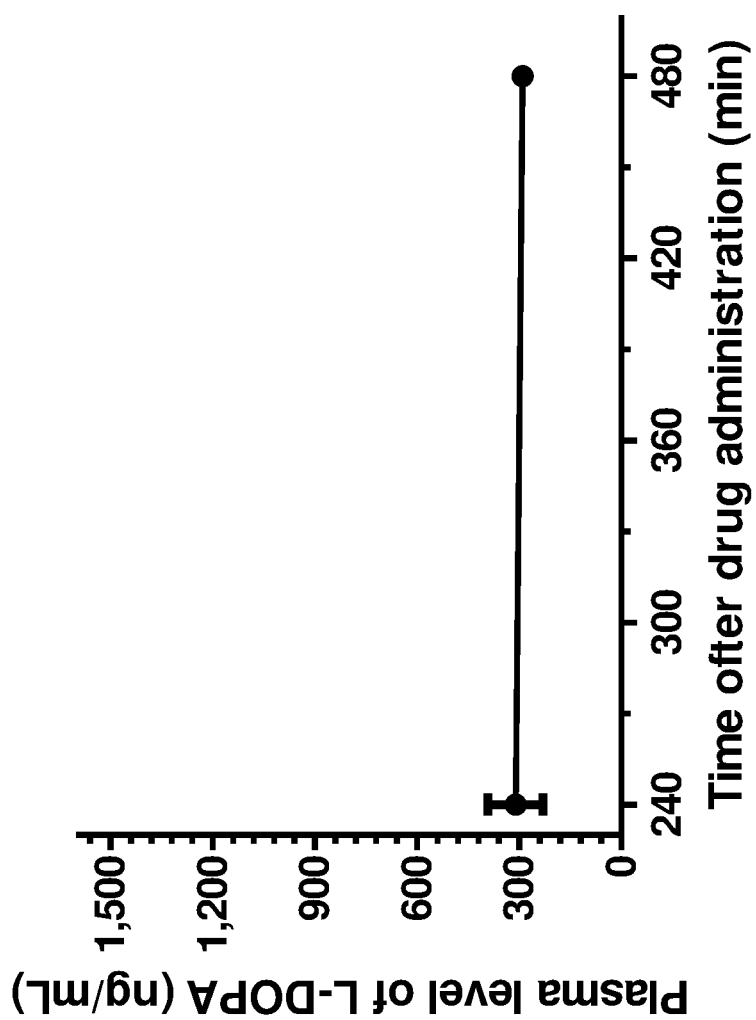

Further, significant levels of L-DOPA were measured in the plasma 4 and 8 hours after the injection of DOPAM-2 (FIG. 14B), times at which no L-DOPA was detected in L-DOPA injected mice (FIG. 14A). These experiments were performed without the injection of a DOPA decarboxylase inhibitor, which further emphasizes the ability of DOPAM to maintain L-DOPA in the blood for a long time, much longer than L-DOPA.

These experiments demonstrate that L-DOPA mannitol conjugates are capable of maintaining L-DOPA blood concentration over a long period of time, much more than free L-DOPA. The slow and continuous release of L-DOPA in blood was unexpected in view of the presence of esterases in the blood, which would have been expected to quickly hydrolyze the ester linkage of the conjugates. In fact, L-DOPA alkyl esters prodrugs are hydrolyzed quickly after administration and therefore, L-DOPA amide prodrugs were developed to improve the stability of the prodrug.

What is claimed is:

1. A conjugate comprising a sugar molecule and
   two or more L-DOPA molecules,
wherein said sugar comprises mannitol, glucose, or galactose and wherein said sugar is conjugated via one or more of its hydroxyl groups to the carboxyl group of:
   each of said L-DOPA molecules.

2. The conjugate of claim 1, wherein said sugar molecule is a mannitol bound to up to 6 molecules of L-DOPA.

3. The conjugate of claim 2, wherein said conjugate comprises:
   (a) one molecule of mannitol and 2 molecules of L-DOPA;

(b) one molecule of mannitol and 3 molecules of L-DOPA; or
(c) one molecule of mannitol and 4 molecules of L-DOPA.

4. A pharmaceutical composition comprising one or more conjugates of claim 1 and a pharmaceutically acceptable carrier.

5. The pharmaceutical composition of claim 4, wherein said pharmaceutical composition is formulated for sublingual, intranasal, intravenous, intramuscular, subcutaneous, oral, rectal, transdermal, intraduodenal, inhalation, or intrapulmonary administration.

6. The pharmaceutical composition of claim 5, wherein said pharmaceutical composition is formulated for intranasal administration and wherein said pharmaceutically acceptable carrier is selected from sodium chloride, dextrose, sodium hydroxide, hydrochloric acid, sulphuric acid, nitrogen, benzalkonium chloride, ethanol, propylene glycol, benzoyl alcohol, chlorobutanol, methyl paraben, sodium citrate, sodium phosphate, Polysorbate 80, Polysorbate 20, disodium EDTA, CMC, Na CMC, Alcohol, PEG 400, propylene glycol and glycerin.

7. The pharmaceutical composition of claim 4, further comprising a therapeutic compound comprising a prodrug of L-Dopa.

8. The pharmaceutical composition of claim 4, further comprising one or more inhibitors of DOPA decarboxylase comprising carbidopa, a prodrug of carbidopa, methyldopa, benserazide, alpha-Difluoromethyl-DOPA (DFMD), or a combination thereof.

9. The pharmaceutical composition of claim 4, further comprising one or more COMT inhibitor comprising entacapone, tolcapone, opicapone, or a combination thereof.

10. A method for treating, suppressing, or inhibiting a movement disorder responsive to dopaminergic stimulation comprising administering to a subject having said movement disorder a therapeutically effective amount of the pharmaceutical composition of claim 4.

11. The method of claim 10, wherein said movement disorder responsive to dopaminergic stimulation comprises Parkinson's Disease (PD), symptomatic parkinsonism following carbon monoxide intoxication or manganese intoxication, dopamine-responsive dystonia, restless legs syndrome, one or more of the Parkinson plus syndromes, or a combination thereof.

12. The method of claim 11, wherein said PD comprises symptomatic PD, advanced Parkinson's disease with motor complications, idiopathic PD, iatrogenic PD, vascular PD, post-encephalitic parkinsonism, or a combination thereof; wherein said dopamine-responsive dystonia comprises Segawa syndrome; and wherein said Parkinson plus syndrome comprises a synucleinopathy, a tauopathy, multiple system atrophy (MSA), a tauopathy-like fronto-temporal degeneration, corticobasal degeneration (CBD), Dementia with Lewy bodies (DLB), diffuse Lewy body dementia (DLBD), olivopontocerebellar atrophy, or a combination thereof.

13. The method of claim 12, wherein said tauopathy-like fronto-temporal degeneration comprises progressive supranuclear palsy (PSP), Pick's disease, or a combination thereof.

14. The method of claim 10, wherein said conjugate is administered to said subject in a daily dose of 10-3,000 mg.

\* \* \* \* \*